United States Patent
Li et al.

(10) Patent No.: US 11,279,628 B2
(45) Date of Patent: Mar. 22, 2022

(54) LITHIUM TRANSITION METAL OXIDE PARTICLES HAVING LITHIUM CONCENTRATION GRADIENTS, METHODS FOR FORMING THE SAME, AND BATTERY CATHODES FORMED OF THE SAME

(71) Applicant: Massachusetts Institute of Technology, Cambridge, MA (US)

(72) Inventors: Ju Li, Weston, MA (US); Zhi Zhu, Malden, MA (US)

(73) Assignee: Massachusetts Institute of Technology, Cambridge, MA (US)

(*) Notice: Subject to any disclaimer, the term of this patent is extended or adjusted under 35 U.S.C. 154(b) by 135 days.

(21) Appl. No.: 16/687,416

(22) Filed: Nov. 18, 2019

(65) Prior Publication Data

US 2020/0239328 A1 Jul. 30, 2020

Related U.S. Application Data

(60) Provisional application No. 62/796,804, filed on Jan. 25, 2019.

(51) Int. Cl.
*C01G 53/00* (2006.01)
*C01G 51/00* (2006.01)
(Continued)

(52) U.S. Cl.
CPC ......... *C01G 53/42* (2013.01); *C01G 45/1228* (2013.01); *C01G 51/42* (2013.01);
(Continued)

(58) Field of Classification Search
None
See application file for complete search history.

(56) References Cited

U.S. PATENT DOCUMENTS

2002/0192552 A1   12/2002   Lampe-Onnerud et al.
2013/0183583 A1*   7/2013   Kim ............... H01M 4/131
                                                                    429/220
2017/0309910 A1*  10/2017   Jo ........................ C01G 51/42

FOREIGN PATENT DOCUMENTS

WO   2017166147 A1   10/2017

OTHER PUBLICATIONS

Wang et al., "CO2 and O2 evolution at high voltage cathode materials of Li-ion batteries: a differential electrochemical mass spectrometry study." Analytical chemistry 86.13 (2014): 6197-6201.

(Continued)

*Primary Examiner* — Daniel S Gatewood
(74) *Attorney, Agent, or Firm* — Smith Baluch LLP

(57) ABSTRACT

Previous hybrid-anion and cation-redox (HACR) cathodes were limited in cycling performance by irreversible anionic redox reactions caused by the loss of anions. To overcome this limitation, a lithium (Li) transition metal (M) oxide particle is described having a Li concentration gradient. In one example, the particle includes a Li-rich core region that provides capacity and energy density due anionic and cationic contributions and a Li-poor surface region surrounding the core region to inhibit anionic activity and thus substantially reduce the loss of anions. A gradient region disposed between the core and surface regions has a Li concentration profile that varies from a first Li concentration in the core region to a second Li concentration in the surface region. A high-temperature leaching method may be used to leach LiO from a Li-rich $Li_{1+x}M_{1-x}O_2$ particle, thus forming a coherent Li gradient with a stabilized layered structure.

20 Claims, 62 Drawing Sheets

(51) Int. Cl.
H01M 4/131 (2010.01)
C01G 45/12 (2006.01)
(52) U.S. Cl.
CPC ......... H01M 4/131 (2013.01); C01P 2004/52 (2013.01); C01P 2004/53 (2013.01)

(56) References Cited

OTHER PUBLICATIONS

Wu et al., "Spinel/layered heterostructured cathode material for high‐capacity and high‐rate Li‐ion batteries." Advanced materials 25.27 (2013): 3722-3726.
Xu et al., "Elucidating anionic oxygen activity in lithium-rich layered oxides." Nature communications 9.1 (2018): 947. 10 pages.
Xue et al., Intercalation-conversion hybrid cathodes enabling Li-S full-cell architectures with jointly superior gravimetric and volumetric energy densities. Nature Energy 4.5 (2019): 374-382.
Yan et al., "Injection of oxygen vacancies in the bulk lattice of layered cathodes." Nature nanotechnology 14.6 (2019): 602-608.
Yan et al., "Probing the degradation mechanism of Li2MnO3 cathode for Li-ion batteries." Chemistry of Materials27.3 (2015): 975-982.
Ye et al., "Understanding the Origin of Li2MnO3 Activation in Li‐Rich Cathode Materials for Lithium‐Ion Batteries." Advanced Functional Materials 25.48 (2015): 7488-7496.
Yoon et al., "Oxygen Contribution on Li-Ion Intercalation-Deintercalation in LiAl y Co1-y O 2 Investigated by O K-Edge and Co L-Edge X-Ray Absorption Spectroscopy." Journal of The Electrochemical Society 149.10 (2002): A1305-A1309.
Yu et al., "High-energy 'composite' layered manganese-rich cathode materials via controlling Li 2 MnO 3 phase activation for lithium-ion batteries." Physical Chemistry Chemical Physics 14.18 (2012): 6584-6595.
Yu et al., "High-energy cathode materials (Li2MnO3—LiMO2) for lithium-ion batteries." The journal of physical chemistry letters 4.8 (2013): 1268-1280.
Zhan et al., "Enabling the high capacity of lithium-rich anti-fluorite lithium iron oxide by simultaneous anionic and cationic redox." Nature Energy 2.12 (2017): 963. 9 pages.
Zheng et al., "Nanoscale Surface Modification of Lithium‐Rich Layered‐Oxide Composite Cathodes for Suppressing Voltage Fade." Angewandte Chemie International Edition 54.44 (2015): 13058-13062.
Zhu et al., "Anion-redox nanolithia cathodes for Li-ion batteries." Nature Energy 1.8 (2016): 1-7.
Armstrong et al., "Demonstrating oxygen loss and associated structural reorganization in the lithium battery cathode Li [Ni0. 2Li0. 2Mn0. 6] O2." Journal of the American Chemical Society 128.26 (2006): 8694-8698.
Asakura et al., "Material/element-dependent fluorescence-yield modes on soft X-ray absorption spectroscopy of cathode materials for Li-ion batteries." AIP Advances 6.3 (2016): 035105. 9 pages.
Bruce et al., "Li-O2 and Li-S batteries with high energy density." Nat. Mater 11 (2012): 19-29.
Chen et al., "Lithium extraction mechanism in Li-Rich Li2MnO3 involving oxygen hole formation and dimerization." Chemistry of Materials 28.18 (2016): 6656-6663.
Cho et al., "A new type of protective surface layer for high-capacity Ni-based cathode materials: nanoscaled surface pillaring layer." Nano Letters13.3 (2013): 1145-1152.
Dai et al., "High reversibility of lattice oxygen redox quantified by direct bulk probes of both anionic and cationic redox reactions." Joule 3.2 (2019): 518-541.
De Biasi et al., "Chemical, Structural, and Electronic Aspects of Formation and Degradation Behavior on Different Length Scales of Ni-Rich NCM and Li-Rich HE-NCM Cathode Materials in Li-Ion Batteries." Advanced Materials 31.26 (2019): 1900985. 24 pages.
Freunberger et al., "Reactions in the rechargeable lithium-O2 battery with alkyl carbonate electrolytes." Journal of the American Chemical Society 133.20 (2011): 8040-8047.
Genevois et al., "Insight into the atomic structure of cycled lithium-rich layered oxide Li1.20Mn0. 54Co0. 13Ni0. 13O2 using HAADF STEM and electron nanodiffraction." The Journal of Physical Chemistry C 119.1 (2014): 75-83.
Gent et al., "Coupling between oxygen redox and cation migration explains unusual electrochemistry in lithium-rich layered oxides." Nature communications 8.1 (2017): 2091. 12 pages.
Guo et al., "Surface coating of lithium-manganese-rich layered oxides with delaminated MnO 2 nanosheets as cathode materials for Li-ion batteries." Journal of Materials Chemistry A 2.12 (2014): 4422-4428.
Hatsukade et al., "Origin of carbon dioxide evolved during cycling of nickel-rich layered NCM cathodes." ACS applied materials & interfaces 10.45 (2018): 38892-38899.
Hou et al., "Core-shell and concentration-gradient cathodes prepared via co-precipitation reaction for advanced lithium-ion batteries." Journal of Materials Chemistry A 5.9 (2017): 4254-4279.
Hu et al., "Evolution of redox couples in Li-and Mn-rich cathode materials and mitigation of voltage fade by reducing oxygen release." Nature Energy 3.8 (2018): 690. 9 pages.
Hy et al., "Direct In situ observation of Li2O evolution on Li-Rich high-capacity cathode material, Li [Ni x Li (1-2 x)/3Mn (2-x)/3] O2 (0≤x≤0.5)." Journal of the American Chemical Society 136.3 (2014): 999-1007.
Hy et al.,"Performance and design considerations for lithium excess layered oxide positive electrode materials for lithium ion batteries." Energy & Environmental Science 9.6 (2016): 1931-1954.
Imhof et al., "Oxidative Electrolyte Solvent Degradation in Lithium-Ion Batteries: An In Situ Differential Electrochemical Mass Spectrometry Investigation." Journal of The Electrochemical Society 146.5 (1999): 1702-1706.
International Search Report and Written Opinion in International Patent Application No. PCT/US2019/062039 dated Feb. 12, 2020, 11 pages.
Jung et al., "Oxygen release and its effect on the cycling stability of LiNixMnyCozO2 (NMC) cathode materials for Li-ion batteries." Journal of The Electrochemical Society 164.7 (2017): A1361-A1377.
Kang et al., "Electrodes with high power and high capacity for rechargeable lithium batteries." Science 311.5763 (2006): 977-980.
Kang et al., "The effects of acid treatment on the electrochemical properties of 0.5 Li2MnO3? 0.5 LiNi0. 44Co0. 25Mn0. 31O2 electrodes in lithium cells." Journal of The Electrochemical Society 153.6 (2006): A1186-A1192.
Kim et al., "A stable lithium-rich surface structure for lithium-rich layered cathode materials." Nature communications 7 (2016): 13598. 8 pages.
Lee et al., "Mitigating oxygen loss to improve the cycling performance of high capacity cation-disordered cathode materials." Nature communications 8.1 (2017): 981. 10 pages.
Lee et al., "Structural and chemical evolution of the layered Li-excess LixMnO3 as a function of Li content from first-principles calculations." Advanced Energy Materials 4.15 (2014): 1400498. 8 pages.
Li et al., "Interface and surface cation stoichiometry modified by oxygen vacancies in epitaxial manganite films." Advanced Functional Materials 22.20 (2012): 4312-4321.
Li et al., "Quantitative probe of the transition metal redox in battery electrodes through soft x-ray absorption spectroscopy." Journal of Physics D: Applied Physics 49.41 (2016): 413003. 15 pages.
Liebertz et al., "Phase behaviour of Li2MoO4 at high pressures and temperatures." Solid State Communications 5.5 (1967): 405-409.
Lim et al., "Advanced Concentration Gradient Cathode Material with Two‐Slope for High‐Energy and Safe Lithium Batteries." Advanced Functional Materials 25.29 (2015): 4673-4680.
Loomer et al., "Manganese valence imaging in Mn minerals at the nanoscale using STEM-EELS." American Mineralogist 92.1 (2007): 72-79.

(56) References Cited

OTHER PUBLICATIONS

Lu et al., "Nanoscale coating of LiMO2 (M=Ni, Co, Mn) nanobelts with Li+-conductive Li2TiO3: toward better rate capabilities for Li-ion batteries." Journal of the American Chemical Society 135.5 (2013): 1649-1652.
Luo et al., "Anion redox chemistry in the cobalt free 3d transition metal oxide intercalation electrode Li [Li0. 2Ni0. 2Mn0. 6] O2." Journal of the American Chemical Society138.35 (2016): 11211-11218.
Luo et al., "Charge-compensation in 3d-transition-metal-oxide intercalation cathodes through the generation of localized electron holes on oxygen." Nature chemistry 8.7 (2016): 684. 8 pages.
Luo et al., "One-pot synthesis of lithium-rich cathode material with hierarchical morphology." Nano letters 16.12 (2016): 7503-7508.
McCloskey et al., "Solvents' critical role in nonaqueous lithium-oxygen battery electrochemistry." The Journal of Physical Chemistry Letters 2.10 (2011): 1161-1166.
Moser et al., "Re-determination of the pseudobinary system Li2O-MoO3." Crystal Research and Technology Journal of Experimental and Industrial Crystallography 43.4 (2008): 350-354.
Nakamura et al., "Defect chemical studies on oxygen release from the Li-rich cathode material Li 1.2 Mn 0.6 Ni 0.2 O 2-σ." Journal of materials chemistry A 7.9 (2019): 5009-5019.
Oishi et al., "Direct observation of reversible oxygen anion redox reaction in Li-rich manganese oxide, Li 2 MnO 3, studied by soft X-ray absorption spectroscopy." Journal of Materials Chemistry A 4.23 (2016): 9293-9302.
Okuoka et al., "A new sealed lithium-peroxide battery with a Co-doped Li 2 O cathode in a superconcentrated lithium bis (fluorosulfonyl) amide electrolyte." Scientific reports 4 (2014): 5684. 6 pages.
Qiao et al., "Direct evidence of gradient Mn (II) evolution at charged states in LiNi0. 5Mn1. 5O4 electrodes with capacity fading." Journal of Power Sources 273 (2015): 1120-1126.
Qiao et al., "Direct experimental probe of the Ni (II)/Ni (III)/Ni (IV) redox evolution in LiNi0. 5Mn1. 5O4 electrodes." The Journal of Physical Chemistry C 119.49 (2015): 27228-27233.
Qiu et al., "Gas-solid interfacial modification of oxygen activity in layered oxide cathodes for lithium-ion batteries." Nature communications 7.1 (2016): 1-10.
Risch et al., "Redox processes of manganese oxide in catalyzing oxygen evolution and reduction: an in situ soft X-ray absorption spectroscopy study." The Journal of Physical Chemistry C 121.33 (2017): 17682-17692.
Rozier et al., "Li-rich layered oxide cathodes for next-generation Li-ion batteries: chances and challenges." Journal of The Electrochemical Society162.14 (2015): A2490-A2499.
Seo et al., "The structural and chemical origin of the oxygen redox activity in layered and cation-disordered Li-excess cathode materials." Nature chemistry 8.7 (2016): 692. 7 pages.
Singer et al., "Nucleation of dislocations and their dynamics in layered oxide cathode materials during battery charging." Nature Energy 3.8 (2018): 641-647.
Sun et al., "A Novel Cathode Material with a Concentration? Gradient for High?Energy and Safe Lithium?Ion Batteries." Advanced Functional Materials 20.3 (2010): 485-491.
Sun et al., "Nanostructured high-energy cathode materials for advanced lithium batteries." Nature materials 11.11 (2012): 942-947.
Tian et al., "Depth-dependent redox behavior of LiNi0. 6Mn0. 2Co0. 2O2." Journal of The Electrochemical Society 165.3 (2018): A696-A704.
Tran et al., "Mechanisms associated with the "plateau" observed at high voltage for the overlithiated Li1. 12 (Ni0. 425Mn0. 425Co0. 15) 0.88 O2 system." Chemistry of Materials 20.15 (2008): 4815-4825.
Venkatraman et al., "Phase Relationships and Structural and Chemical Stabilities of Charged Li1-x CoO2-σ and Li1-x Ni0. 85Co0. 15 O 2-σ Cathodes." Electrochemical and solid-state letters 6.1 (2003): A9-A12.

\* cited by examiner

| Li | Mo | Mn | Ni | Co |
|---|---|---|---|---|
| 2.013 | 1 | <0.001 | <0.001 | <0.001 |

FIG. 4D

|  | Gₐ ||||| Gₐ |||||
|---|---|---|---|---|---|---|---|---|---|---|
|  | Li | Mn | Ni | Co | | Li | Mn | Ni | Co | Mo |
| 30 ug/mL (particle) | 1.215 | 0.478 | 0.158 | 0.165 | | 1.165 | 0.475 | 0.155 | 0.166 | <0.001 |
| | 1.224 | 0.483 | 0.156 | 0.161 | | 1.175 | 0.479 | 0.160 | 0.161 | <0.001 |
| 20 ug/mL (particle) | 1.216 | 0.476 | 0.163 | 0.161 | | 1.172 | 0.484 | 0.159 | 0.159 | <0.001 |
| | 1.227 | 0.483 | 0.157 | 0.158 | | 1.180 | 0.481 | 0.163 | 0.158 | <0.001 |
| Mean | 1.221 | 0.480 | 0.159 | 0.161 | | 1.173 | 0.480 | 0.159 | 0.161 | |
| Standard deviation | 0.003 | 0.002 | 0.002 | 0.001 | | 0.003 | 0.002 | 0.002 | 0.002 | |

FIG. 7B

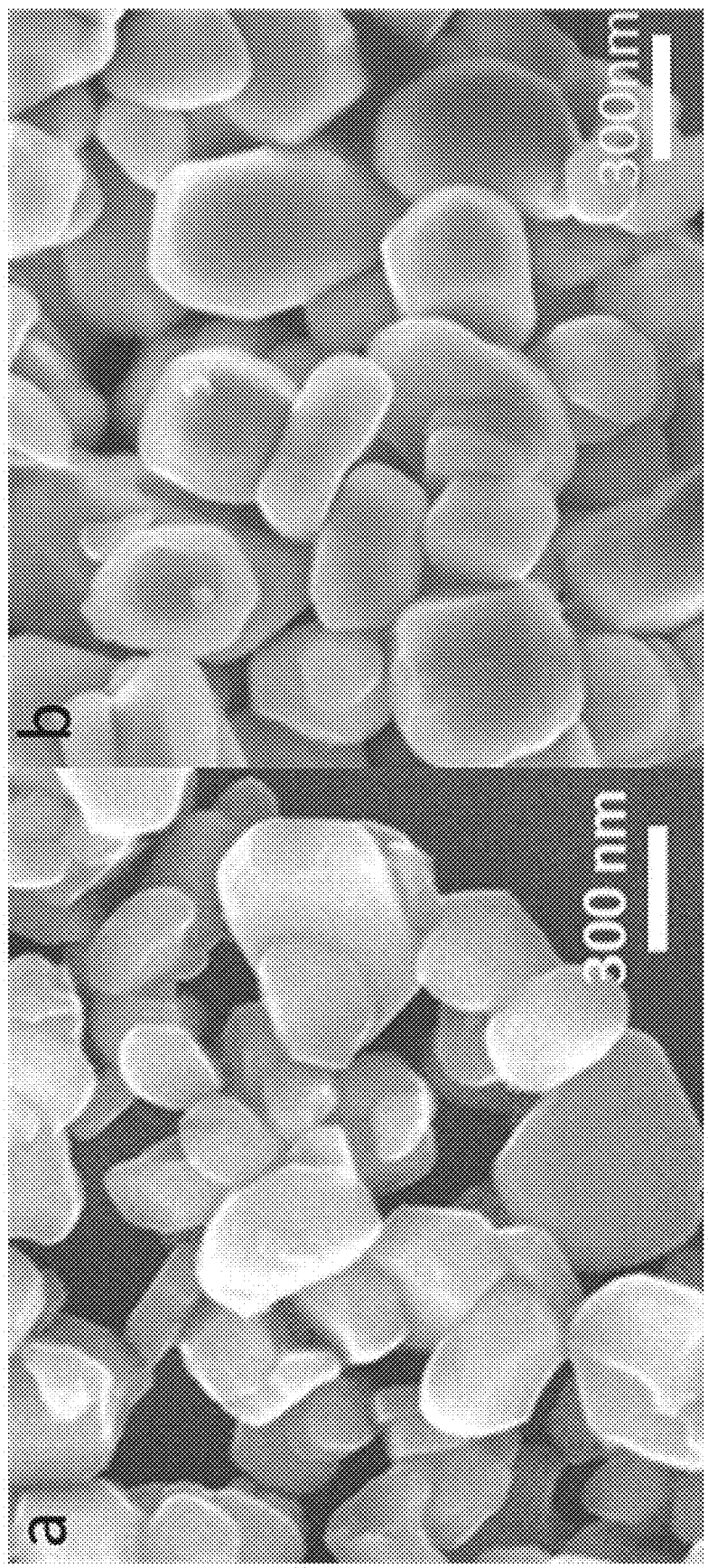

|  | Li | Mn | Ni | Co |
|---|---|---|---|---|
| 30 ug/mL (particle) | 1.197 | 0.484 | 0.156 | 0.160 |
| | 1.206 | 0.479 | 0.162 | 0.159 |
| 20 ug/mL (particle) | 1.199 | 0.480 | 0.159 | 0.161 |
| | 1.205 | 0.477 | 0.158 | 0.165 |
| Mean | 1.202 | 0.480 | 0.159 | 0.161 |

FIG. 12

LITHIUM TRANSITION METAL OXIDE PARTICLES HAVING LITHIUM CONCENTRATION GRADIENTS, METHODS FOR FORMING THE SAME, AND BATTERY CATHODES FORMED OF THE SAME

CROSS-REFERENCE TO RELATED PATENT APPLICATION(S)

The present application claims priority to U.S. provisional application No. 62/796,804, filed on Jan. 25, 2019, entitled "LITHIUM TRANSITION METAL OXIDE PARTICLES HAVING LITHIUM CONCENTRATION GRADIENTS, METHODS FOR FORMING THE SAME, AND BATTERY CATHODES FORMED OF SAME," which is incorporated herein by reference in its entirety.

GOVERNMENT SUPPORT STATEMENT

This invention was made with Government support under Grant No. ECCS-1610806 awarded by the National Science Foundation (NSF). The Government has certain rights in this invention.

BACKGROUND

Advances in battery technology have resulted in lithium (Li) ion batteries that are approaching the energy density limits (~700 Wh/kg) of conventional lithium (Li) transition-metal oxide ($LiMO_2$, M=Ni, Co, Mn) cathodes. Further increases to the energy density of a Li ion battery are thus dependent, in part, on improvements to the cathode, such as a higher compressed density, use of new chemistries, and more efficient use of electrolyte. Several candidate cathode technologies have been proposed including, but not limited to a purely anion-redox (PAR) cathode and a hybrid anion- and cation-redox (HACR) cathode.

A PAR cathode provides capacity to the battery based purely on anionic redox reactions. Various types of PAR cathodes have been demonstrated including a $Li_nS$ cathode and a $Li_nO$ cathode. The PAR cathode is, in principle, able to achieve a high theoretical gravimetric energy density (>1500 Wh/kg). However, PAR cathodes typically suffer from hysteric conversion-reaction kinetics, large electrolyte usage (e.g., the weight of the electrolyte is often greater than the PAR cathode), low compressed density, and low volumetric energy density. These limitations have limited the deployment of PAR cathodes in Li batteries.

On the other hand, a HACR cathode utilizes a combination of anionic and cationic redox reactions to provide capacity to the battery. Compared to a PAR cathode, the HACR cathode is typically able to exhibit a higher initial energy density and compressed density. In one example, a HACR cathode may be based on a Li-rich transition metal oxide ($Li_{1+x}M_{1-x}O_2$ or abbreviated as LXMO) with a layered crystal structure. It should be appreciated that the LXMO used in the HACR cathode is distinguished from conventional transition metal oxide materials by having an excess amount of Li.

For instance, a LXMO particle may exhibit a lattice structure that is a solid solution or a fine-phase mixture of $Li_2MnO_3$ and $LiMn_aNi_bCo_{1-a-b}O_2$ (NMC) lattice motifs with Li layer (LiL) and transition-metal layer (TML) cation sites. Within the $Li_2MnO_3$ motif, ⅓ of the Mn ions in the TML are replaced by Li ions, resulting in large amounts of axial Li—O—Li configurations (where each O is bonded to 6 Li/M). In this configuration, certain $O_{2p}$ orbitals may be less covalently hybridized with the transition metal (M) d orbitals, resulting in a higher energy level compared to 100% Li—O-M axes (as in NMC). These oxygen anions in LXMO may be more readily oxidized when the material is charged, which results in contributions to capacity when cycling the battery.

SUMMARY

The Inventors have recognized and appreciated that a HACR cathode is an attractive replacement for conventional transition-metal oxide cathodes in Li-ion batteries because HACR cathodes are able to provide a higher gravimetric and volumetric energy density, a higher compressed density, and less consumption of electrolyte. However, the Inventors have also recognized previous HACR cathodes typically suffered from poor cycling capacity and voltage fading due, in part, to irreversibilities associated with the anionic redox reactions. These irreversibilities are caused, in part, by the loss of anions (e.g., oxygen anions) from the cathode during cycling, which leads to the formation of structural defects. Over time, the structural defects cause the cathode to structurally collapse.

The present disclosure is thus directed to various inventive implementations of a transition metal oxide particle for a cathode with a Li-rich core region and a Li-poor surface region disposed around the core region and various methods for making the transition metal oxide particle. The Li-rich core region (e.g., $Li_{1.2}M_{0.8}O_2$) provides capacity to the particle from both anionic-redox (e.g., oxygen anions) and cationic-redox (e.g., lithium cations) contributions. The Li-poor surface region (e.g., $Li_{0.95}M_{1.05}O_2$) substantially reduces or, in some instances, mitigates anionic-redox activity, thus preventing the loss of anions from the cathode. The Li-poor surface region may also enhance electronic conductivity due to a higher polaron mobility (e.g., a higher M concentration with reduced valence increases polaron mobility), thus providing pathways for Li and electron transport from the core region to the surface of the particle. In this manner, the transition metal oxide particle provides enhanced capacity via HACR while substantially reducing the degradation to cycling performance (e.g., decay in capacity and voltage) by preventing anions from escaping the cathode during cycling.

The particle may also include a gradient region located between the surface region and the core region. The gradient region may have a Li concentration profile that varies from the larger Li concentration in the core region to the smaller Li concentration in the surface region. In some implementations, the Li concentration profile of the gradient region may vary in a substantially monotonic, continuous, and/or smooth manner. A gradual variation in Li concentration and/or a substantially single crystalline lattice may improve the structural stability and suppress the mobility of transition metal ions and anions (e.g., oxygen). For example, a Li gradient may be able to better accommodate stress and fatigue caused by cyclic insertion/extraction of lithium from the lattice.

In some implementations, the particle may be formed from a transition metal oxide with a layered lattice structure. The variation in Li concentration between the core and surface regions of the particle may be achieved by substituting M ions with Li ions or vice-versa. For example, the Li-poor surface region may be formed by substituting Li ions with M ions in the Li layers. The Li-rich core region may be formed by substituting M ions with Li ions in the transition metal layers. In this manner, a gradient in the Li concentration may also be represented as a gradient in the M concentration. In some implementations, the substitution of Li ions with M ions in the surface region may also provide additional structural support. For example, the M ions may act as "pillars" that prevent the surface region from collapsing when Li ions are extracted from the lattice during a charging cycle.

In one aspect, the core region, the surface region, and the gradient region may form a coherent lattice (i.e., a continuous lattice where each region is lattice-matched). This may be accomplished, in part, by using a high temperature leaching method to form the particle. The exposure of the particle to high temperatures may anneal away lattice defects (e.g., vacancies, dislocations), which are typically created when removing lithium and/or other species from the lattice to form the Li gradient. The coherent lattice may increase the Li and electronic conductivities of the particle, which are typically limited by the presence of grain/phase boundaries in the material.

In another aspect, a cathode for a battery may include one or more of the transition metal oxide particles described herein. For example, a cathode formed from a LX(r)MO material may be paired with a $Li_4Ti_5O_{12}$ anode in a capacity-matched full cell. For commercial applications, such batteries typically operate under lean electrolyte conditions (i.e., the amount of liquid electrolyte used is small) at 2 g/Ah. The liquid electrolyte typically contains carbonate, which may be readily oxidized in the presence of free oxygen. Therefore, the substantial reduction to oxygen loss from the particles described herein may increase the lifetime of a full-cell battery, in part, by substantially reducing the consumption of electrolyte via reduction to carbonate oxidation.

In one exemplary implementation, a lithium (Li) transition metal (M) oxide particle includes a core region with a first Li concentration that is greater than a stoichiometric Li concentration in the lithium transition metal oxide particle, a surface region, surrounding the core region, with a second Li concentration that is less than the stoichiometric Li concentration in the lithium transition metal oxide particle, and a gradient region, disposed between the core region and the surface region, with a Li concentration profile that varies from the first Li concentration to the second Li concentration.

In another exemplary implementation, a transition metal (M) oxide particle includes a core region with a first M concentration that is less than a stoichiometric M concentration in the transition metal oxide, a surface region, surrounding the core region, with a second M concentration that is greater than the stoichiometric M concentration in the transition metal oxide, and a gradient region, disposed between the core region and the surface region, with an M concentration profile that varies from the first M concentration to the second M concentration. The first M concentration and the second M concentration are formed by substituting at least some M ions with alkali metal ions and/or at least some alkali metal ions with M ions.

In another exemplary implementation, a cathode for a battery includes a plurality of particles where at least some of the plurality of particles includes a core region with a first lithium (Li) concentration greater than a stoichiometric Li concentration in the transition metal oxide, a surface region, surrounding the core region, with a second Li concentration less than the stoichiometric Li concentration in the transition metal oxide, and a gradient region, disposed between the core region and the surface region, with a Li concentration profile that varies from the first Li concentration to the second Li concentration in a substantially smooth and continuous manner. The core region substantially facilitates oxygen anion redox activity and the surface region substantially mitigates oxygen redox and loss to an electrolyte of the battery when the electrolyte is present in the battery It should be appreciated that all combinations of the foregoing concepts and additional concepts discussed in greater detail below (provided such concepts are not mutually inconsistent) are contemplated as being part of the inventive subject matter disclosed herein. In particular, all combinations of claimed subject matter appearing at the end of this disclosure are contemplated as being part of the inventive subject matter disclosed herein. It should also be appreciated that terminology explicitly employed herein that also may appear in any disclosure incorporated by reference should be accorded a meaning most consistent with the particular concepts disclosed herein.

BRIEF DESCRIPTION OF DRAWINGS

The skilled artisan will understand that the drawings primarily are for illustrative purposes and are not intended to limit the scope of the inventive subject matter described herein. The drawings are not necessarily to scale; in some instances, various aspects of the inventive subject matter disclosed herein may be shown exaggerated or enlarged in the drawings to facilitate an understanding of different features. In the drawings, like reference characters generally refer to like features (e.g., functionally similar and/or structurally similar elements).

FIG. 4D shows a table of ICP-AES results for a filtered solution.

FIG. 7B shows a table of ICP-AES results for $G_0$ and $G_4$ samples.

FIG. 8B shows a SEM image of pristine $Li_{1.2}Mn_{0.48}Co_{0.16}Ni_{0.16}O_2$ particles.

FIG. 8C shows a SEM image of $Li_{1.2}Mn_{0.48}Co_{0.16}Ni_{0.16}O_2$ particles after $MoO_3$ leaching and washing in water.

FIG. 12 shows a table of ICP-AES results for G0 after water-washing at 70° C.

DETAILED DESCRIPTION

Figure 1A:
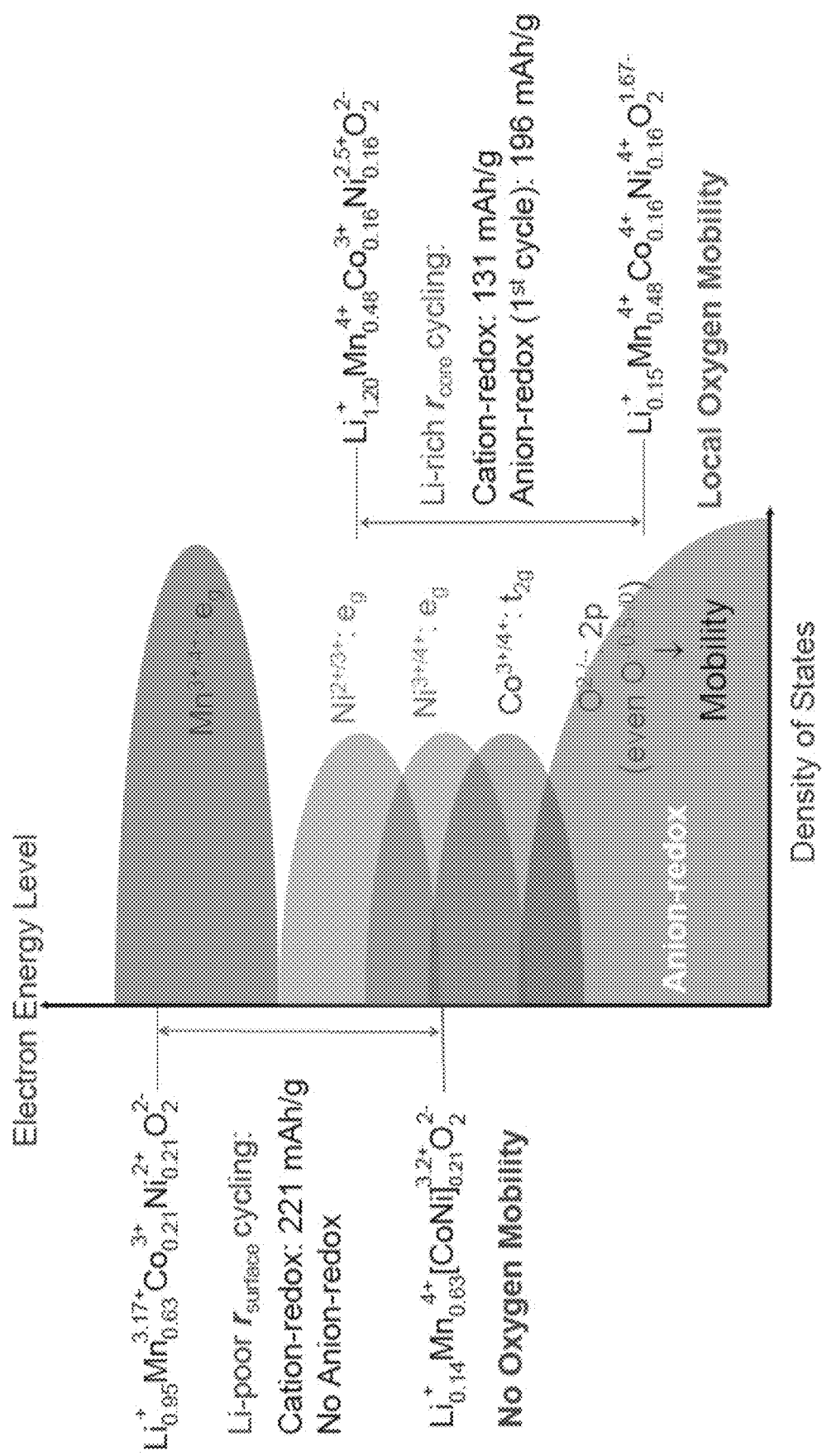
FIG. 1A shows the density of states as a function of the electron energy level comparing the cationic and anionic redox behavior of a Li-rich core region and a Li-poor surface region in a $Li_{1+x(r)}M_{1-x(r)}O_2$ particle.

Following below are more detailed descriptions of various concepts related to, and implementations of, a transition metal oxide particle for a cathode in a battery. Specifically, various aspects of a core region, a surface region, and a gradient region of the transition metal oxide particle and methods for making the transition metal oxide are described herein. It should be appreciated that various concepts introduced above and discussed in greater detail below may be implemented in multiple ways. Examples of specific implementations and applications are provided primarily for illustrative purposes so as to enable those skilled in the art to practice the implementations and alternatives apparent to those skilled in the art.

The figures and example implementations described below are not meant to limit the scope of the present implementations to a single embodiment. Other implementations are possible by way of interchange of some or all of the described or illustrated elements. Moreover, where certain elements of the disclosed example implementations may be partially or fully implemented using known components, in some instances only those portions of such known components that are necessary for an understanding of the present implementations are described, and detailed descriptions of other portions of such known components are omitted so as not to obscure the present implementations.

In the discussion below, various examples of inventive transition metal oxide particles are provided, wherein a given example or set of examples showcases one or more particular features of a core region, a surface region, a gradient region, a cathode having one or more transition metal oxide particles, and/or a battery having one or more transition metal oxide particles. It should be appreciated that one or more features discussed in connection with a given example of a transition metal oxide particle, cathode, and/or battery may be employed in other examples of transition metal oxide particles, cathodes, and/or batteries according to the present disclosure, such that the various features disclosed herein may be readily combined in a given system according to the present disclosure (provided that respective features are not mutually inconsistent).

1. Previous HACR Cathodes

A HACR cathode relies upon contributions from both anionic-redox reactions and cationic-redox reactions to enhance the energy density of the cathode. For example, LXMO typically uses a large amount of O redox to achieve a high capacity ~300 mAh/g. For $Li_{1.20}Mn_{0.48}Co_{0.16}Ni_{0.16}O_2$, M typically contributes ~125 mAh/g during the first charge due to the high initial average valence of M ((4−1.2)/0.8=3.5+) and O may contribute as much as ~203 mAh/g. However, irreversibilities associated with the anionic redox reactions have previously led to a substantial decline in the cycling performance of the battery.

Previous studies have shown that the migration barrier of $O^-$ is 0.9 eV while $O^{2-}$ is 2.3-4 eV in $Li_2MnO_3$. When oxygen anions are oxidized (e.g., $O^{2-} \rightarrow O^{\alpha-}$ where $\alpha<2$ corresponds to peroxide or super-oxide like oxygen) and the battery is charged at high voltages (e.g., >4.3V versus $Li^+/Li$), the oxidized oxygen ions become more mobile enabling dimerization, rearrangement of surrounding M cations, and/or complex, coordinated motion of anion species in the cathode. The migration of oxygen within the cathode (also referred to herein as local oxygen mobility (LOM)) is a result of utilizing the anion-redox reactions under high voltage to increase the energy density of the battery.

The changes to the structural morphology of the cathode caused by LOM, however, do not cause the irreversibilities that lead to poor cycling performance in HACR cathodes, as evidenced by previous demonstrations of lithium-sulfur or lithium-oxygen conversion cathodes that were able to undergo thousands of cycles despite dramatic local atomic structural rearrangements. Rather, the irreversibilities associated with the anionic redox reactions are due to the loss of oxygen from the cathode (also referred to herein as global oxygen mobility (GOM)). In other words, when the oxygen anions are sufficiently mobile, they may migrate from the interior of the cathode particle (typically ~$10^2$ nm in size) to the surface of the particle. The oxygen anions are then able to escape the cathode particle after contacting the electrolyte.

The loss of oxygen from the cathode may result in the formation of oxygen vacancies, transition metal (M) co-migration, and structural collapse. These effects are accumulative resulting in a continuous voltage decay and the consumption of electrolyte. Additionally, the release of oxygen into the electrolyte may lead to oxidation of the limited carbonate-based electrolyte used in a full cell (generally 30-40 wt % of the cathode), resulting in the rapid degradation of the full cell battery.

The structural collapse of a uniformly Li-rich LXMO particle typically starts at the surface due to delithiation preferentially occurring at the surface when charging the battery. Compared to the Li+ on the surface, the Li+ in the bulk has to overcome numerous transport barriers between tetrahedral and octahedral sites in the Li-layer (LiL) to get to the surface. This results in an over-potential that causes the over-oxidation and subsequent loss of oxygen at the surface. The creation of oxygen vacancies at the surface of the LXMO particle coincides with the nucleation of structural defects. As the battery is cycled, oxygen is continually released resulting in continuous M reduction and oxygen void formation that allow the structural defects to propagate into the bulk of the LXMO particle. Eventually, the structural defects cause the LXMO particle to structurally collapse (e.g., crack). This mechanism is regarded as the primary cause for the voltage decay during cycling of LXMO.

Previous studies have used metal oxide (e.g., spinel, olivine phases) coatings and/or other surface treatments (e.g., acid leaching to introduce metal oxide spinel phases at the particle surface) to reduce the release of oxygen. However, these efforts failed to resolve and, in some cases, further exacerbated the voltage fading limitations of LXMO.

For example, coatings reduced the rate performance due to the loss of lattice coherency and the introduction of phase boundaries. Previous studies used coherent coatings to increase Li diffusion in conventional Li-metal oxides (LMO) with only a few reports of coatings being used for Li-rich particles. However, coatings (including coatings with the same structure as the bulk of the material) typically use a different component than the bulk. Thus, it is typically not feasible to achieve lattice coherency between the core region and the surface region of a cathode particle because the different components do not have the same lattice constant even if the respective components have layered structures. This gives rise to relatively sharp phase boundaries between the shell and the core. Such phase boundaries may facilitate M and/or O global migration and increase the impedance.

In another example, acid leaching treatments were used to remove certain components of the cathode material in order to improve electrochemical performance. However, acid leaching typically damages the structure of the cathode since acid leaches Li and dissolves transition metals resulting in cavities, defects and phase boundaries within the particles. Such defects are not removable even with an additional high-temperature annealing process. As a result, such materials exhibited substantial voltage and capacity decay due to the phase boundaries being unable to prevent global mobility of transition metal ions and/or oxygen ions (in some cases GOM was enhanced).

2. A Transition Metal Oxide Particle for a HACR Cathode

In order to overcome the limitations of previous HACR cathodes, a lithium (Li) transition metal (M) oxide particle (i.e., $Li_{1+X(r)}M_{1-X(r)}O_2$) may be formed where the intrinsic Li concentration is varied between the surface and the bulk preferably without disrupting the crystalline structure of the particle. For instance, FIG. 1A shows a chart of the density of states as a function of the electron energy level for a lithium (Li) transition metal (M) oxide particle where M includes manganese (Mn), nickel (Ni), and cobalt (Co). The particle may have a layered structure that include a Li layer (LiL) and a transition-metal layer (TML).

As shown, a reduction to the Li concentration (e.g., by reducing Li in the TML and/or substituting Li with M in the LiL) near the surface causes the M valence to decrease locally resulting in an upwards shift to the range of electron energy levels occupied between charged and uncharged states. This upward shift reduces anionic-redox activity (i.e., shifting away from the high density of states of $O^{2-/-}$) and enhances cationic-redox activity (i.e., shifting towards the high density of states of $Mn^{3+/4+}$). In some implementations, the reduction to the Li concentration and the corresponding decrease to the M valence (e.g., X<0 near the surface resulting in a "Li-poor" surface region and the initial M valence decreases to below +3), may substantially reduce or, in some instances, mitigate anionic-redox activity. This, in turn, results in a reduction to the concentration of mobile $O^{\alpha-}$ ($\alpha$<2), thus stabilizing the oxygen at the surface and substantially reducing or, in some instances, mitigating the loss of oxygen anions (e.g., suppressing GOM) from the particle during cycling.

Conversely, FIG. 1A also shows that an increase to the Li concentration (e.g., by increasing Li in the LiL and/or substituting M with Li in the TML) in the bulk of the particle causes the M valence to increase locally resulting in a downwards shift to the range of electron energy levels occupied between the charged and uncharged states. The downwards shift enhances anionic-redox activity and reduces cationic-redox activity (at least with respect to the Li-poor surface). In some implementations, the increase to the Li concentration (e.g., X>0 in the bulk resulting in a "Li-rich" core region) may result in appreciable contributions from both anion-redox and cation-redox to the capacity of the particle.

Figure 1B:
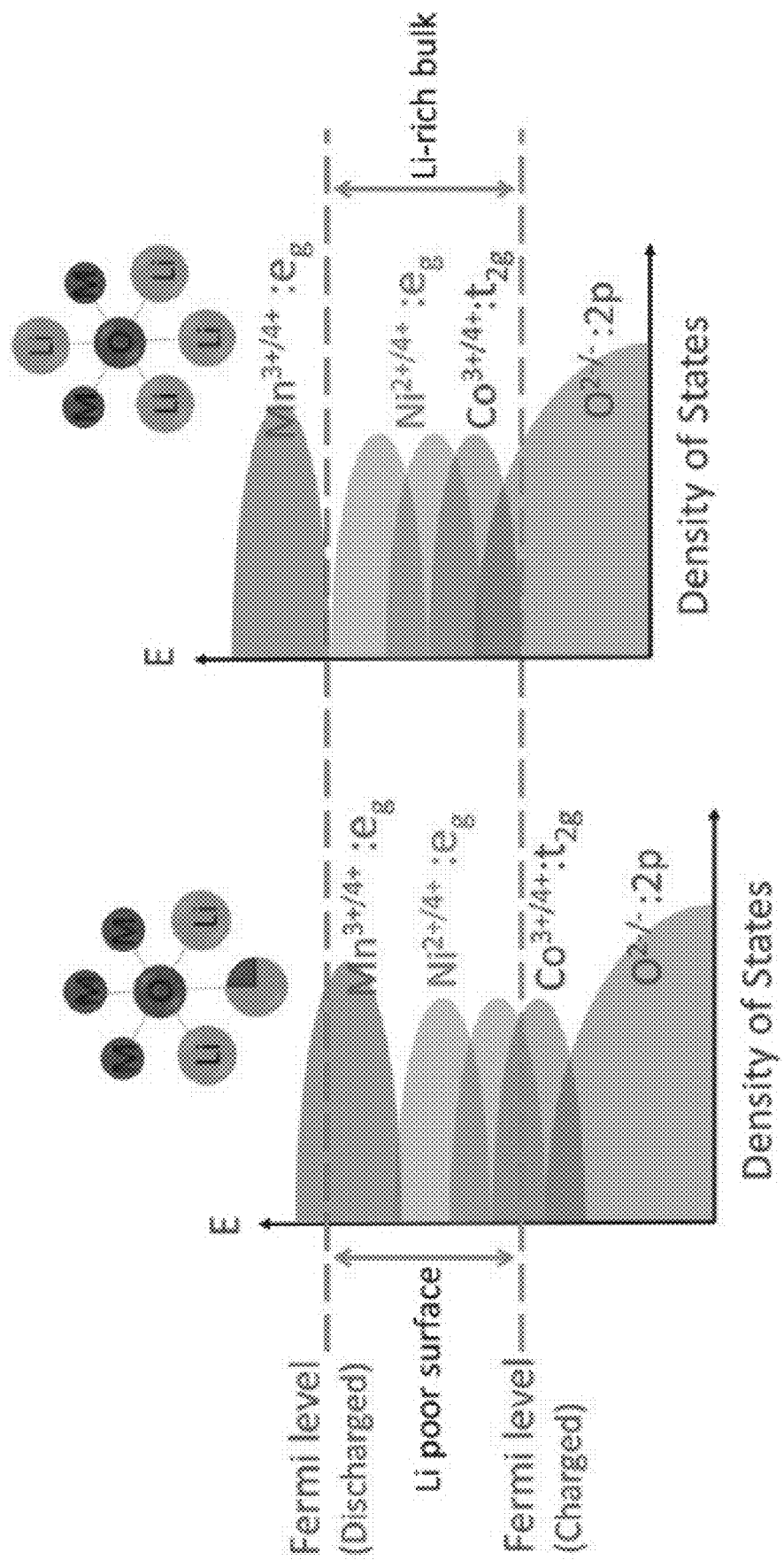
FIG. 1B shows a representation of an energy band diagram based on the Li-poor surface region (left) and the Li-rich core region (right) of FIG. 1A.

FIG. 1B further shows the alignment of the respective Fermi levels between the surface and core regions for the charged and discharged states of the particle. As shown, anionic-redox activity at the Li-poor surface region of the particle may be suppressed during both charge and discharge cycles while the Li-rich core region is able to leverage anionic-redox activity to enhance the capacity. In this manner, a transition metal oxide particle having a Li-rich core region that provides HACR and a Li-poor surface that inhibits anion-redox activity to prevent anion loss may provide a higher capacity compared to conventional cathode materials without suffering from the degradation observed in previous HACR cathodes.

Figure 1C:
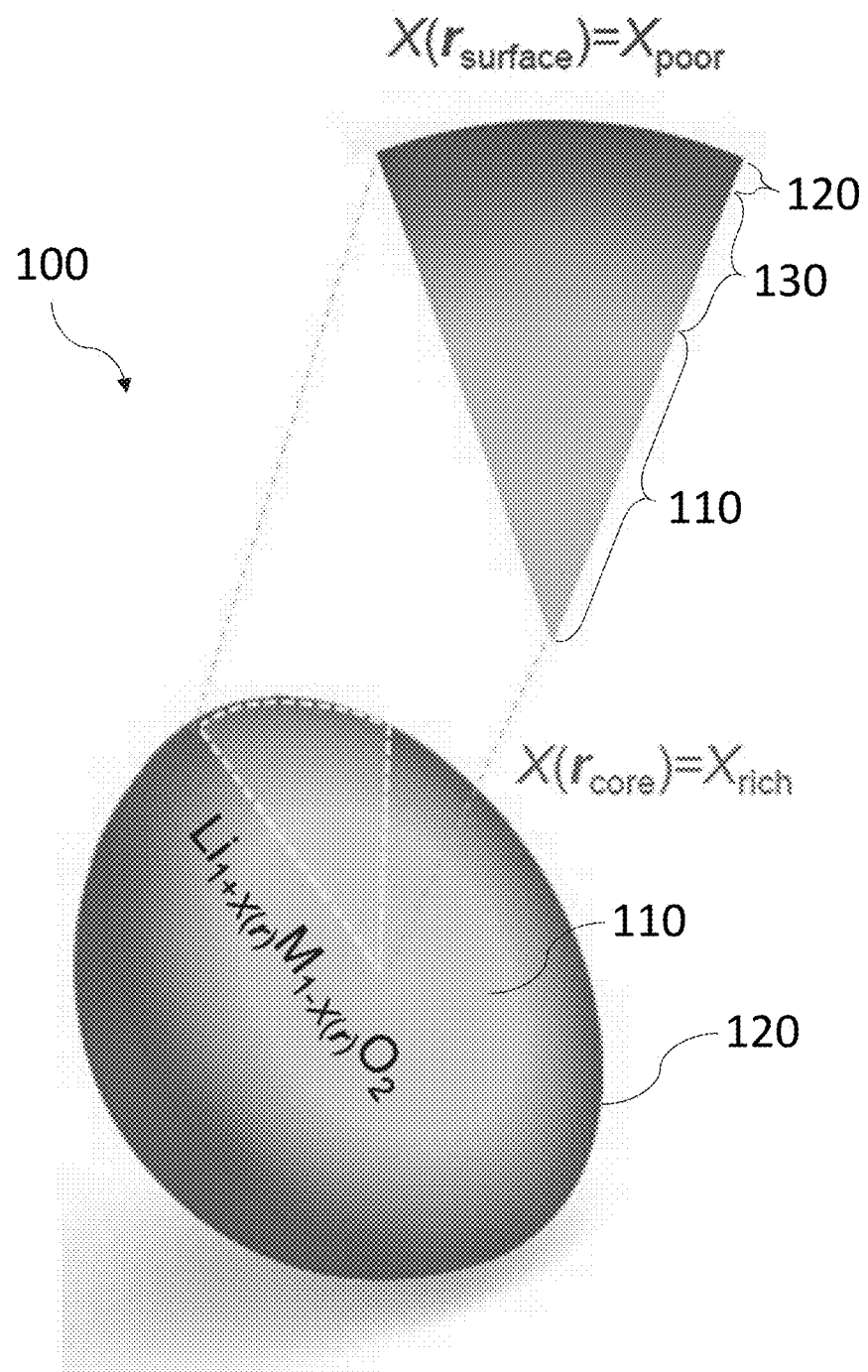
FIG. 1C shows a cross-sectional view of an exemplary transition metal oxide particle (e.g., $Li_{1+x(r)}M_{1-x(r)}O_2$) for a HACR cathode. The darker shade indicates the portion of the particle has more M and less Li.

FIG. 1C shows a cross-sectional view of an exemplary lithium transition metal oxide particle 100 (also referred to herein as a "particle"). As shown, the particle 100 may include a core region 110 (also referred to herein as a "bulk region") and a surface region 120 surrounding the core region 110. The core region 110 and the surface region 120 may have first and second Li concentrations, respectively. The particle 100 may also include a gradient region 130 between the core region 110 and surface region 120 with a Li concentration profile that varies from the first Li concentration to the second Li concentration.

The particle 100 may generally have various shapes including, but not limited to a sphere, an ellipsoid, a polyhedron, and any combination of the foregoing. The size of the particle 100 may be defined according to a characteristic length (e.g., a diameter of a sphere). The characteristic length may be chosen based on various factors associated with a cathode containing one or more particles 100 including, but not limited to the energy density (e.g., a larger size particle), the power density (e.g., a smaller size particle), and the compressed density. In some implementations, the characteristic length of the particle 100 may vary between about 100 nm to about 1 µm.

As described above, the core region 110 may support both anion- and cation-redox activity to enhance the capacity of the particle 100. This may be accomplished, in part, by increasing the Li concentration above a stoichiometric concentration of the transition metal oxide used to form the particle 100. For example, the particle 100 may be formed from a transition metal oxide of the form $Li_{1+X(r)}M_{1-X(r)}O_2$ where X(r) represents the relative concentrations of Li and M as a function of the radial position (or depth), r, of the particle 100). The higher Li concentration in the core region 110 may correspond to X>0 (i.e., a Li-rich core region 110).

The surface region 120 is used to suppress anion-redox activity in order to suppress anion mobility and, hence, prevent anion loss. However, it should be appreciated that the surface region 120 may also contribute to the capacity of the particle 100 via enhanced cation-redox activity as shown in FIG. 1A. The suppression of anion-redox activity may be accomplished, in part, by decreasing the Li concentration below a stoichiometric concentration of the transition metal oxide used to form the particle 100. For the transition metal oxide $Li_{1+X(r)}M_{1-X(r)}O_2$, a lower Li concentration may correspond to X<0 (i.e., a Li-poor surface region 120).

The surface region 120 may generally include one or more atomic layers in the particle 100. In some implementations, the thickness of the surface region 120 may be chosen to reduce the anion loss by a desired amount per charge/discharge cycle. The reduction of the anion loss may depend on various operating parameters of a cathode containing one or more particles 100 including, but not limited to the charge/discharge rate, the desired lifetime of a battery using the cathode, and the desired capacity of the cathode. For example, the surface region 120 may be sufficiently thick to reduce anion loss by the desired amount, but sufficiently thin such that the core region 110, which contributes more to the overall capacity of the particle 100, occupies a larger proportion of the particle 100.

The gradient region 130 refers to the portion of the particle 100 that transitions between the core region 110 and the surface region 120. As described above, the gradient region 130 has a Li concentration profile that varies from the first Li concentration in the core region 110 to the second Li concentration in the surface region 120. In some implementations, the Li concentration profile of the gradient region 130 may vary in a monotonic manner (e.g., the gradient region 130 only decreases from the core region 110 to the surface region 120 if the Li concentration of the core region 110 is greater than the surface region 120). In some implementations, the Li concentration profile may vary in a substantially smooth and/or continuous manner (e.g., there are no sharp changes to the Li concentration).

The thickness of the gradient region 130 may depend, in part, on the fabrication methods used to form the surface region 120 and the core region 110. For example, high-temperature leaching methods may be used to remove Li and O from the surface region 120 of the particle 100. As will be discussed below, such methods may be rate-controlled by the solid-state diffusion of Li and/or O through the bulk of the particle 100. The thickness of the gradient region 130 formed via these methods may depend, in part, on the temperature, the amount of sintering aid used, the amount of time exposed to the sintering aid, and the desired Li concentration in the surface region 120.

Figure 1D:
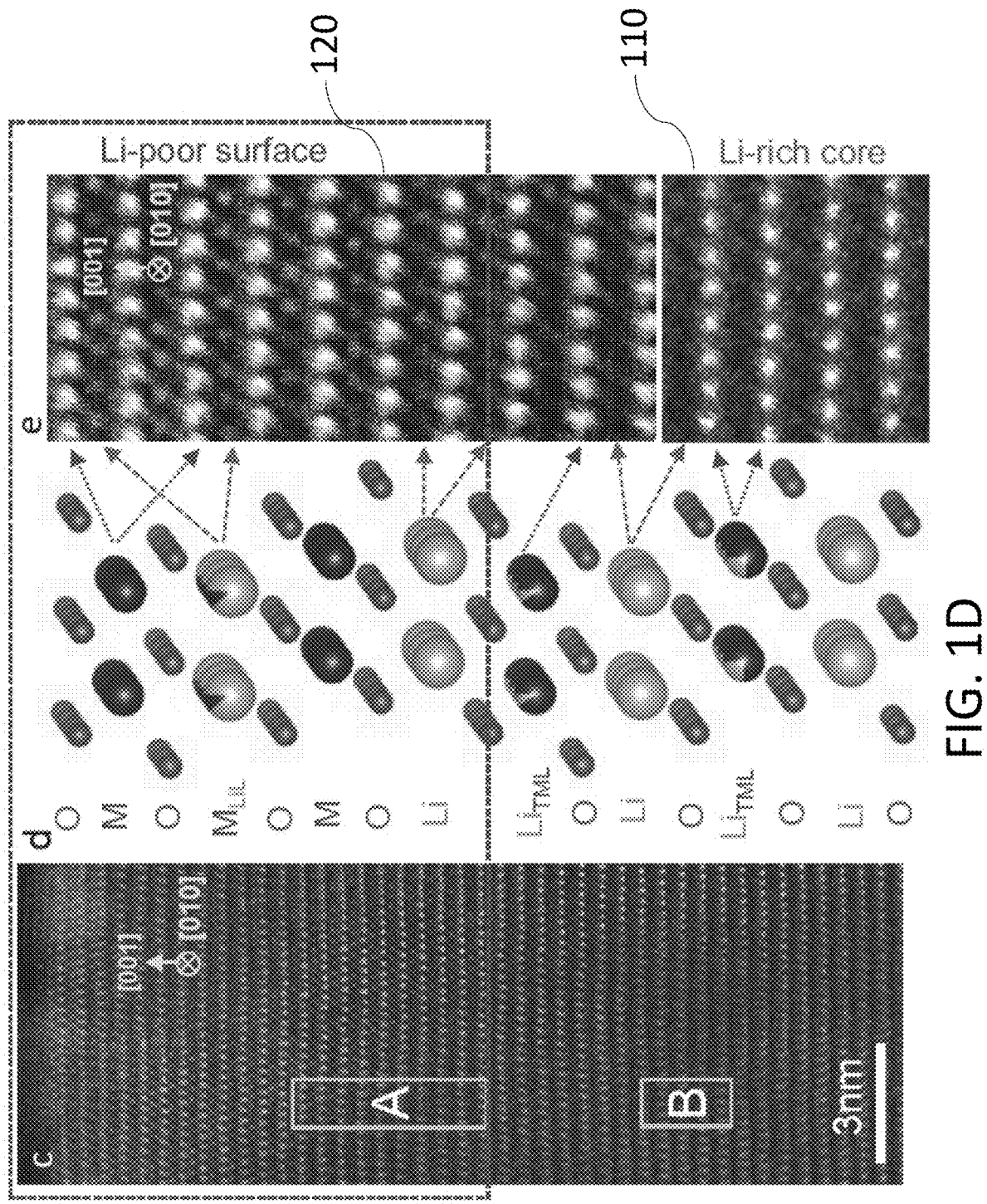
FIG. 1D shows a scanning transmission electron microscope high-angle annular dark-field (STEM-HAADF) lattice image of an exemplary transition metal oxide particle with a coherent lattice. The rectangle [A] is from the Li-poor surface and [B] is from the Li-rich bulk. A schematic of the layered structure of the Li-gradient region in the particle is also shown from the Li-rich (Li substitution in M layer) bulk to the Li-poor (M substitution in Li layer) surface. Additional inset STEM-HAADF images are shown from rectangle [A] and rectangle [B] at higher magnification, where $M_{LiL}$ pillars are shown in the Li layers (due to higher average Z of the atomic column) in [A], but not in [B].

In some implementations, the particle 100 may have a substantially single crystalline lattice. For example, FIG. 1D shows a particle 100 formed from $Li_{1+X(r)}M_{1-X(r)}O_2$, which has a layered crystalline lattice that alternates between LiL and TML. In this case, M includes Mn, Ni, and Co. As shown, the surface region 120, the core region 110, and the gradient region 130 may form a coherent lattice. A coherent lattice refers to the lattice constant of the surface region 120, the core region 110, and the gradient region 130 being substantially similar such that a continuous lattice is formed with few, if any, defects (e.g., dislocation defects, phase boundaries).

FIG. 1D shows that the surface region 120 and the core region 110 of the particle 100 may be formed by (1) substituting Li ions with M ions in the LiL layers in the surface region 120 to reduce the Li concentration and/or (2) substituting M ions with Li ions in the TML layers in the core region 110 to increase the Li concentration. For such cases, the Li gradient may be equivalently represented with a M gradient (i.e., the surface region 120 has a higher M concentration than the core region 110 in proportion to the Li gradient).

Figure 1E:
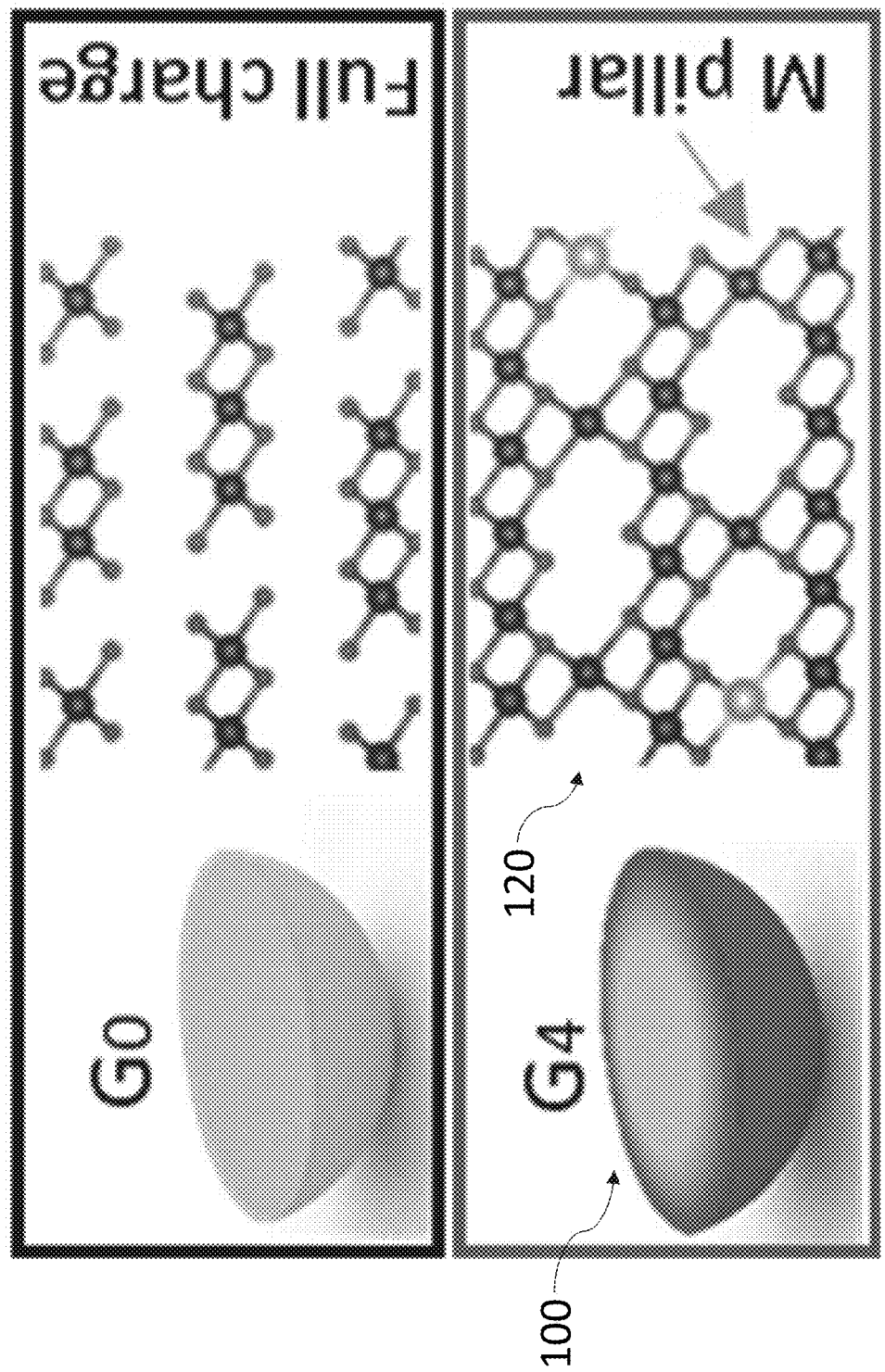
FIG. 1E shows a diagram comparing the molecular structure of $G_0$ an $G_4$.

In some implementations, the substitution of Li ions with M ions in the LiL layers of the surface region 120 may also stabilize the structure of the surface region when cycling the particle 100. For example, FIG. 1E shows representative molecular structures of a charged particle with no Li-gradient (i.e., no Li-poor surface region) and a charged particle 100 with a Li-poor surface region 120 and a Li-rich core region 110 ($G_4$). When the $G_0$ particle is cycled, the removal of Li ions from the LiL may create vacancies between adjoining TML's. These vacancies can cause the structure of the $G_0$ particle to collapse, resulting in irreversible degradation to cycling performance. In contrast, the M ions in the LiL layers in the $G_4$ particle 100 may function as pillars (also referred to herein as "M pillars") to prevent the structural collapse of the particle 100 when Li ions are removed from the LiL layers during a charging cycle, thus preserving the structure and, hence, the cycling performance of the particle 100.

A cathode for a battery may include one or more particles 100 described above. In some implementations, the compressed density of the cathode may be enhanced by utilizing smaller size particles 100, which provide a higher packing density (i.e., less porosity). In some implementations, the cathode may include a distribution of particles 100 of varying size. The size distribution of the particles 100 may be characterized by various types of distributions including, but not limited to a unimodal distribution, a bimodal distribution, and a uniform distribution. In some implementations, the energy density and/or the power density of the cathode may be tuned by adjusting the size distribution of the particles 100. For example, a cathode may exhibit a greater energy density by including a greater number of larger-sized particles 100.

3. An Exemplary Demonstration of a Transition Metal Oxide Particle

In one exemplary demonstration, a substantially single crystalline $Li_{1+X(r)}M_{1-X(r)}O_2$ particle 100 (also referred to herein as a "LX(r)MO particle 100") was fabricated with a Li concentration gradient. Previous studies demonstrated cathode materials with a gradient distribution of Ni, Mn, and/or Co where the gradient of the transition metals is formed by adjusting the relative concentrations of Ni, Mn, and/or Co in the TML without changing the Li concentration. $Li^+$ ions are typically able to diffuse throughout the particle, which makes maintaining a Li gradient in the particle difficult.

However, the Inventors recognized that a Li gradient in the $Li_{1+X(r)}M_{1-X(r)}O_2$ particle 100 is equal and opposite to the M gradient in an uncharged state. Unlike Li, M ions do not readily diffuse in the particle, particularly if the occurrence of M vacancies and/or other lattice defects are substantially reduced in the particle 100. For example, reducing the loss of oxygen from the surface 120 of the particle 100 reduces the number oxygen vacancies and, in turn, limits the mobility of M ions. Thus, a Li concentration gradient formed by substituting Li with M in the Li layer (LiL) and/or substituting M with Li in the transition-metal layer (TML) when the particle 100 is in a discharged state may be maintained at room temperature.

The Li surface region 120 in these particles was not a simple layered structure with the bulk region 110, but had a distribution of Li/M ratio that gradually decreased from >1 to <1 (i.e., the gradient region 130) such that the Li—O—Li configuration gradually decreased from the bulk region 110 to the surface region 120 in the gradient region 130. The gradual decrease of Li—O—Li prevented the global mobility of M/O by buffering the stress and weakening the driving force for M/O mobility. Additionally, M pillars were formed in the Li layers to prevent the layered structure from collapsing. Thus, the layered structure was able to remain structurally stable for hundreds of cycles. Furthermore, the particles 100 (which had a Li-rich core region 110 and a Li-poor surface region 120 formed from a Li-rich particle) exhibited lattice coherency between the core and surface regions. Such lattice coherency provides fast Li ion diffusion and further reduces the global mobility of M/O and release of oxygen to the electrolyte.

The construction of a M-gradient is achieved using a high-temperature leaching method with molten $MoO_3$ applied to uniformly Li-rich $Li_{1.20}Mn_{0.48}Ni_{0.16}Co_{0.16}O_2$ particles. For this method, high temperatures (e.g., temperatures substantially greater than the operating temperature of the battery) were used, in part, to increase the mobility of M thereby enabling the formation of the M-gradient in the particle.

First, uniformly Li-rich particles were synthesized. The Li-rich $Li_{1.20}Mn_{0.48}Ni_{0.16}Co_{0.16}O_2$ material was prepared by a wet co-precipitation method followed by a solid-state reaction process. First, $MnSO_4 \cdot H_2O$ (Reagent Plus®, ≥99%, Sigma-Aldrich), $NiSO_4 \cdot 6H_2O$ (ACS Reagent, ≥98%, Sigma-Aldrich) and $CoSO_4 \cdot 7H_2O$ (Reagent Plus®, ≥99%, Sigma-Aldrich) were completely dissolved in deionized water with a molar ratio of 3:1:1. Then 0.5 mol/L NaOH solution was titrated into the solution and stirred in a 80° C. water bath until the pH was 8-10. The solution was continually stirred for 2 h and the solution was cooled to room temperature in air thereafter. The sediments were separated from water by centrifugation and washed by water. This process was repeated 3 times. Subsequently the product was dried at 80° C. in a vacuum oven to obtain a powder precursor. After that, the precursor was heated at 400° C. for 3 h to obtain a black intermediate product, and then it was mixed with $LiOH \cdot H_2O$ (ACS Reagent, ≥98%, Sigma-Aldrich). Finally, the mixture was heated at 600° C. for 3 h and 900° C. for 10 h to obtain the uniformly Li-rich $Li_{1.20}Mn_{0.48}Ni_{0.16}Co_{0.16}O_2$ material (also referred to herein as "$G_0$").

The outer surfaces of the uniformly Li-rich LXMO particles were then coated with $MoO_3$ (solid) by an aqueous solution coating method. 4-6 wt % of $(NH_4)_6Mo_7O_{24} \cdot 4H_2O$ was dissolved in deionized water and the pH was adjusted to 8-10 with $NH_3 \cdot H_2O$. Then, the as-prepared $Li_{1.20}Mn_{0.48}Ni_{0.16}Co_{0.16}O_2$ material was put into the solution and dispersed with a high power ultrasound for 1 h. The solution was then evaporated while being continually stirred in an 80° C. water bath. Then the powder was milled and heated at 300° C. for 2 h, 800° C. for 15 min, and kept at 700° C. for 10 h. The product was then milled again and dispersed in deionized water by ultrasound for 1 h and the solid is separated by centrifugation. At last, the solid was dried at 150° C. in a vacuum oven for 3 h to get the final product.

Figure 2A:
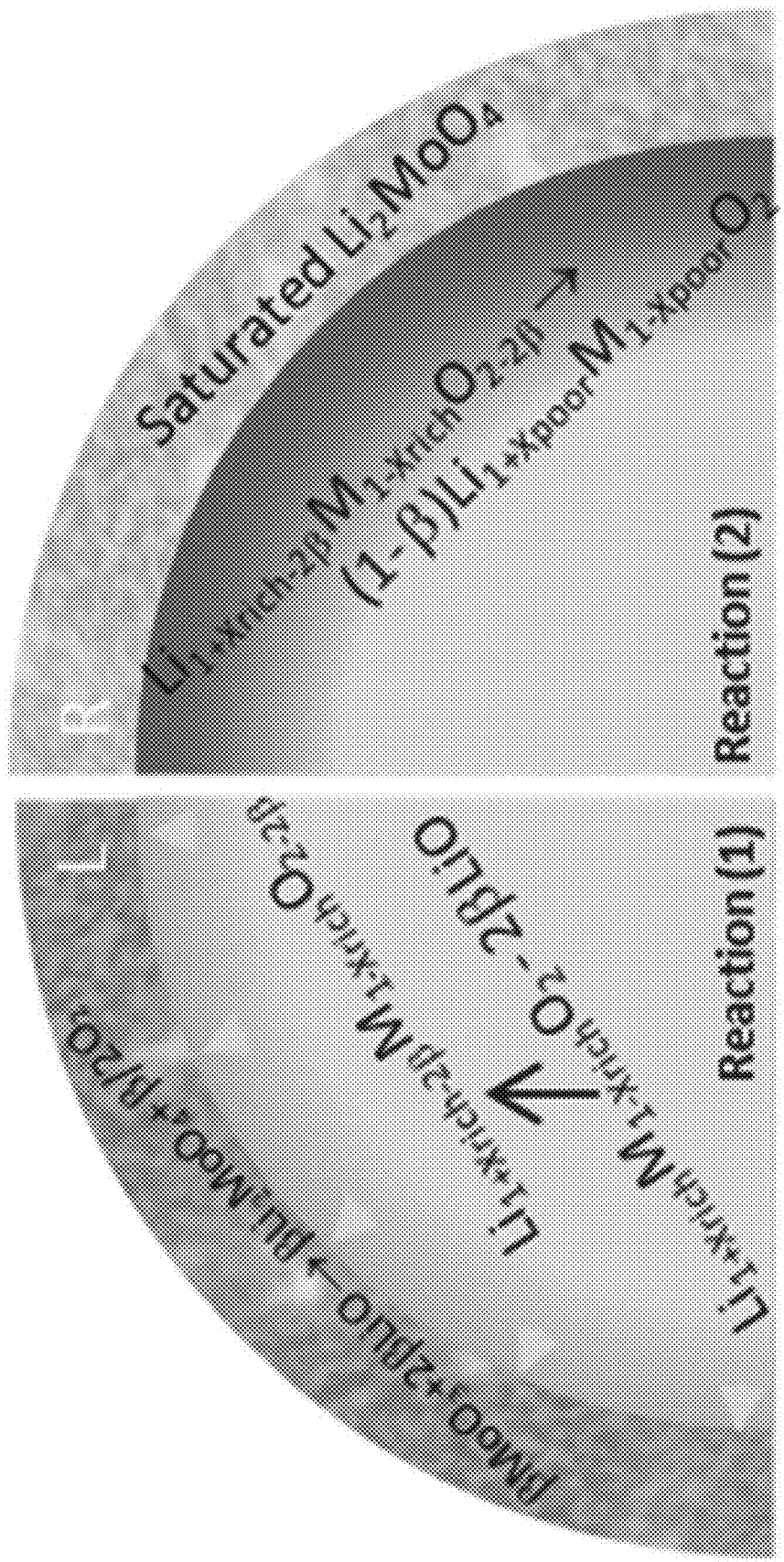
FIG. 2A shows a diagram of a Li-gradient being formed on a $Li_{1+x(r)}M_{1-x(r)}O_2$ particle using an exemplary liquid $MoO_3$ leaching method. The diagram shows reactions (1) (left) and (2) (right) and the yellow arrows indicate Li diffusion in solid particles.

The Li-rich LXMO particles were then reacted with the sintering aid (e.g., the liquid molybdate) at 700° C. (or more generally 650° C. to 750° C.) via the following reaction (see FIG. 2A):

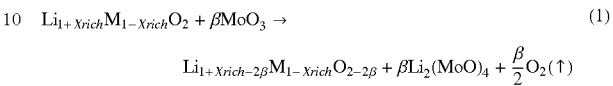

$$Li_{1+Xrich-2\beta}M_{1-Xrich}O_{2-2\beta} + \beta Li_2(MoO)_4 + \frac{\beta}{2}O_2(\uparrow)$$

The reaction shown in reaction (1) is used to effectively extract

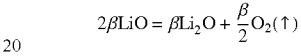

from the regions of the LXMO particle near the surface. The depletion of oxygen effectively reduces the M cation valence state near the surface.

Figure 2B:
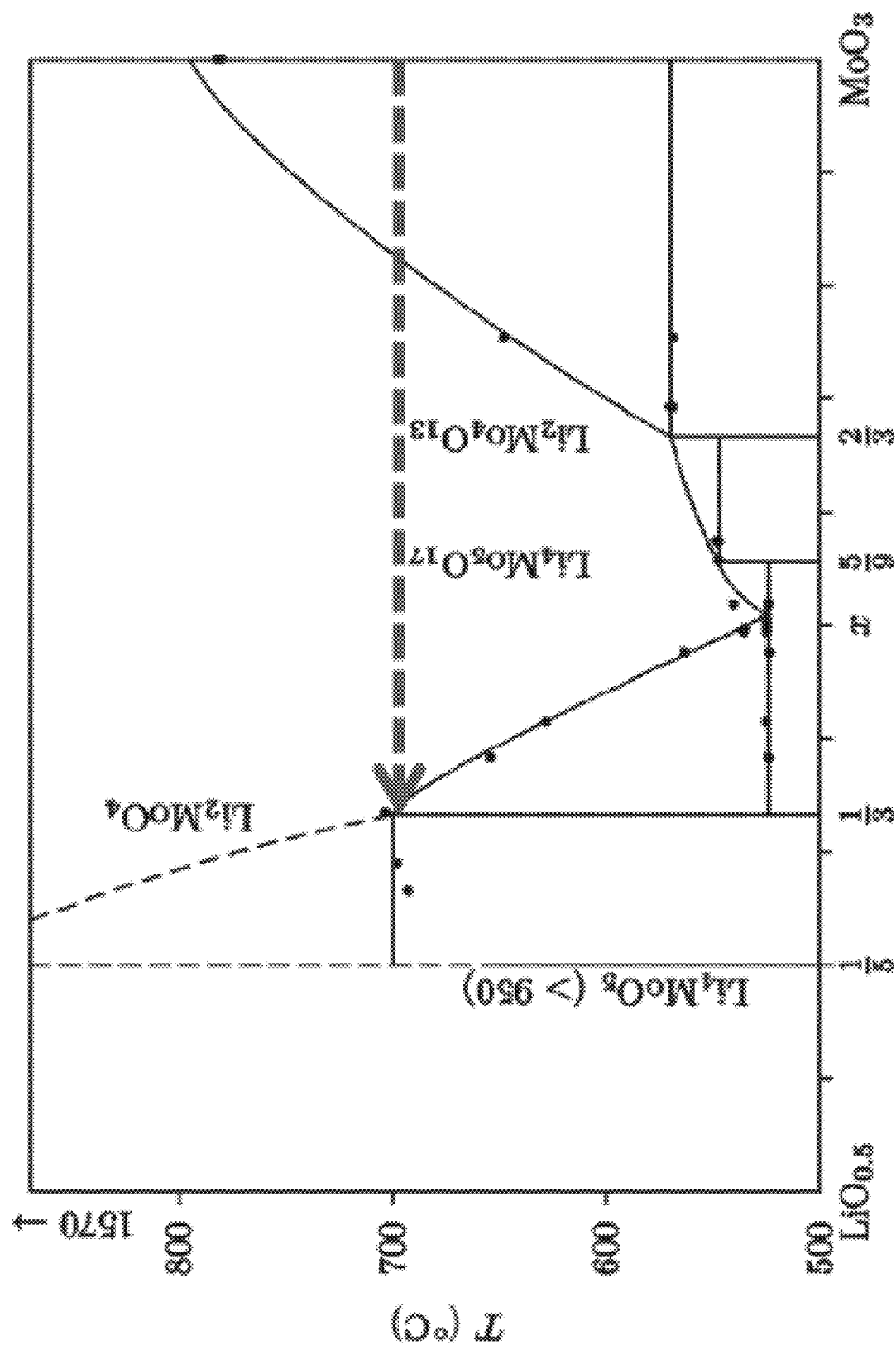
FIG. 2B shows a previously reported phase diagram of $Li_2O$ and $MoO_3$ and the phase change route (see arrow) from $MoO_3$ to $Li_2MoO_4$.

The sintering aid works by reacting with the ceramic host to form a liquid layer ($MoO_3$—$Li_2O$ eutectic liquid solution at >525° C.), which wets and wraps around the host particles. For reference, FIG. 2B shows the $Li_2O$—$MoO_3$ phase diagram and the phase change route from $MoO_3$ to $Li_2MoO_4$. When heated to a temperature of 650-750° C., $MoO_3$ is initially in a solid phase. After $LiO_{0.5}:MoO_3 < 0.3$ was leached, the solid solution transitions into a liquid, which then uniformly wetted and wrapped around the Li-rich particle surface. $LiO_{0.5}$—$MoO_3$ remained in the liquid phase as more $LiO_{0.5}$ was leached. When $LiO_{0.5}:MoO_3 = 2$, saturation was reached where no more $LiO_{0.5}$ was leached out. The final product that wrapped around the particle surface was thus $Li_2MoO_4$.

In some implementations, the particle may be heated at 800° C. for 15 min to pre-melt $MoO_3$ in order to increase the likelihood of uniformly wrapped Li-rich particles. Under these conditions, the temperature is sufficiently low and the time period sufficiently short for Li to diffuse across the particle, thus the leaching process remains primarily confined to the surface of the particle.

The total volume fraction of the sintering aid is small, thus a saturated liquid solution (minority)/Li-rich particles (majority) mixture is formed. Generally, other compounds that form a eutectic liquid solution with LiO or $Li_2O$ in reaction (1) may be used to allow the liquid-solid leaching reaction to occur without thermally decomposing the layered phase.

The temperature may also be sufficiently high (e.g., greater than 650° C.) to provide sufficient thermal energy for the remaining Li, M and O to locally rearrange and form a new layered structure by removing vacancies and defects that were formed when LiO was leached. In other words, the layered crystal may be annealed, thus eliminating the Li and O vacancies left behind in reaction (1) to obtain a dense crystal via the following reaction (see FIG. 2A):

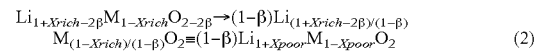

where $X_{poor} = (X_{rich} - \beta)/(1-\beta)$. It should be appreciated that such annealing may not be possible at room temperature when using previous acid leaching methods. As previously described, conventional acid leaching methods typically create vacancies in the structure that may lead to phase transformations when cycling the battery. For instance, disordering, spinel, or rock salt phases are typically introduced at the surface when using acid leaching methods, which persist even if the material is sintered thereafter.

In reaction (2), the layered crystal shrinks as the Li and O vacancies are removed. In order for reaction (2) to occur, it is preferable for M to have a sufficient short-range mobility in the presence of substantial amount of leaching-induced oxygen vacancies. Note that the average M valence is reduced after reaction (1).

Liquid-phase diffusion is more rapid than solid-state diffusion, thus reaction (1) is initially rate-controlled by solid-state diffusion. The progress variable $\beta$ in $Li_{1+Xrich-2\beta}M_{1-Xrich}O_{2-2\beta}$ is spatially dependent with $\beta(r_{core})\approx 0$ and $\beta(r_{surface})>0$ (or even as large as $\beta(r_{surface}) > X_{rich}$). In other words, the surface may become Li-poor while the core is able to maintain the initial Li-richness. As long as the $MoO_3$ fraction w is small (e.g., 4-6 wt %) and assuming the $MoO_3$—$Li_2O$ liquid forms a percolating network among the particles, the liquid may reach thermodynamic saturation at time $t_{saturation}$ for dissolving $Li_2O$, after which no more LiO leaches out. By adjusting w and the duration t of reaction (1), $\beta(r_{surface}) \geq X_{rich}$ may be throttled resulting in $X_{poor}=(X_{rich}-\beta/(1-\beta) \leq 0$ on the surface while keeping a $X_{rich}$ core.

Figure 3:
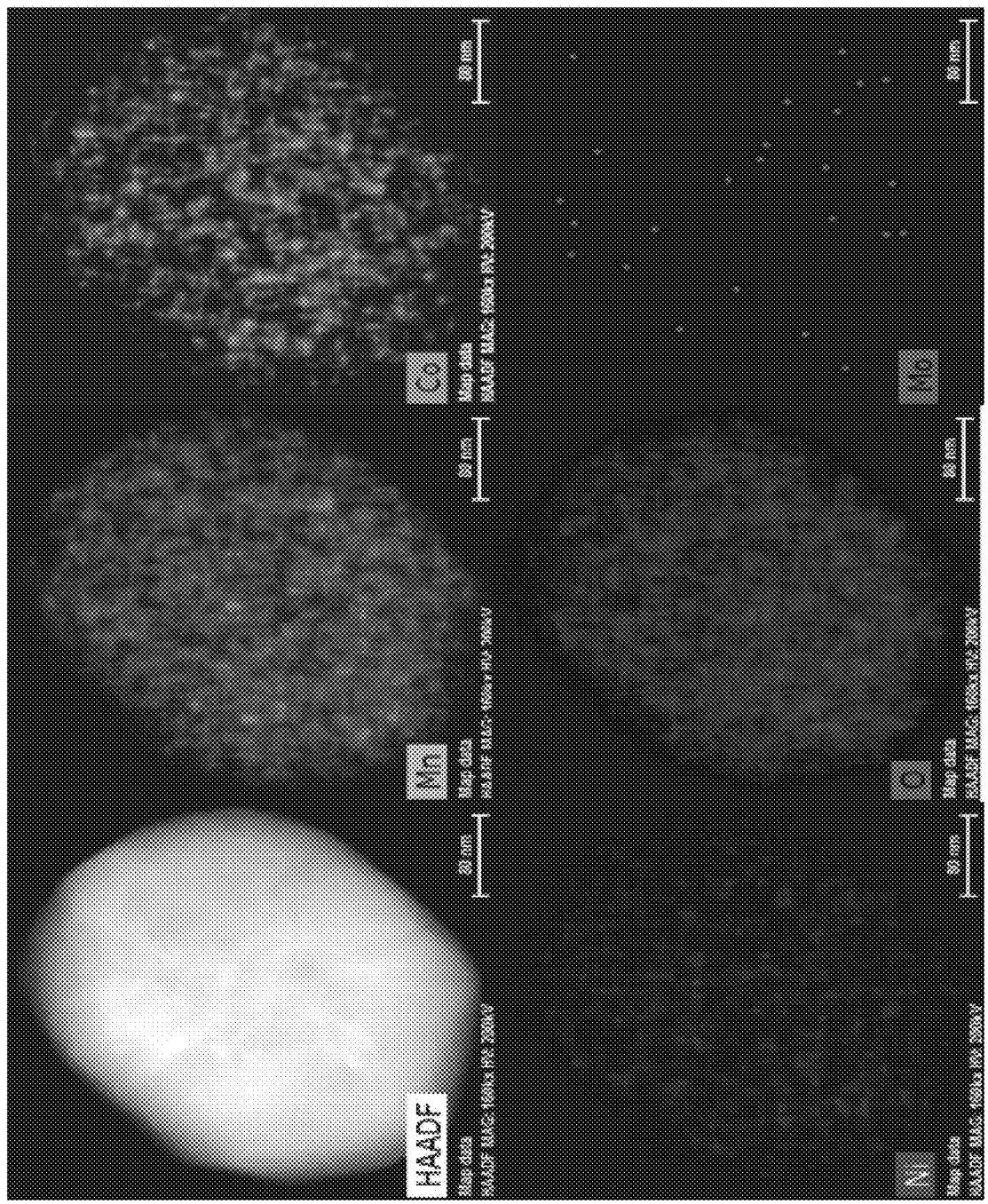
FIG. 3 shows energy dispersive x-ray spectroscopy (EDS) maps of $G_4$ after washing in water.

If w is too large, the core may become Li-poor as well. If w is too small, $t_{saturation}$ may be reached too early resulting in incomplete Li-poor coverage on the surface of the particle (i.e., GOM may occur). Since $MoO_3$—$Li_2O$ liquid only leaches LiO and does not dissolve transition metals (FIG. 3), the high-temperature leaching is a "scarless" treatment that may create up to 100% dense crystals without cavities and vacancies.

Reactions (1) and (2) rely upon basic solid-state reactions in an air furnace and are thus highly scalable. After cooling to room temperature, the particle may include a sintered polycrystal with $Li_2MoO_4$-containing grain boundaries (LGB) that form a percolating 3D network. However, $Li_2MoO_4$ is soluble in liquid water at room temperature, thus sonication of the particles in liquid water may etch away the LGB network by:

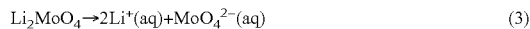

$$Li_2MoO_4 \rightarrow 2Li^+(aq)+MoO_4^{2-}(aq) \qquad (3)$$

In some implementations, the polycrystal is fractured along the LGBs and separated into individual Li gradient $LX_{(r)}MO$ particles that may then be used for the Li-ion battery electrode after drying.

The high-temperature leaching method with molten $MoO_3$ described above is an operando treatment on the surface. The leaching of LiO from the pristine particle creates a coherent Li gradient 130 on the surface. Therefore, the concentration gradient changes gradually and continuously from the bulk region 110 to the surface region 120 unlike the relatively sharp phase boundaries formed when using coatings. Additionally, the high-temperature leaching method described above is distinguished from previous acid leach treatments in that the method described herein is a "scarless" treatment where liquid LiO—$MoO_3$ only leaches Li—O and does not dissolve M. Leaching at 700° C. may create a robust-dense coherent Li-gradient surface to protect the Li-rich particle and introduce controllable amounts of M pillars in the Li layers to prevent the layered structure from collapsing.

Therefore, the cathode particles 100 formed by the high-temperature leaching method described above may be formed with a coherent Li gradient without appreciably changing the underlying molecular structure of the initial Li-rich particle and/or damaging paths for Li diffusion and/or electron conduction. In this manner, the cathode particles 100 may stabilize oxygen in the structure, promote faster Li diffusion, and provide electron percolation pathways unlike previous spinel/disordered/rock-salt coatings. Additionally, the dense Li-poor surface region 120 prevents oxygen ions from being oxidized and thus escaping from the particle 100 into the electrolyte thereby preventing damage to the structure.

3.1 Characterization of the Li Gradient $LX_{(r)}MO$ Particles

Based on the above method and reactions (1)-(3), a surface region 120 and gradient region 130 were formed in $Li_{1.20}Mn_{0.48}Co_{0.16}Ni_{0.16}O_2(G_0)$ particles with 4 wt % $MoO_3$ leaching resulting in lattice-coherent $LX_{(r)}MO$ particles 100 (also referred to herein as "$G_4$" where the subscript 4 corresponds to the 4 wt % $MoO_3$). The leaching process thus transformed $G_0$ to $G_4$ (i.e., $G_0 \rightarrow G_4$). The morphology and electrochemical performance of the particles 100 were characterized using various techniques.

Scanning electron microscopy imaging was performed using a Zeiss Merlin high-resolution scanning electron microscope. A sample was prepared for atomic resolution STEM imaging by focused ion beam (FIB) lift-out using a FEI Helios 600 with a Ga ion source. A platinum layer was deposited on top of a particle 100 to protect the cathode particle before the lift-out. High-resolution transmission electron microscopy (HRTEM) images were taken on a JEOL 2010F at 200 kV. Local chemical analysis was performed using scanning transmission electron microscopy-energy dispersive X-ray spectroscopy (STEM-EDS) with a HAADF detector. High angle annular dark field (HAADF) images in STEM were taken from an aberration-corrected JEOL-ARM 200F operated at 200 keV and equipped with a cold field emission source. The probe convergence angle on the sample was 23 mrad with the inner and outer diameters of the HAADF detector being 68 mrad and 280 mrad. The 2K images (2048×2048 pixels) were acquired with a dwell time of 16 μs/pixel.

EELS spectra were acquired using a FEI Talos F200X scanning/transmission electron microscope (200 kV) at the Center for Functional Nanomaterials, Brookhaven National Laboratory and an aberration-corrected JEOL-ARM 200F, which were both equipped with a dual EELS spectrometer. The dual EELS was used to collect both low-loss and high-loss spectra. The low-loss spectra were used to correct the drift of the zero-loss peak (ZLP). Based on the full-width at half-maximum (FWHM) of the zero-loss peak (ZLP), the energy-resolution of EELS was about 0.7 eV.

X-ray diffraction measurements were performed using a PANalytical X'Pert PRO X-ray diffractor with a Cu target at 45 kV and 40 mA. The data was collected with 2°/min and analyzed with the HighScore Plus software.

Soft X-ray absorption spectroscopy measurements were carried out at the IOS (23-ID-2) beamline at the National Synchrotron Light Source II (NSLS-II) at Brookhaven National Laboratory. Spectra were acquired in partial electron yield (PEY), total electron yield (TEY) and partial fluorescence yield (PFY) modes. The estimated incident X-ray energy resolution was ~0.05 eV at the O K-edge. The monochromator absorption features and beam instabilities were normalized out by dividing the detected PFY and TEY signals by the drain current of a clean gold I0 mesh placed in the incident beam. TEY spectra were recorded from the drain current of the sample and PFY data was acquired using a Vortex EM silicon drift detector.

The sXAS spectra for O K-edge was recorded over a wide energy range from 520 to 565 eV covering energies well below and above the absorption of the sample. The normalization of the O K-edge was performed: 1) I0 normalization: the sample signal was divided by the incident intensity measured from the sample drain current from a freshly coated Au mesh inserted into the beam path before the X-rays impinge on the sample. 2) A linear, sloping background is removed by fitting a line to the flat low energy region (520-524 eV) of the sXAS spectrum. 3) The spectrum is normalized by setting the flat low energy region to zero and the post-edge to unity (unit edge-jump). The photon energy selected for the post edge was 560 eV, which is beyond the region of any absorption (peaks).

Figure 4A:
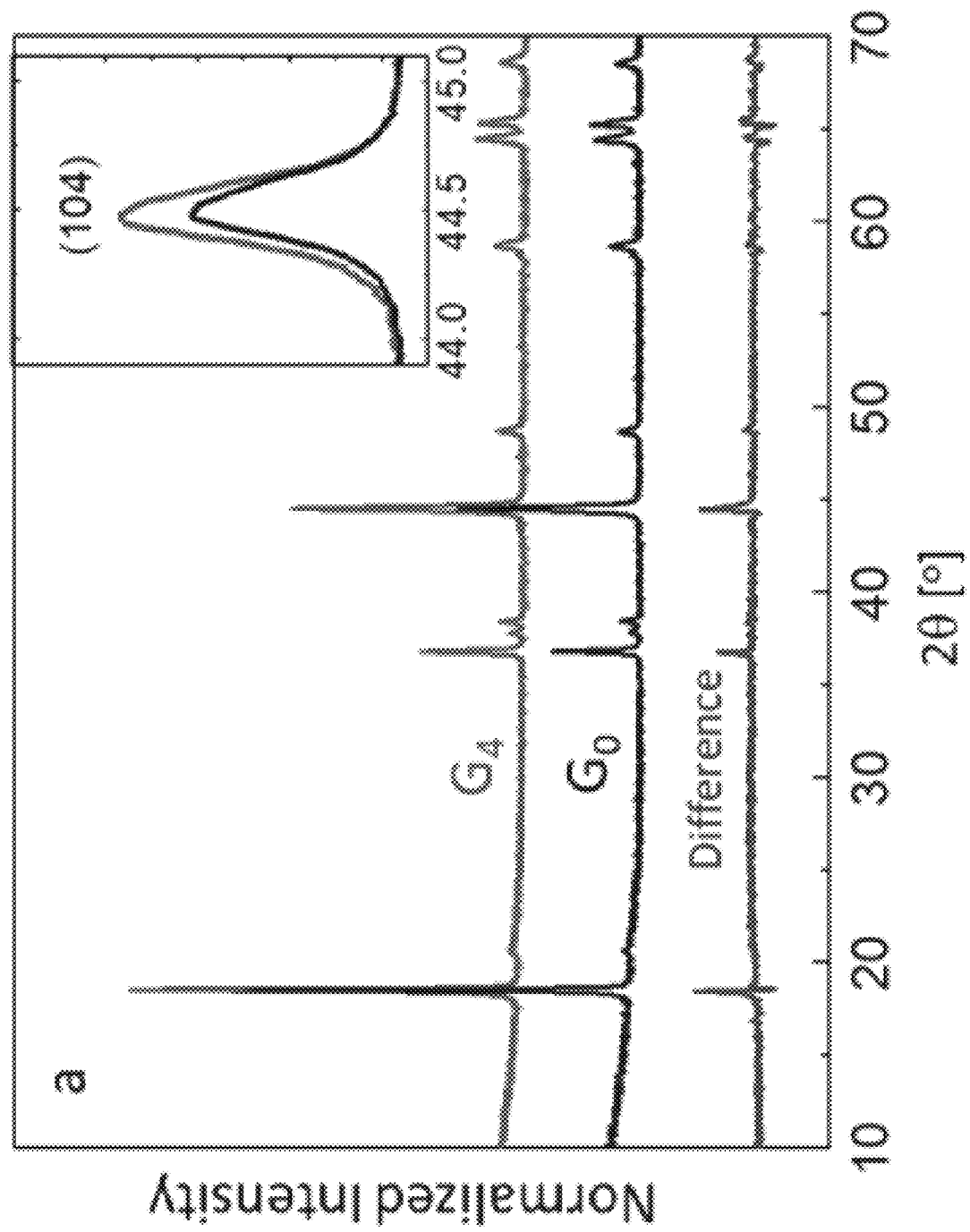
FIG. 4A shows normalized XRD spectra of $G_0$ and $G_4$ (normalized to their respective (003) peaks). The $G_0$ and $G_4$ spectra exhibited a small difference except the intensity ratio of (003)/(104). No peak splitting nor peak shift was observed for both $G_0$ and $G_4$.
Figure 4B:
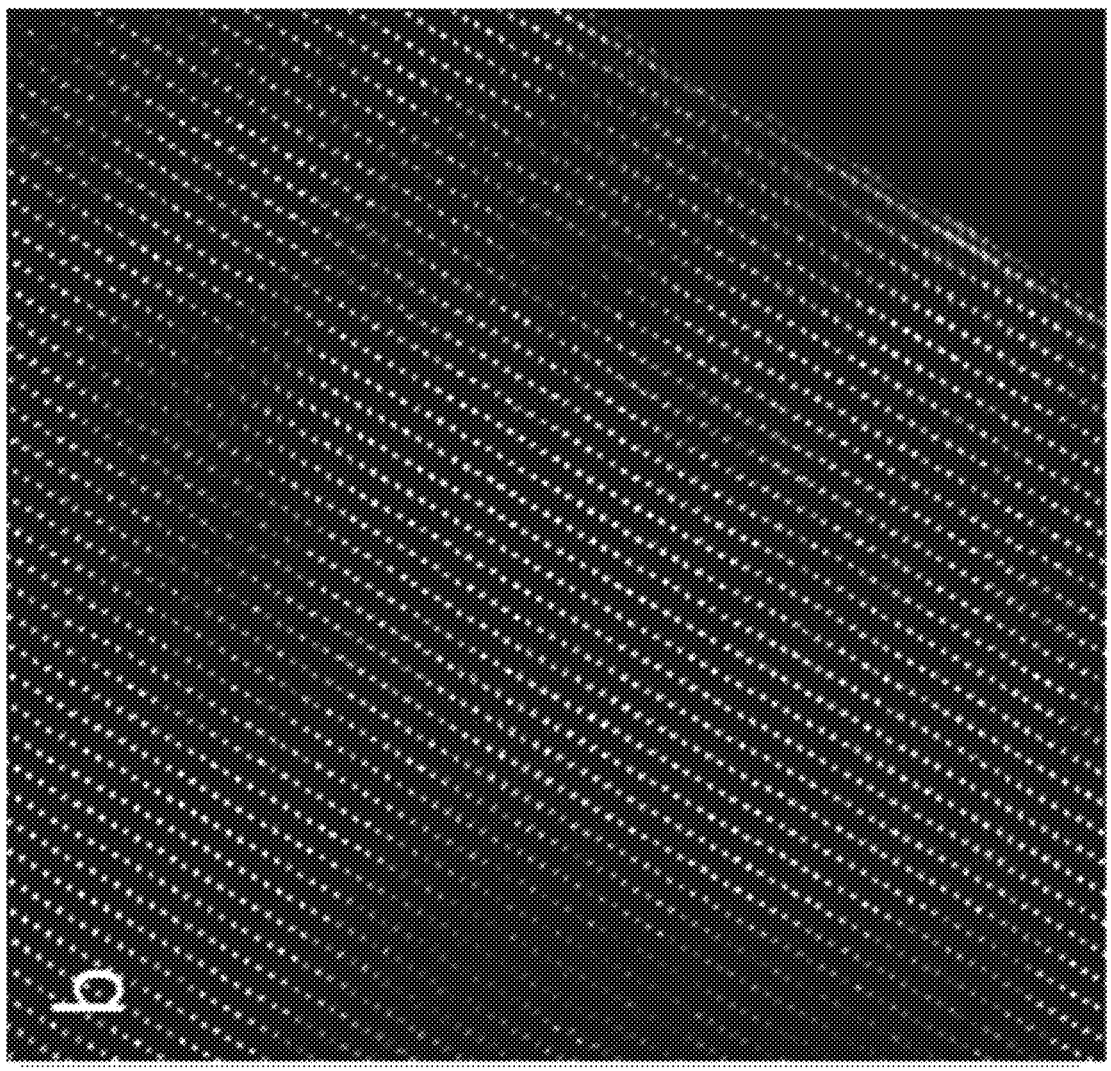
FIG. 4B shows a STEM-HAADF image of the pristine Li-rich material $G_0$.
Figure 4C:
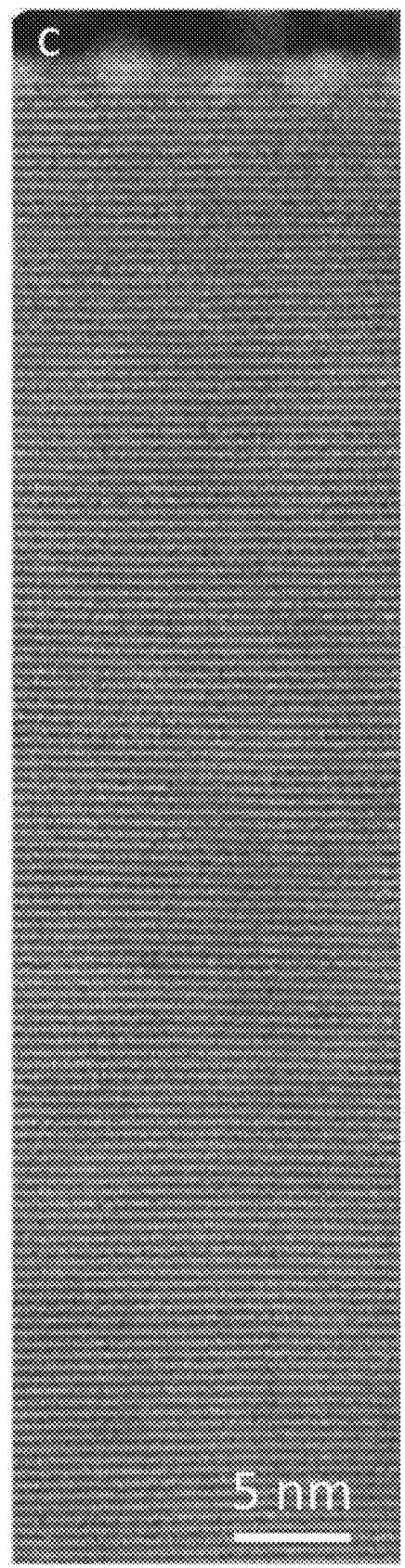
FIG. 4C shows a STEM-HAADF image of $G_4$ showing atomic layers from the surface of the particle to a depth of tens of nanometers.
Figure 4D:
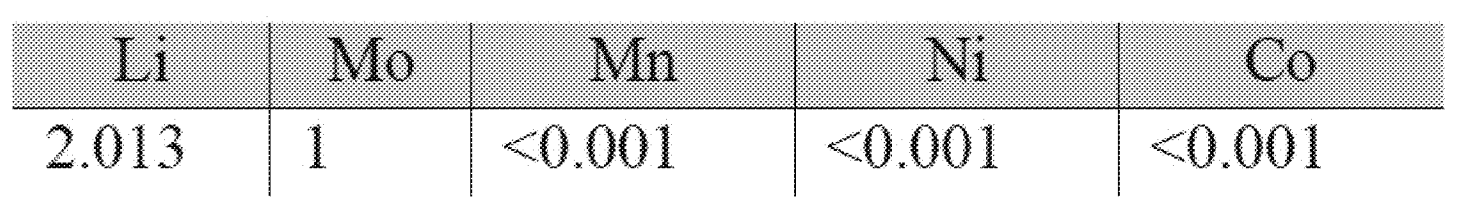

FIG. 4A shows XRD pattern data of $G_0$ and $G_4$. FIGS. 4B and 4C show STEM-HAADF images of $G_0$ and $G_4$, respectively. As shown, $G_0$ featured a conventional Li-rich layered structure. The XRD pattern of FIG. 4A also indicated that the structure of the final product ($G_4$) after reactions (1)-(3) remained unchanged compared to $G_0$. The XRD pattern and EDS mapping of $G_4$ (FIG. 3) further confirmed that $Li_2MoO_4$ was removed after sonication in water while no Mn, Co, and Ni was lost from the particle (FIG. 4D). The ICP data of the washed-away solution of $G_4$ shows a Li:Mo ratio of ~2 and a negligible amount of Mn, Ni and Co. This indicates that the loss of M was negligible and the washed product was $LiMoO_4$.

Figure 5A:
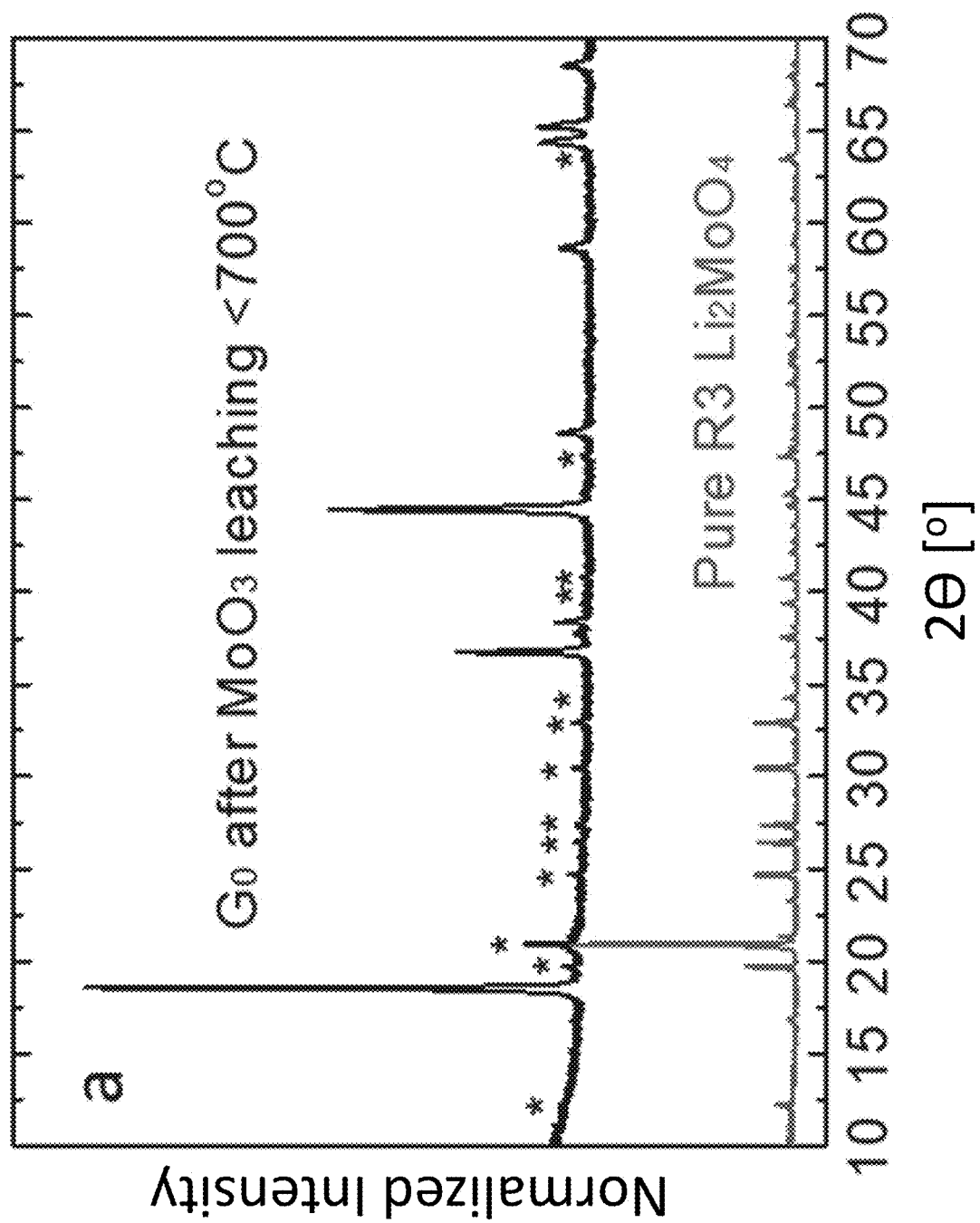
FIG. 5A shows XRD spectra of the intermediate product after $MoO_3$ leaching at ≤700° C. The new peaks after $MoO_3$ leaching at ≤700° C. matched the peaks of pure $Li_2MoO_4$ (Sigma-Aldrich, >99.9%) with a R3h crystal structure (sd_1801711). The main peak (highest intensity) was at $2\theta=20.9°$, due to (211) with d=4.29 Å.
Figure 5B:
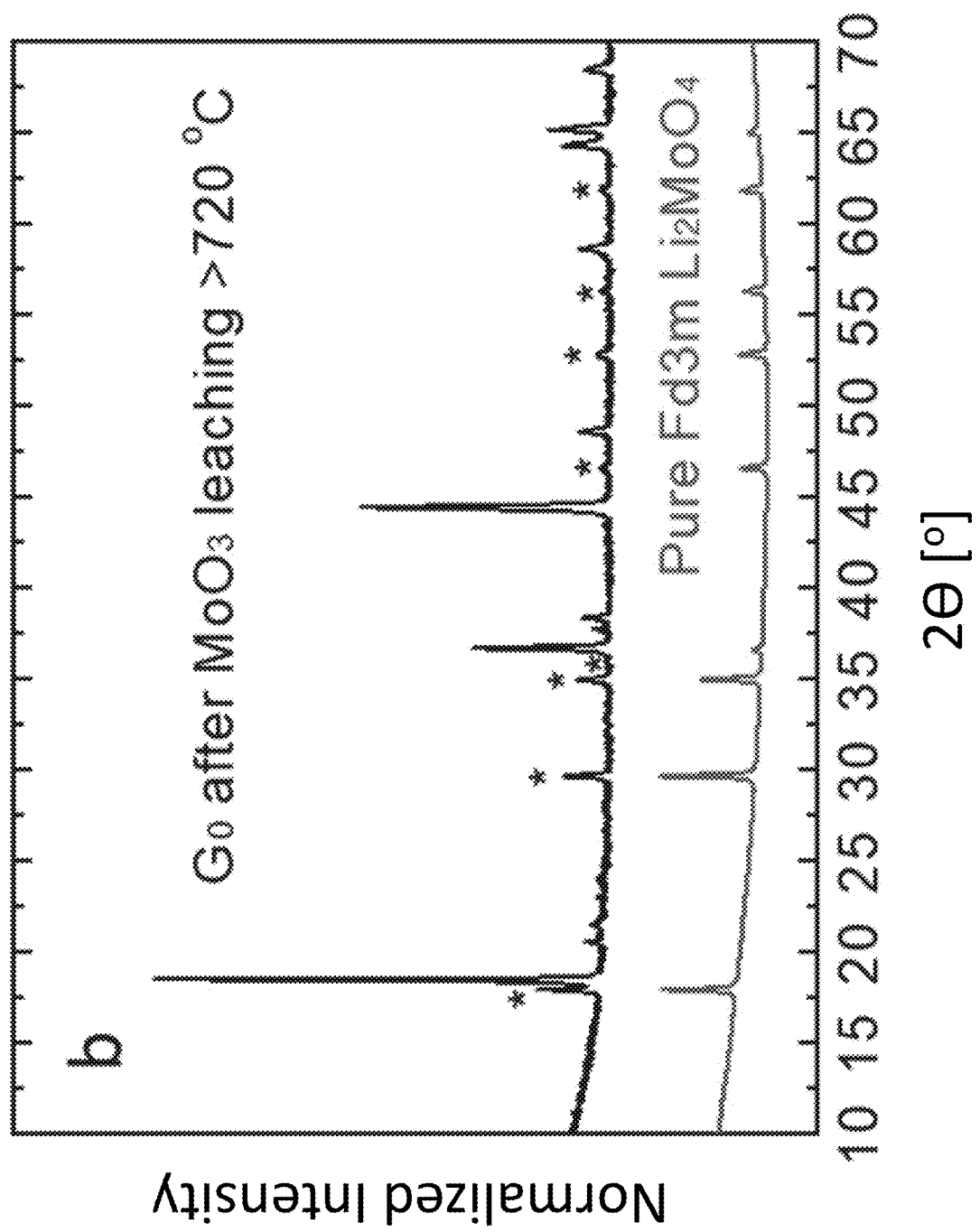
FIG. 5B shows XRD spectra of the intermediate product after $MoO_3$ leaching at ≥720° C. The new peaks in $G_0$ after $MoO_3$ leaching at ≥720° C. matched the peaks of pure $Li_2MoO_4$ with a spinel Fd3m crystal structure (sd_0307446).
Figure 6:
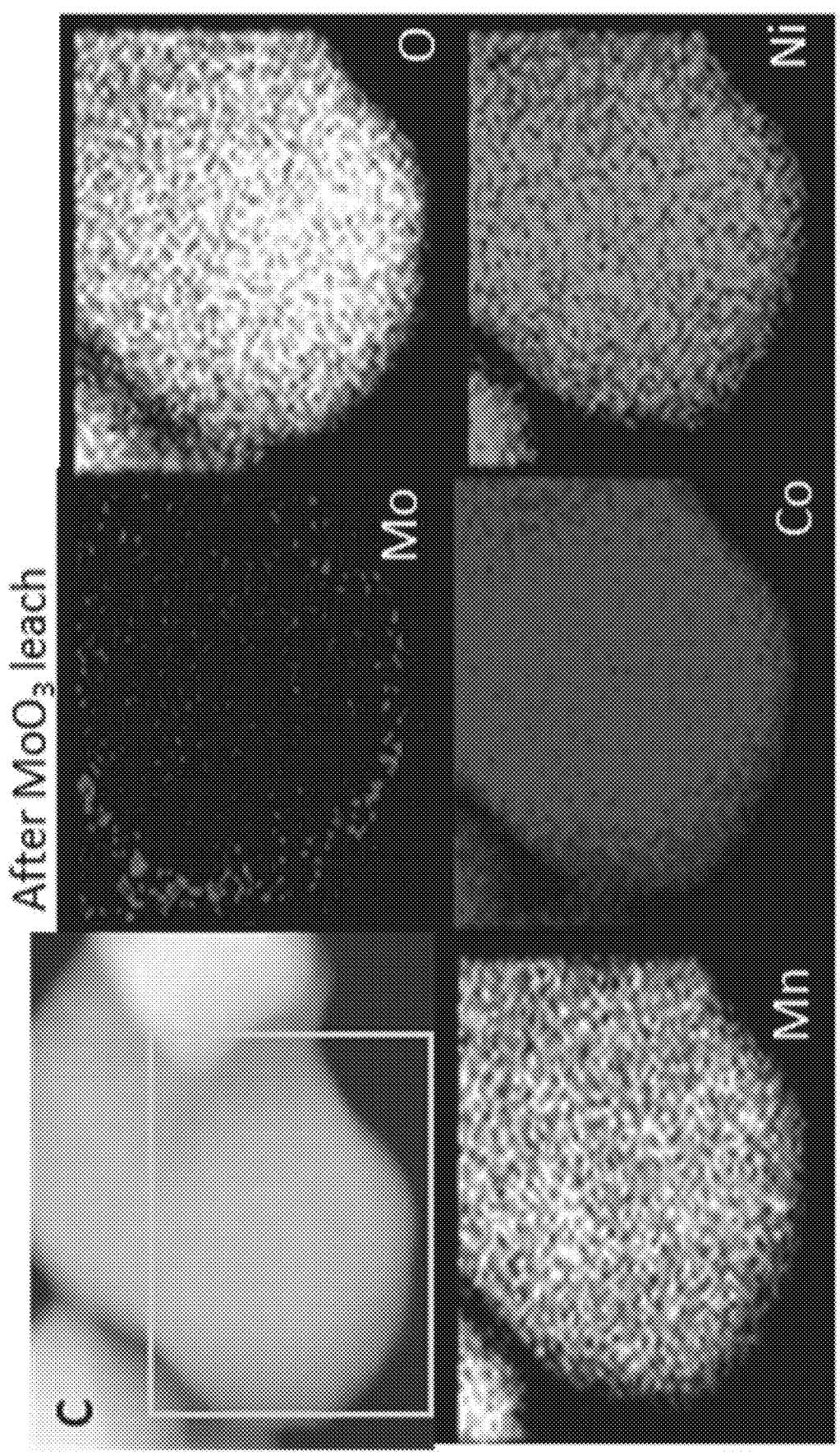
FIG. 6 shows scanning transmission electron microscope energy dispersive X-ray spectroscopy (STEM-EDS) mapping of a transition metal oxide particle after reactions (1) and (2). As shown, Mo was concentrated at the particle surface and Mn, Co, and Ni were distributed uniformly.
Figure 7A:
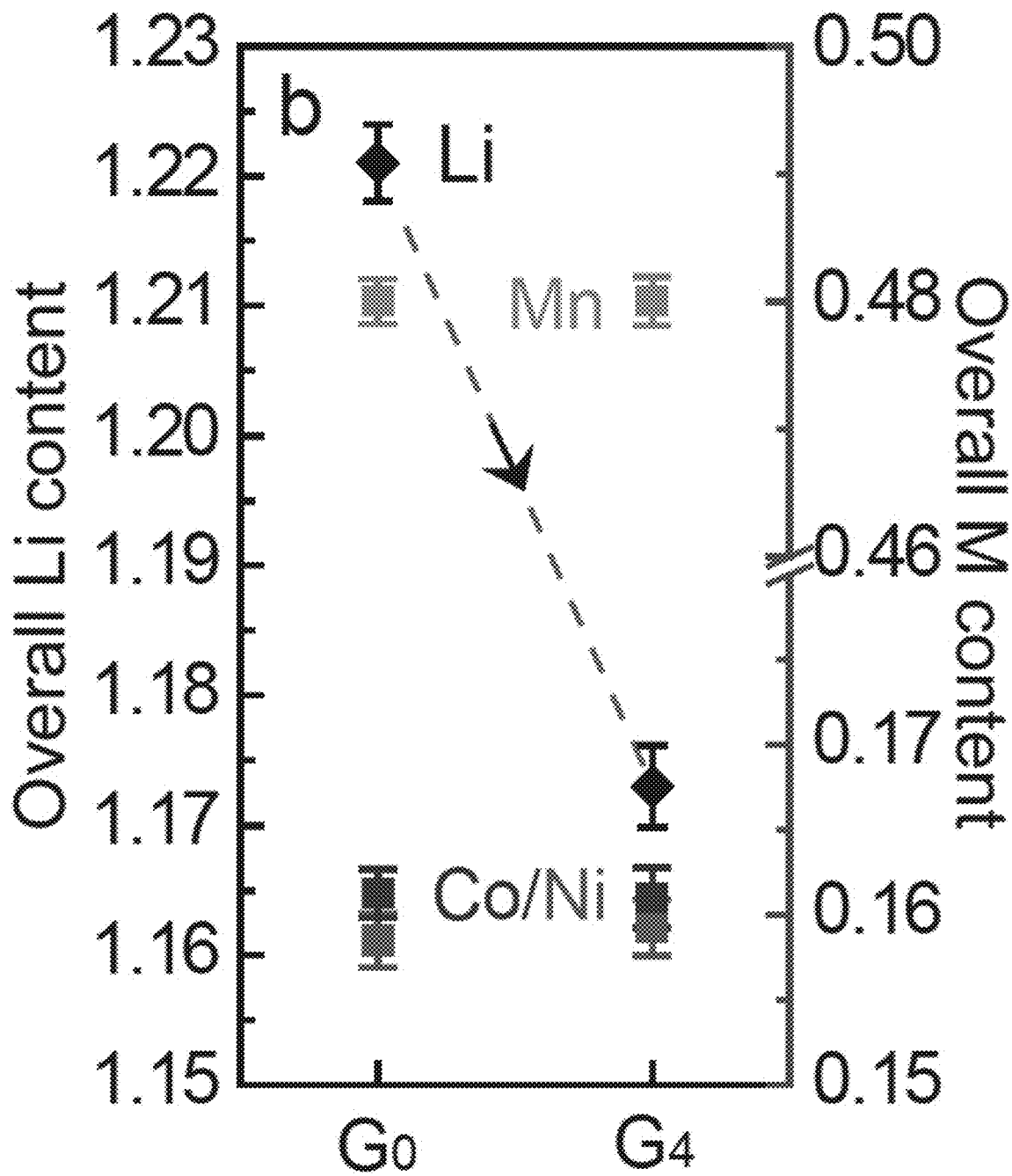
FIG. 7A shows the average Li content (left y-axis) and M content (right y-axis) in $G_0$ and $G_4$ particles from inductively coupled plasma atomic emission spectroscopy (ICP-AES).

FIGS. 5A and 5B further confirms the new phase that appeared after reactions (1) and (2) had the composition of $Li_2MoO_4$ instead of $MoO_3$. The STEM-EDS element maps shown in FIG. 6 also showed Mn, Ni, Co were distributed throughout the particle while Mo was only concentrated at the surface. This indicates the newly-formed $Li_2MoO_4$ was located only at the particle surface. The ICP-AES data of FIG. 7A and (FIG. 7B) showed the particle-averaged Li content decreased from 1.221±0.003 ($G_0$) to 1.173±0.003 ($G_4$). The solution was diluted to 30 ug/mL and 20 ug/mL and measured twice under each solution concentration and for each sample (4 data points for $G_0$ and $G_4$ each). Data was normalized to keep the sum of Mn/Co/Ni at 0.80. The average content of Li was 1.221 in $G_0$ sample and 1.173 in $G_4$, with a standard error of ±0.003 and ±0.003, respectively. The errors were calculated as the standard deviations of the four measurements for each sample. ICP of $G_4$ further indicated that Mo was removed after washing in water, since there was no Mo found in $G_4$ and no M was lost from the particles. This shows that only a small portion of the surface region 120 leached out LiO after reactions (1)-(3), while the bulk of the particle 100 retained the composition of the original $Li_{1.20}Mn_{0.48}Co_{0.16}Ni_{0.16}O_2$ sample.

Figure 8A:
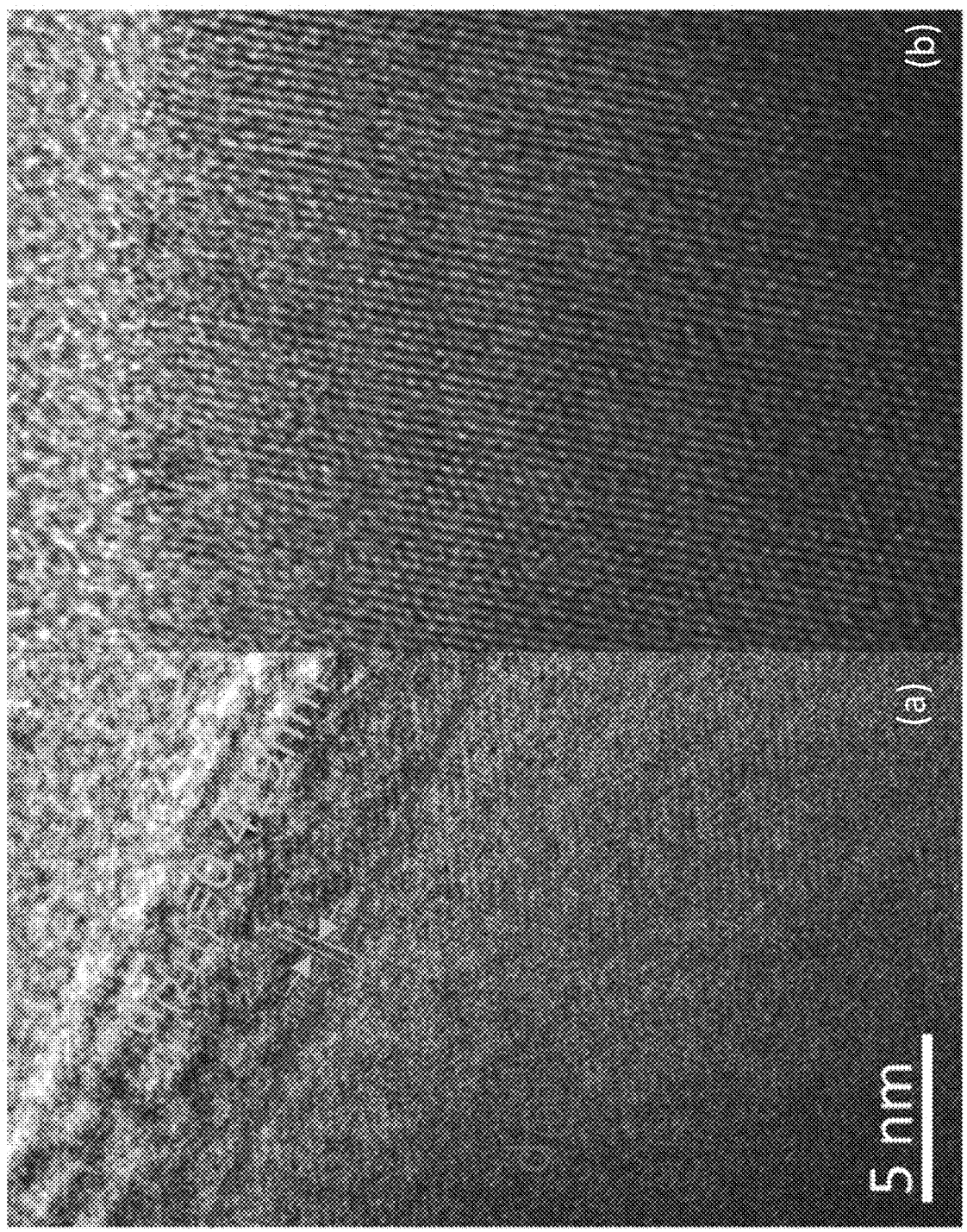
FIG. 8A shows HRTEM images of (a) $Li_{1.20}Mn_{0.48}Ni_{0.16}Co_{0.16}O_2$ particle after $MoO_3$ leaching and (b) after washing in water

The STEM-HAADF image of FIG. 1E and the HRTEM images of FIG. 4C show the well-retained layered structure and epitaxial crystallinity from the bulk 110 up to the surface 120 of $G_4$. FIG. 8A shows a HRTEM image of a $Li_{1.2}Mn_{0.48}Ni_{0.16}Co_{0.16}$ particle with a diameter of ~400 nm after $MoO_3$ leaching at 700° C. As shown, the particle surface region 120 includes (211) planes of $Li_2MoO_4$ with a lattice spacing of 0.429 nm, which indicates the $R_{3h}$ $Li_2MoO_4$ layer at the surface has a thickness of 5-6 nm. The volume ratio of $Li_2MoO_4$ may be estimated to be 8-9 vol % based on the dimensions above. The compressed density of the cathode material is another parameter that is particularly relevant to commercialization. Additional measurements showed the density was 2.9 g/cm³ with 80% active material and 3.2 g/cm³ with 90% active material. If the Li-rich bulk region and the $Li_2MoO_4$ were fully dense at a density of 4.3 g/cm³ (combination of $Li_2MnO_3$ and $LiCoO_2/LiNiO_2$) and 2.9 g/cm³, respectively, $Li_2MoO_4$ may be estimated to be at 5-6 wt % in the mixture. After washing, the layer of $Li_2MoO_4$ was removed as shown in FIG. 8A. The Li-rich particle also became lattice coherent from the bulk region 110 to the surface region 120, which corresponded to the ICP and EDS results after washing in water shown in FIG. 3.

This imagery also shows liquid $MoO_3$—$Li_2O$ wrapped fully around the Li-rich particles and extracted LiO from the surface of the particles. FIGS. 8B and 8c show SEM images before and after reactions (1)-(3). As shown, the pristine particles 300-400 nm in diameter became a bit more spherical in shape after reactions (1)-(3), which indicated some degree of short-ranged cation mobility at 700° C.

Figure 8D:
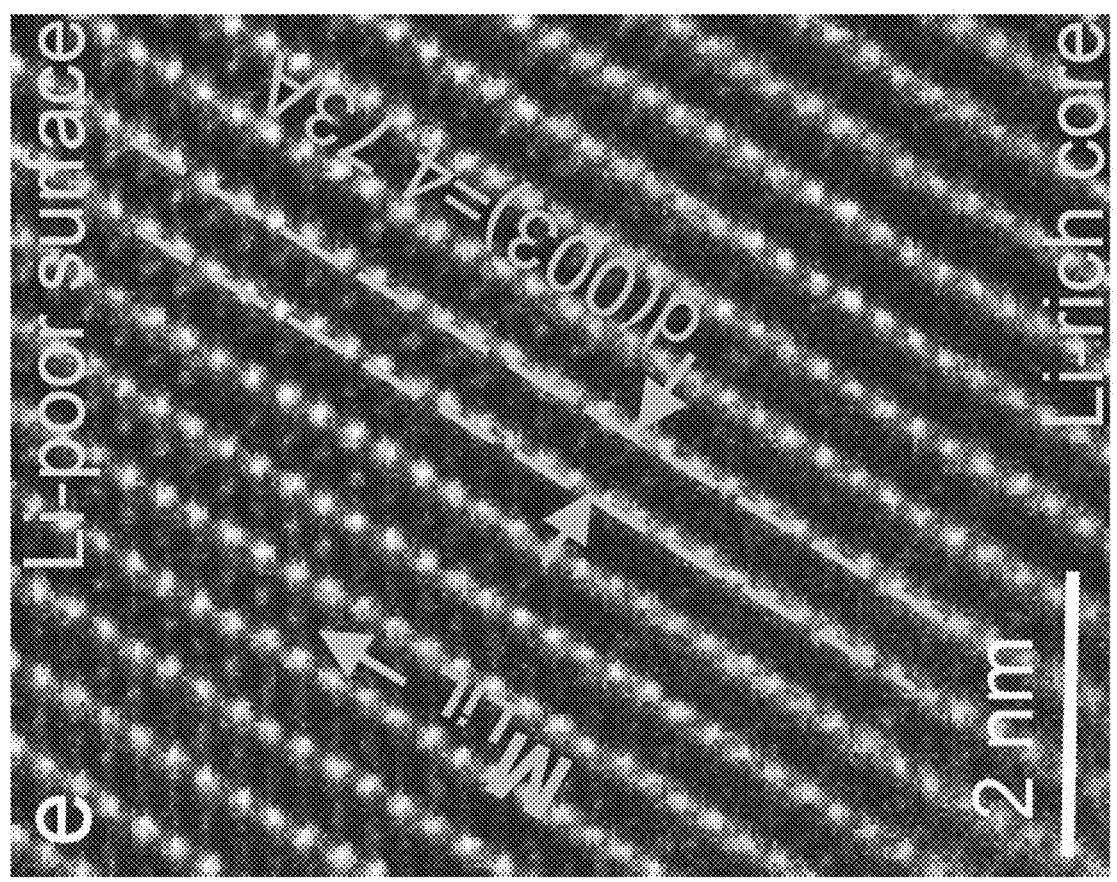
FIG. 8D shows an STEM-HAADF image of the Li-gradient region in the transition metal oxide particle from $X(r_{surface})=X_{poor}<0$ to $X(T_{core})=X_{rich}>0$, which shows a coherent lattice with $d_{(003)}=0.473$ nm in both Li-rich and Li-poor regions and $M_{LiL}$ pillars (due to the higher average Z of the atomic column) that disappears towards the core region.

FIGS. 1D and 8D further show the $LX_{(r)}MO$ particles maintained a coherent lattice between the surface and the core regions 120 and 110 and no phase transformation was observed unlike the particles formed using previous acid leaching methods. The $M_{LiL}$ may also be seen by comparing the STEM-HAADF images between $G_0$ and $G_4$ (see FIGS. 4B and 4C). The presence of $M_{LiL}$ in $G_4$ (FIG. 8D) also resulted in a reduced XRD I(003)/I(104) as shown in FIG. 4A. The $M_{LiL}$ pillars (minor $Ni^{2+}$ occupying the Li layers) stabilize the crystal structure to substantially reduce or, in some instances, prevent degradation (e.g., structural collapse) of the particle 100 during cycling while also providing Li diffusion pathways when cycling the battery.

Figure 9:
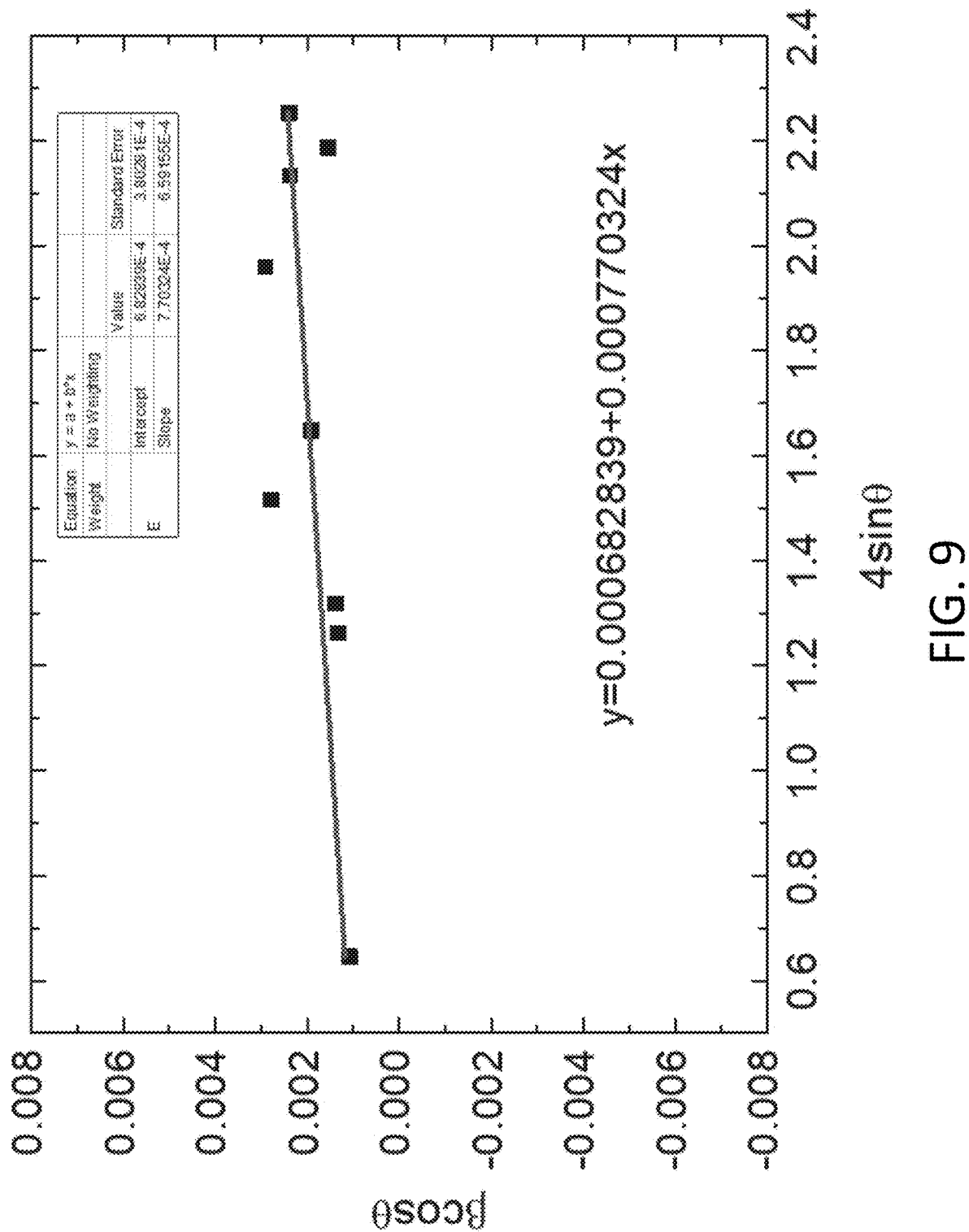
FIG. 9 shows Williamson-Hall (W-H) plots with linear fitting.

The micro-strain fluctuations (c) of the $LX_{(r)}MO$ particles were also calculated using the Williamson-Hall method. The Williamson-Hall (W-H) method was used to get the average grain size and micro-strain fluctuation c from XRD by assuming a uniform deformation model (UDM). The W-H analysis was based on the following equation:

$$\beta \cos \theta = k\lambda/D + 4\varepsilon \sin \theta \quad (4)$$

where $\beta$ was the peak width in radians at half-maximum intensity, D was the particle size, $\lambda$ was the wavelength of the radiation (1.54056 Å for Cu Kα radiation), k was the shape factor constant equal to 0.9, $\varepsilon$ was the assumed uniform-deformation micro-strain fluctuation (independent of Miller indices) and $\theta$ was the peak position. Based on the slope of FIG. 9, the micro-strain fluctuation c was found to be as low as 0.077% and the residual stress on the order of 70 MPa.

Figure 10A:
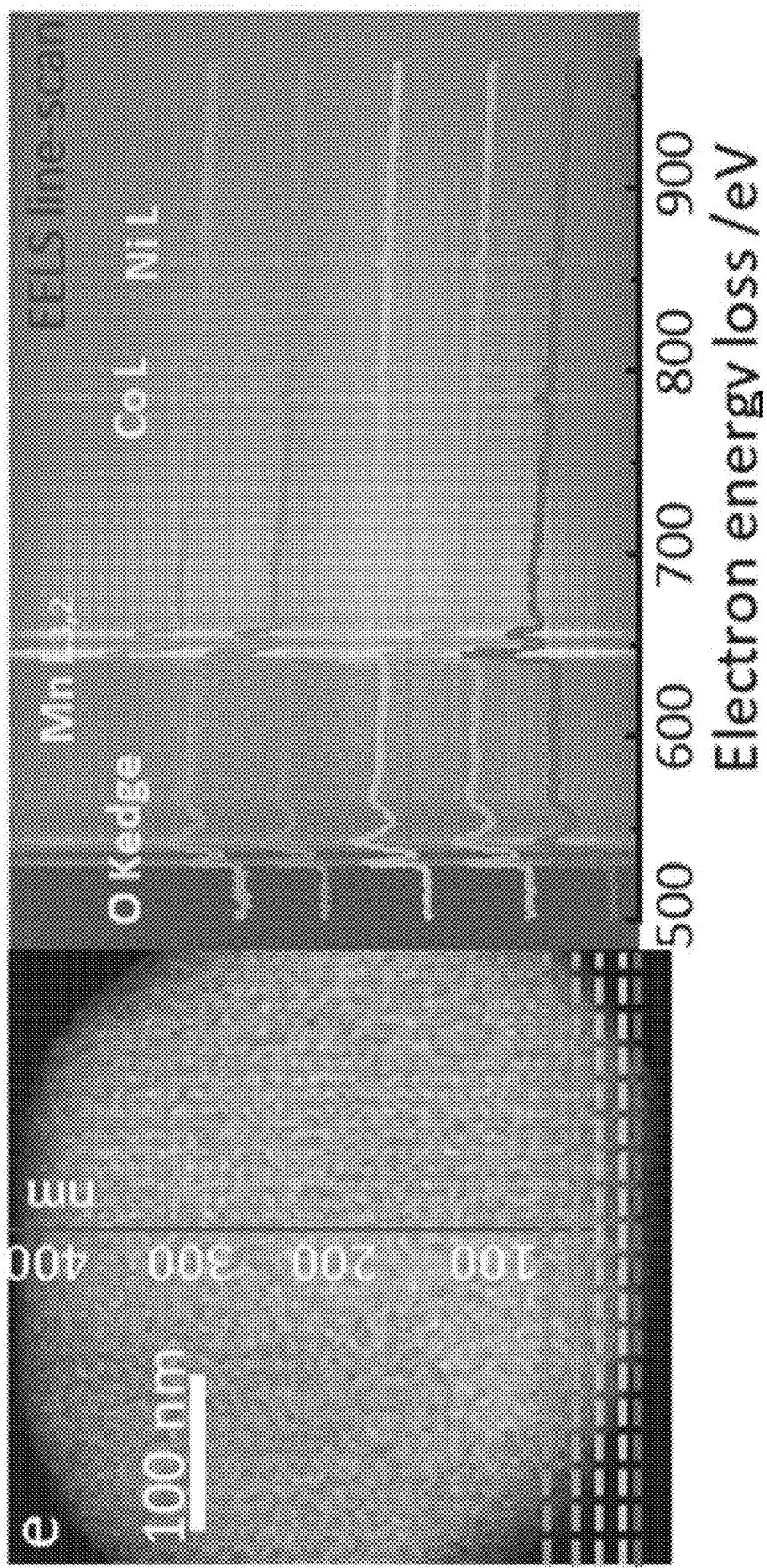
FIG. 10A shows several electron energy loss spectroscopy (EELS) line scans across a 400 nm transition metal oxide particle and corresponding EELS spectra. The raw data is shown (i.e., before background subtraction with Gatan software).
Figure 10B:
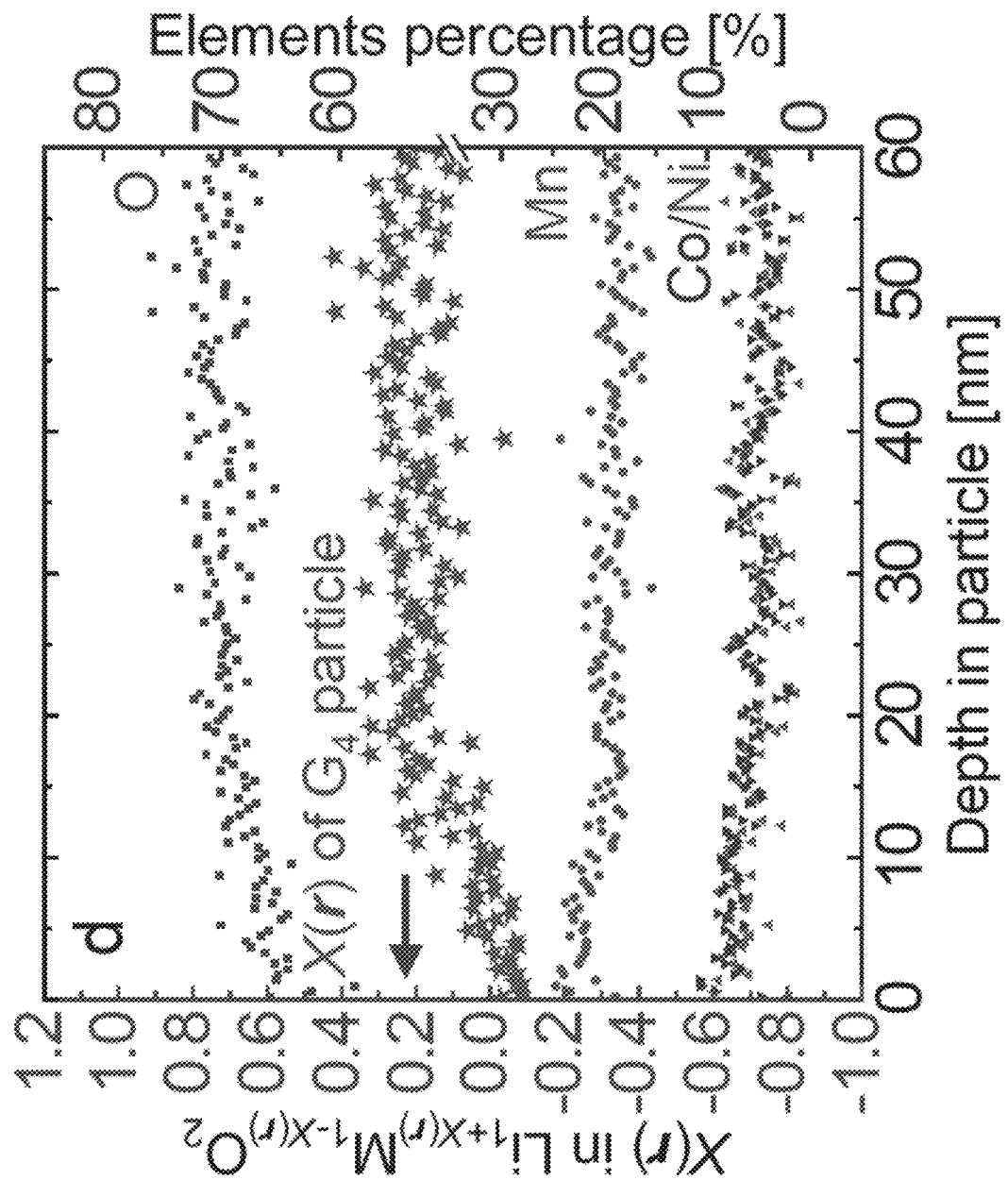
FIG. 10B shows the X(r) profile (left y-axis) and element percentages (right y-axis) from the surface to the bulk of a $G_4$ particle calculated based on the EELS data of FIG. 10A.
Figure 11A:
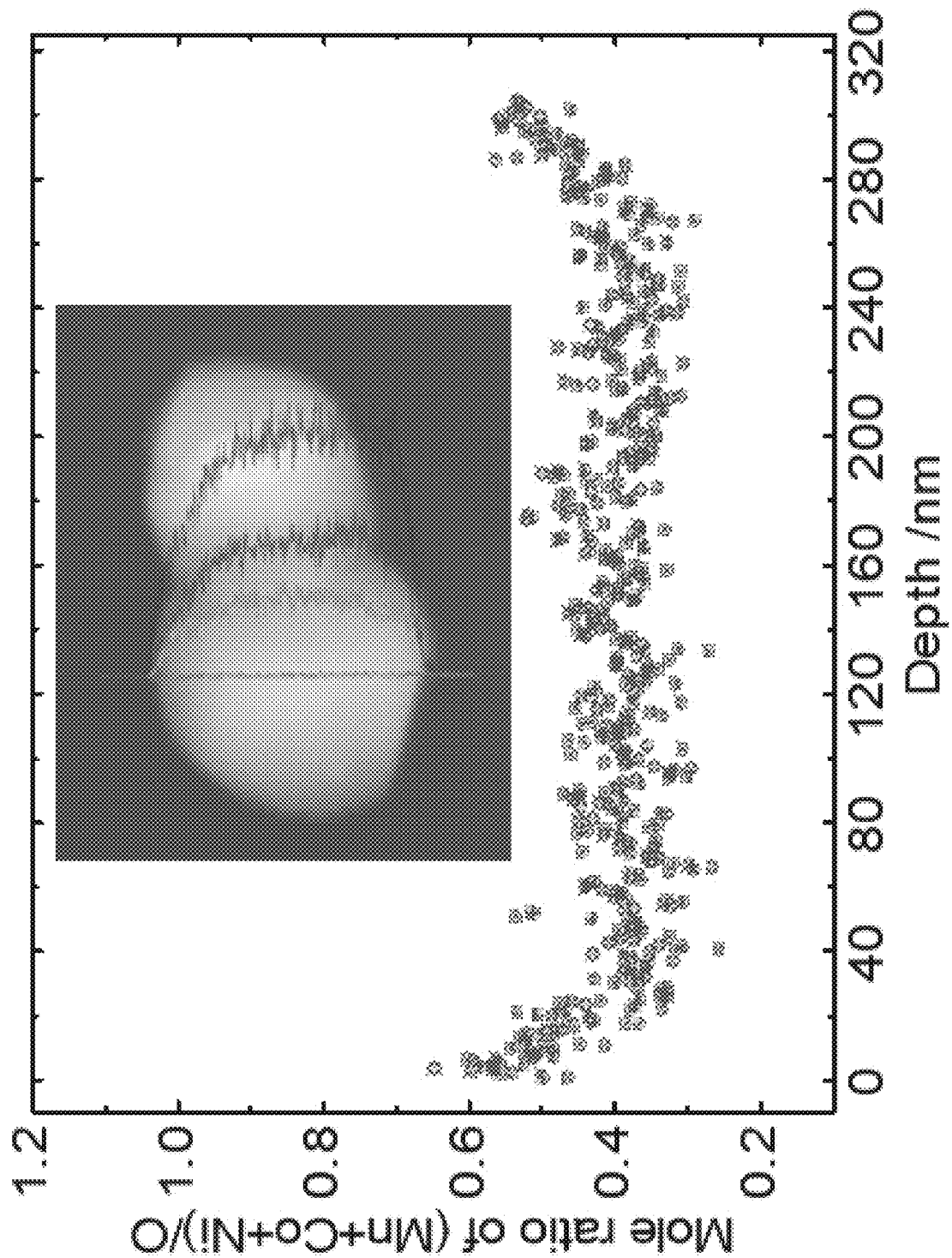
FIG. 11A shows EDS results to detect the σ distribution in a ~300 nm particle.

An electron energy loss spectroscopy (EELS) line scan was used to quantify the Li-gradient profile across the $G_4$ particle (diameter ~400 nm), as shown in FIG. 10A. Since Li is difficult to quantify using EELS, the transition metal-to-oxygen molar ratio $\sigma = M/O = \Sigma(Mn+Co+Ni)/O$ (equal to $(1-X(r))/2$ for $Li_{1+X(r)}M_{1-X(r)}O_2$ or $Li_{1+x(r)}Mn_{0.6-0.6x(r)}Co_{0.2-0.2x(r)}Ni_{0.2-0.2x(r)}O_2$ in the case of NMC) was used to get the X(r) profile. FIG. 10B shows the X(r) distribution from the bulk 110 of the particle 100 to the surface 120 (diameter ~400 nm). The particle 100 was leached with 4 wt % $MoO_3$ ($G_4$). As shown, the X≈0.20 in the bulk agreed well with the feedstock $Li_{1.20}Mn_{0.48}Co_{0.16}Ni_{0.16}O_2$. However, X(r) gradually decreased from 0.20 to about −0.05 from the core region 110 to the surface region 120 within a depletion zone thickness of ~17 nm. The ratio of Mn, Co, Ni was maintained at nearly 3:1:1 across the particle. The Li-poor surface of $G_4$ had a composition of $Li_{0.95}Mn_{0.63}Co_{0.21}Ni_{0.21}O_2$. FIG. 11A shows EDS line mapping of the mole ratio of Mn, Co, Ni, which further confirms the mole ratio was maintained from the surface region 120 to the core region 110 of a particle 100 with a diameter of ~300 nm.

Figure 11B:
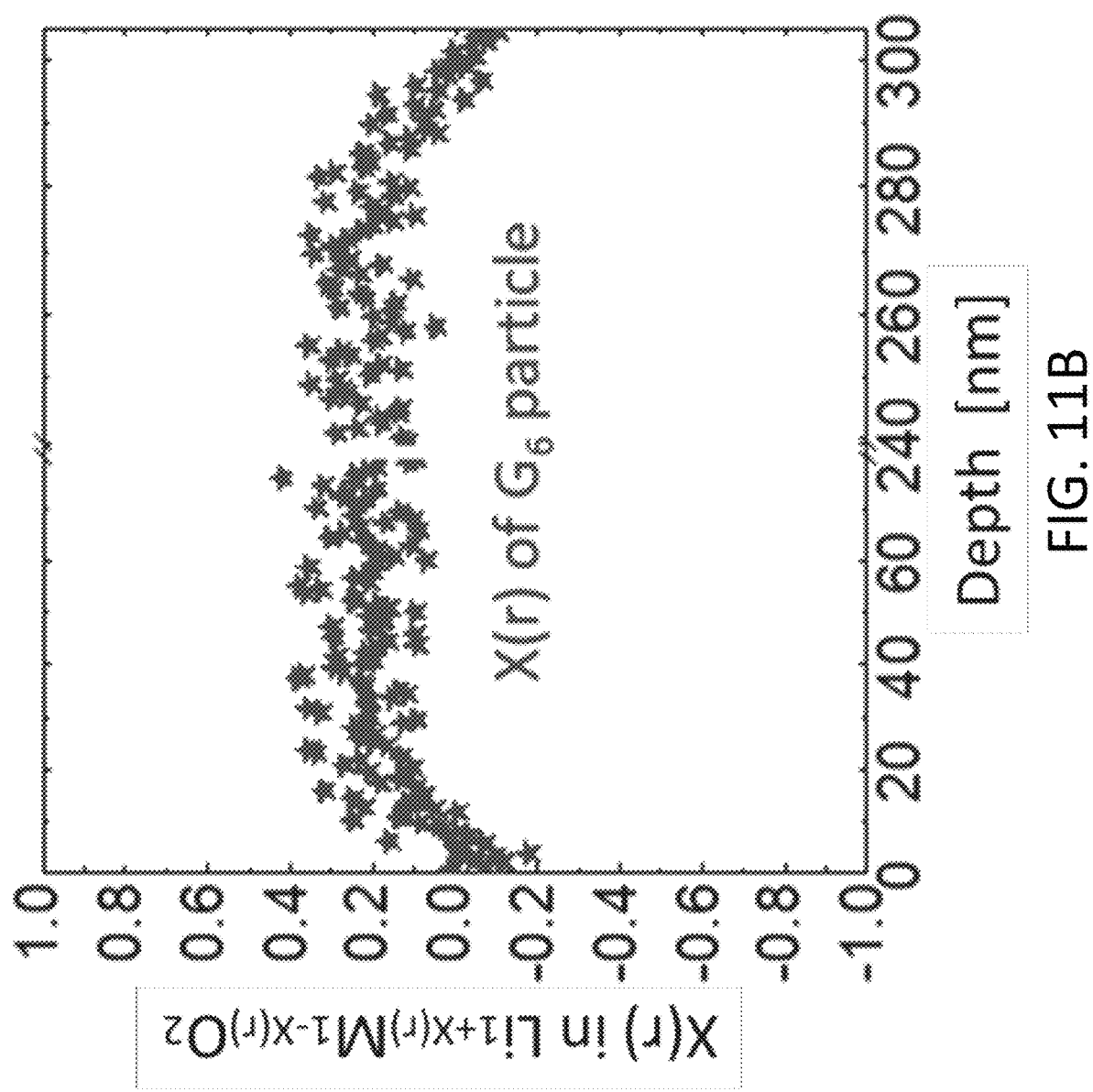
FIG. 11B shows the X(r) profile from the surface to the bulk of a $G_6$ particle.

In another example, FIG. 11B shows the X(r) profile of particles leached with 6 wt % $MoO_3$ ($G_6$) measured using EDS. As shown, a ~18 nm Li-depletion region was observed from $Li_{1.20}Mn_{0.48}Co_{0.16}Ni_{0.16}O_2$ to $\sim Li_{0.90}Mn_{0.66}Co_{0.22}Ni_{0.22}O_2$ at the surface of a ~310 nm particle. In this manner, the thickness and depletion extent of the Li-gradient region 130 may be tuned by the amount of $MoO_3$, the leaching temperature, and time to increase the electrochemical performance.

For example, the ICP results shown in FIG. 7B were used to obtain the overall composition of $G_0$, which was found to be $Li_{1.221}Mn_{0.48}Co_{0.16}Ni_{0.16}O_2$. The composition of $G_0$ was also measured after washing in water at 70° C. to remove $Li_2CO_3$ or LiOH. The Li composition was found to be 1.202 (FIG. 12). Therefore, the 1.221-1.202=0.019 excess Li is believed to have come from unreacted $Li_2CO_3$ and/or LiOH in the initial $G_0$ sample, which may be removed after water-washing.

Figure 13:
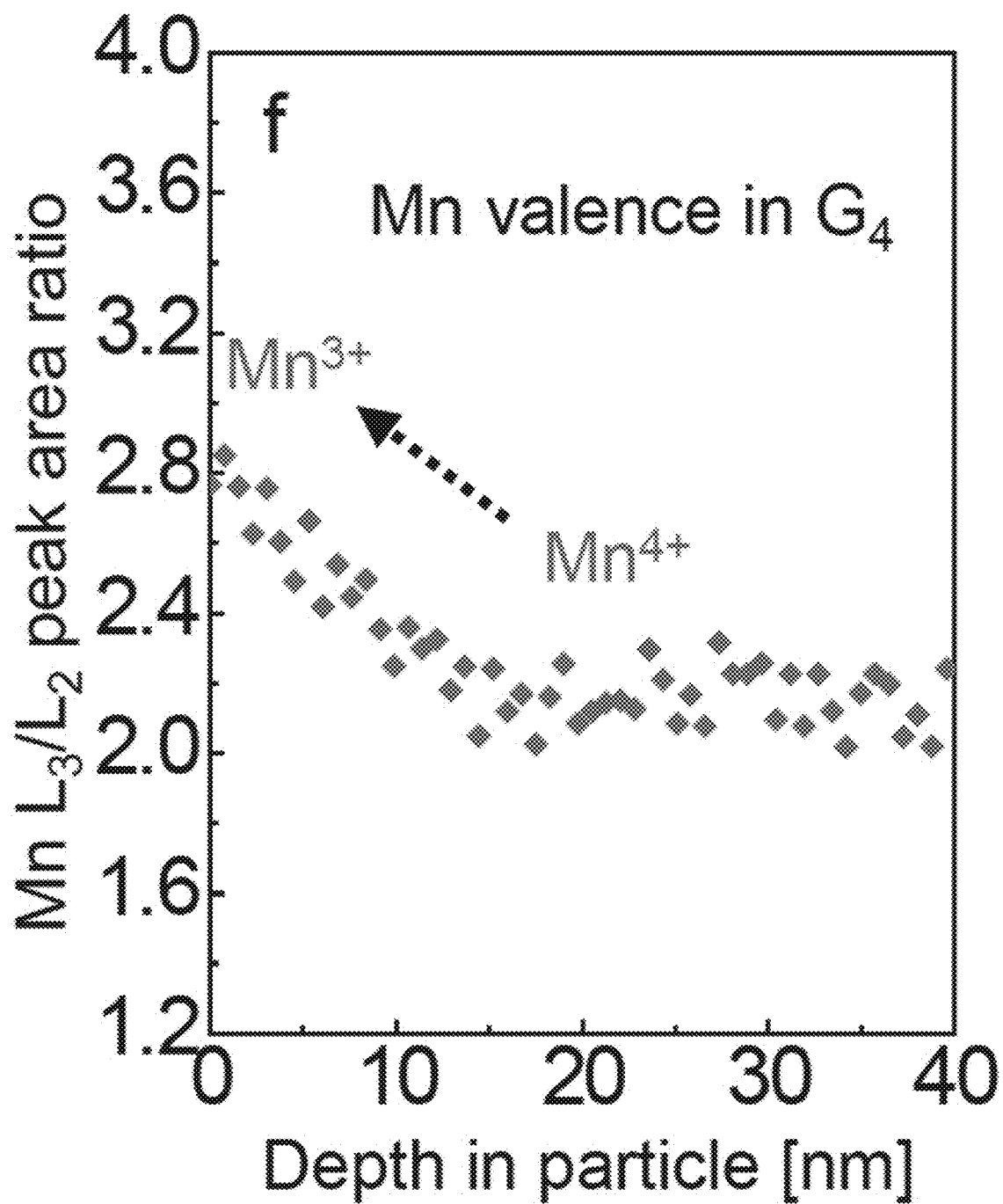
FIG. 13 shows the ratio of Mn $L_3$, $L_2$ peak area near the surface indicating valence change of Mn ions.

The ICP results indicated Mn, Co, Ni content was not lost during the leaching process while the Li content was reduced to 1.173 from the original 1.221 (see $G_4$ in FIG. 7B). The decrease of $\Delta Li=1.173-1.221=-0.048$ was approximately double the amount of $MoO_3$ used (0.0238, 4 wt% see FIG. 7B). Therefore, the $MoO_3$ transformed into $Li_2MoO_4$ after leaching and the amount was 0.0238. The composition was thus 1 $Li_{1.173}Mn_{0.48}Co_{0.16}Ni_{0.16}O_{1.973}$ (M=85.0)+0.238 $Li_2MoO_4$; hence, $Li_2MoO_4$ was calculated to be 4.7 wt% ($0.0238 \times 174/(0.0238 \times 174+85.0)$) in the intermediate product. After washing with water, this $Li_2MoO_4$ layer was removed, as shown in FIG. 13A. The weight loss after water washing was carefully measured to be 4.9±0.1%, which was similar to the ICP analysis.

Furthermore, the ICP analysis corresponded well with EELS line scan results. From the ICP of $G_0$, a $\Delta Li=-0.029$ (1.173-1.202) was leached from the Li-rich particle, while 0.019 Li was from the $Li_2CO_3$ or LiOH. The EELS line scan across the $G_4$ particle in FIG. 10A indicates that the bulk composition was still $Li_{1.20}Mn_{0.48}Co_{0.16}Ni_{0.16}O_2$(X(bulk)=0.2). The Li gradient region 130 (where X(r) gradually decreasing from 0.20 to ~−0.05) was ~17 nm thick along the surface of a ~400 nm diameter particle, thus the volume of the gradient region 130 may be estimated to be ~23.4% of the total volume of the particle. Assuming X(r) changes linearly from 0.2 in the core region 110 to −0.05 at the surface region 120, it may be estimated that $\Delta Li=-0.0293$ ($=0.234 \times (-0.05-0.20) \times \frac{1}{2}$) was lost in the gradient region 130, which was similar to the amount of Li (-0.029) leached by $MoO_3$ from the $G_0$ particle (excluding the Li from $Li_2CO_3$ or LiOH). Therefore, the LiO leached by $MoO_3$ from $G_0$ came primarily from the ~17 nm thick Li gradient region 130 in the $G_4$ particle. This indicates the amount of $MoO_3$ aid added, the temperature, and/or the leaching time may affect the Li gradient profile.

Figure 14A:
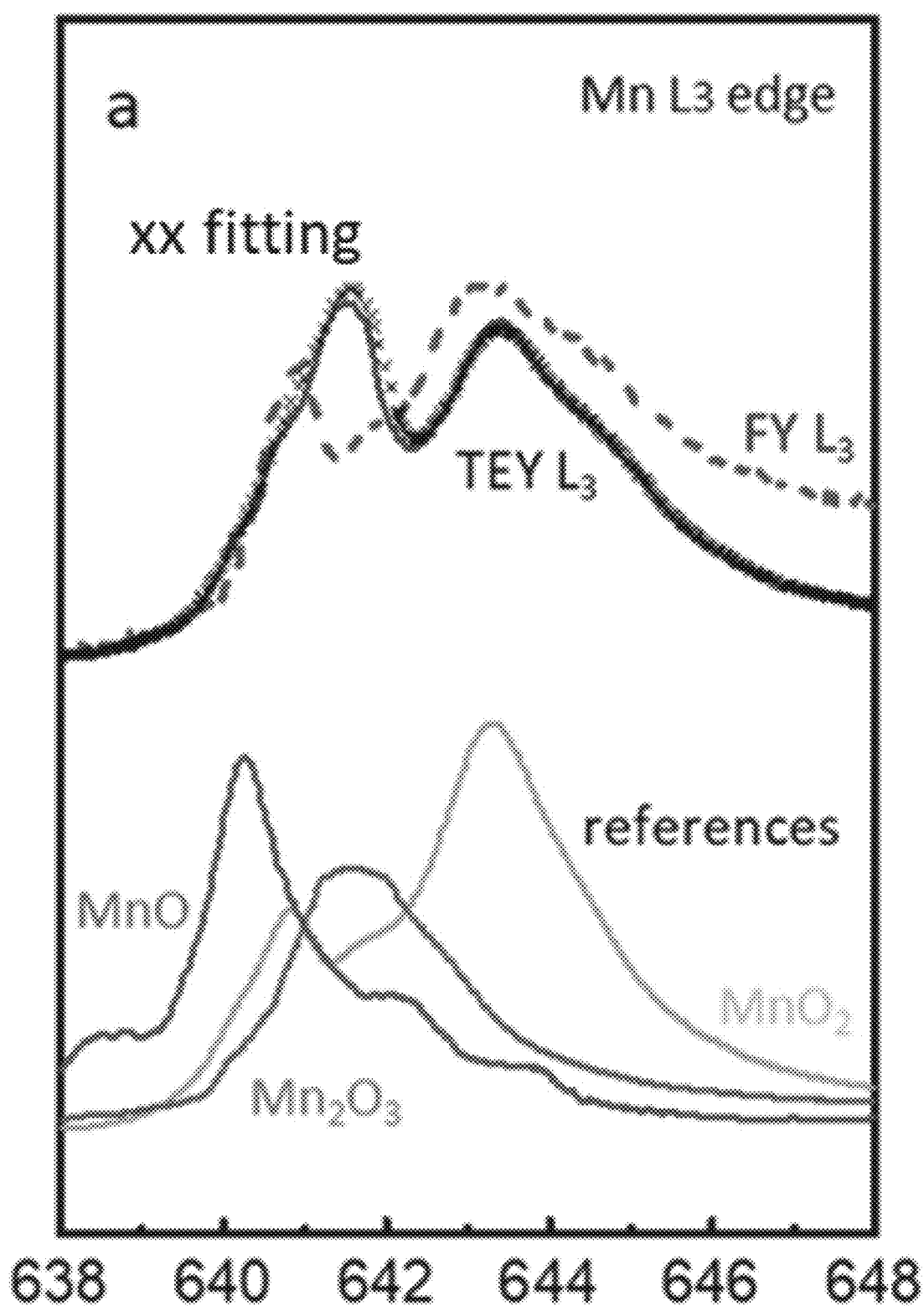
FIG. 14A shows the L3,2 edge of Mn in a $G_4$ particle collected from FY (red) and TEY (black) modes with linear fitting by standard references.
Figure 14B:
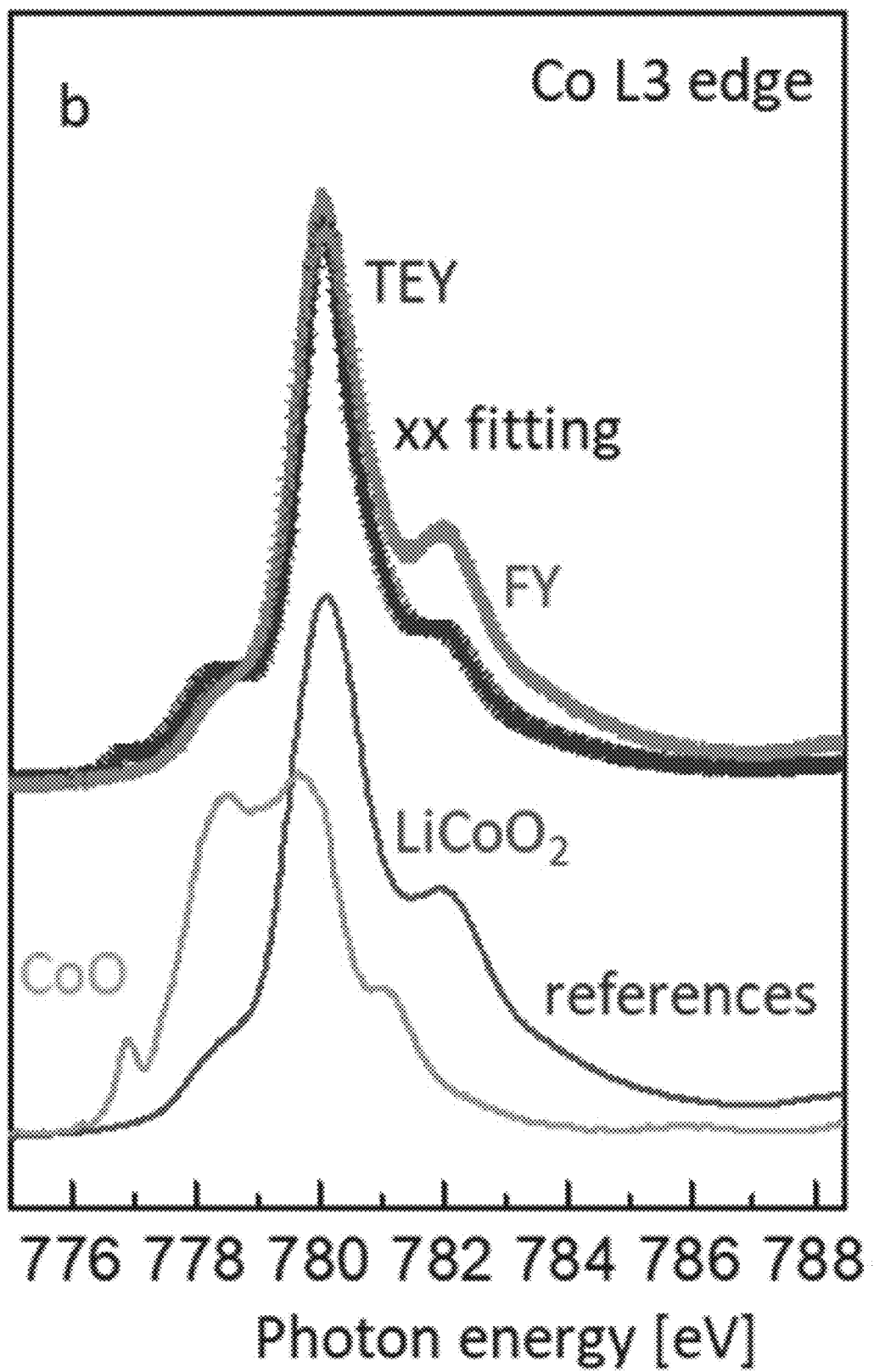
FIG. 14B shows the L3,2 edge of Co in a $G_4$ particle collected from FY (red) and TEY (black) modes with linear fitting by standard references.
Figure 14C:
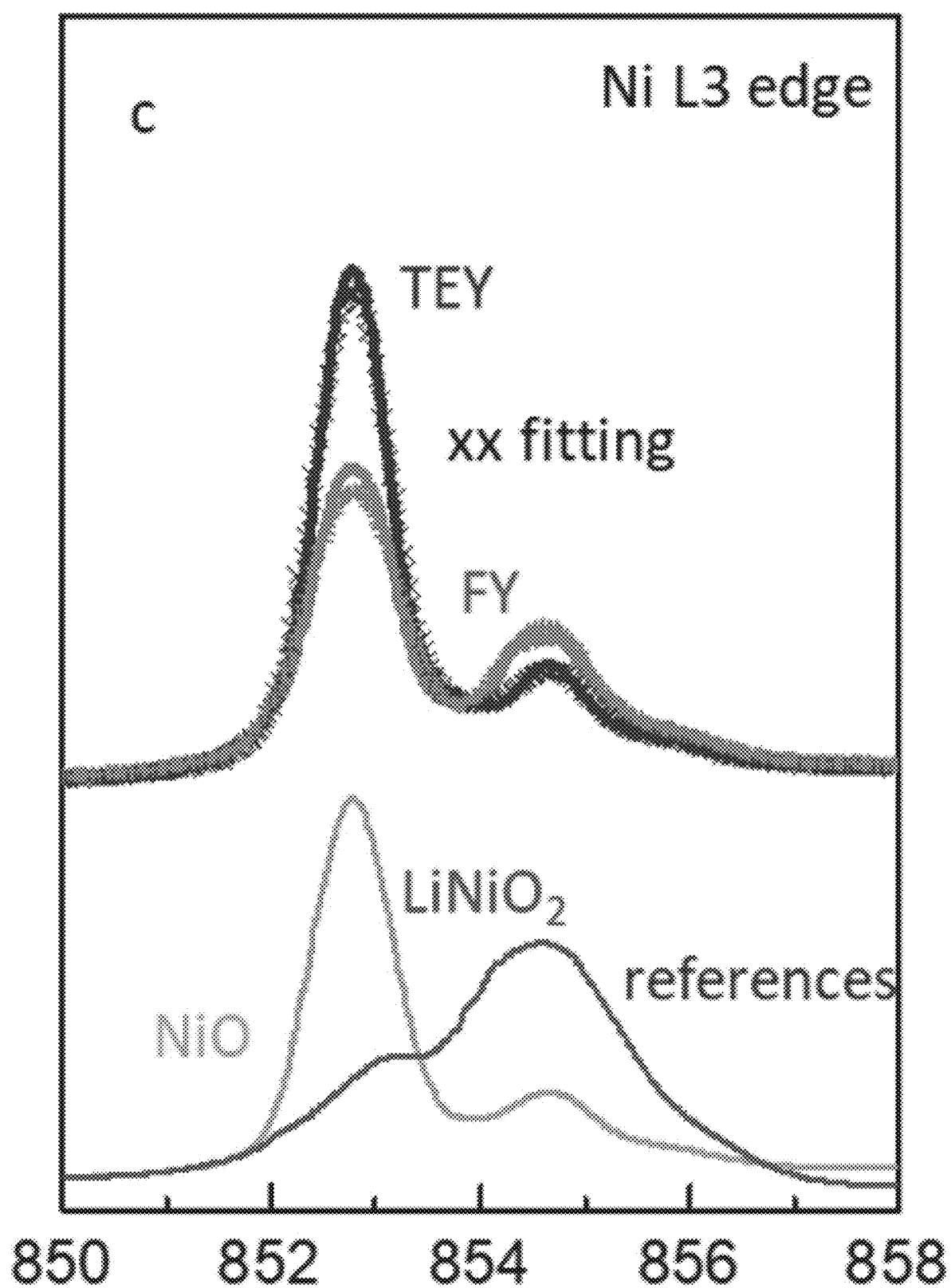
FIG. 14C shows the L3,2 edge of Ni in a $G_4$ particle collected from FY (red) and TEY (black) modes with linear fitting by standard references.

The Li-gradient region 130 was also observed to have a reduced cation valence since LiO was leached from the particle to maintain charge balance from $Li_{1.20}^+Mn_{0.48}^{4+}Co_{0.16}^{3+}N_{0.16}^{2.5+}O_2^{2-}(r_{core})$ to $Li_{0.95}^+Mn_{0.63}^{3.17+}Co_{0.21}^{3+}N_{0.21}^{2+}O_2^{2-}(r_{surface})$. The increase in the ratio of the Mn $L_3$, $L_2$ peak area ($A_{L3}/A_{L2}$) in FIG. 13 also indicates $Mn^{3+}$ was generated and gradually increased in concentration from the bulk 110 to the surface 120. There is electrostatic potential variation and band bending inside the particles, similar to p-n junction with gradient doping. The reduced valences of other M from the Li-rich bulk 110 to the Li-poor surface 120 were measured using sXAS as shown in FIGS. 14A-14C. The M L3 edges were quantitatively fitted using a linear combination of standard references to indicate the M valence in the bulk region 110 and the surface region 120 of the $G_4$ particle 100. Linear fitting was not carried out on the Mn FY L3 edge because of self-absorption and saturation effects. The quantitative fitting on Mn TEY L3 edge shows that 5% $Mn^{2+}$, 54% $Mn^{3+}$ and 41% $Mn^{4+}$ were contained up to a 10 nm depth in the Li-poor surface region 120, thus the average Mn valence was +3.36 in the $G_4$ surface region 120. The linear fitting on Co L3 edge shows that the Co valence is 100% in +3 in the bulk region 110 and comprised 5% $Co^{2+}$ and 95% $Co^{3+}$ (average valence: +2.95) at the surface region 120. The linear fitting on Ni L3 edge shows that that Ni ions at the surface are 100% $Ni^{2+}$ and comprised a mixture of 61% $Ni^{2+}$ and 39% $Ni^{3+}$ (average valence: +2.39) in the bulk region. Pre-positioning these reduced-valence $M_{LiL}$ at the surface suppresses anion-redox and keeps the surface fully dense during cycling.

These results show the synthesized $LX_{(r)}MO$ single crystals were formed with a fully coherent layered lattice even when the Li content varied from the high richness (X=0.2) in the core to slight poorness (X=−0.05) at the surface. Furthermore, no new phase nor grain boundaries were observed within the particle with the Li gradient, as shown in FIG. 10B. The oxygen sites in $Li_{1+X(r)}M_{1-X(r)}O_2$ were occupied and formed an integral oxygen framework, which was favorable for both Li and electron conduction and stress accommodation. These results are distinguished from previous work where LXMO particles were coated, which exhibited unavoidable grain/phase boundaries. These phase boundaries led to stress stress-induced spallation and oxygen mobility in previous studies.

3.2 Suppressed Oxygen Release and Enhanced Cycling Performance of $LX_{(r)}MO$

Differential electrochemical mass spectrometry (DEMS) was performed on $G_0$, $G_4$, and $G_6$ samples to characterize the electrochemical performance of the $LX_{(r)}MO$ particles. R2032 coin cells were used for the electrochemical tests. Half-cells were fabricated from a cathode of 80 wt% active material, 10 wt% carbon black, and 10 wt% polyvinylidene fluoride (PVDF) binder, which was pasted on an Al current collector, at a loading of 10 mg $cm^{-2}$; an anode of Li metal sheets; a separator of Celgard 2400 polymer; and a commercial electrolyte of 1 M $LiPF_6$ dissolved in a mixture of EC and DEC with a volume ratio of 1:1, and 2 wt% vinylene carbonate additive.

A LAND CT2001A 8-channel automatic battery test system (Wuhan Lanhe Electronics) was used for charging/discharging the cells. An electrochemical workstation (Gamry Instr, Reference 3000) was used for cyclic voltammetry scanning between 2.2-4.8 V. Galvanostatic intermittent titration technique (GITT) was also performed on electrochemical workstation with constant current for 200 seconds followed with 1800 seconds relaxation with upper voltage of 4.8 V and lower limitation of 2.0 V. Electrochemical impedance spectroscopy was performed between 0.1 Hz and 1 MHz with 10 mV amplitude.

The electrochemical tests were carried out at room temperature. A self-made quantitative DEMS was used to detect and analyze the gas during the cell testing. Two glued polyether ether ketone (PEEK) capillary tubes were used as the inlet and the outlet for gas. The cell was fabricated in a glove box where $O_2<0.1$ ppm. Then, the output tube was connected to a commercial Thermo mass spectrometer (MS). High-purity Ar gas was used as the carrier gas with a flow rate of 3 mL $min^{-1}$ during the cycling process. In the cyclic voltammetry process, the scan rate was 0.05 mV $s^{-1}$, and MS spectra were collected every 30 s.

Figure 15A:
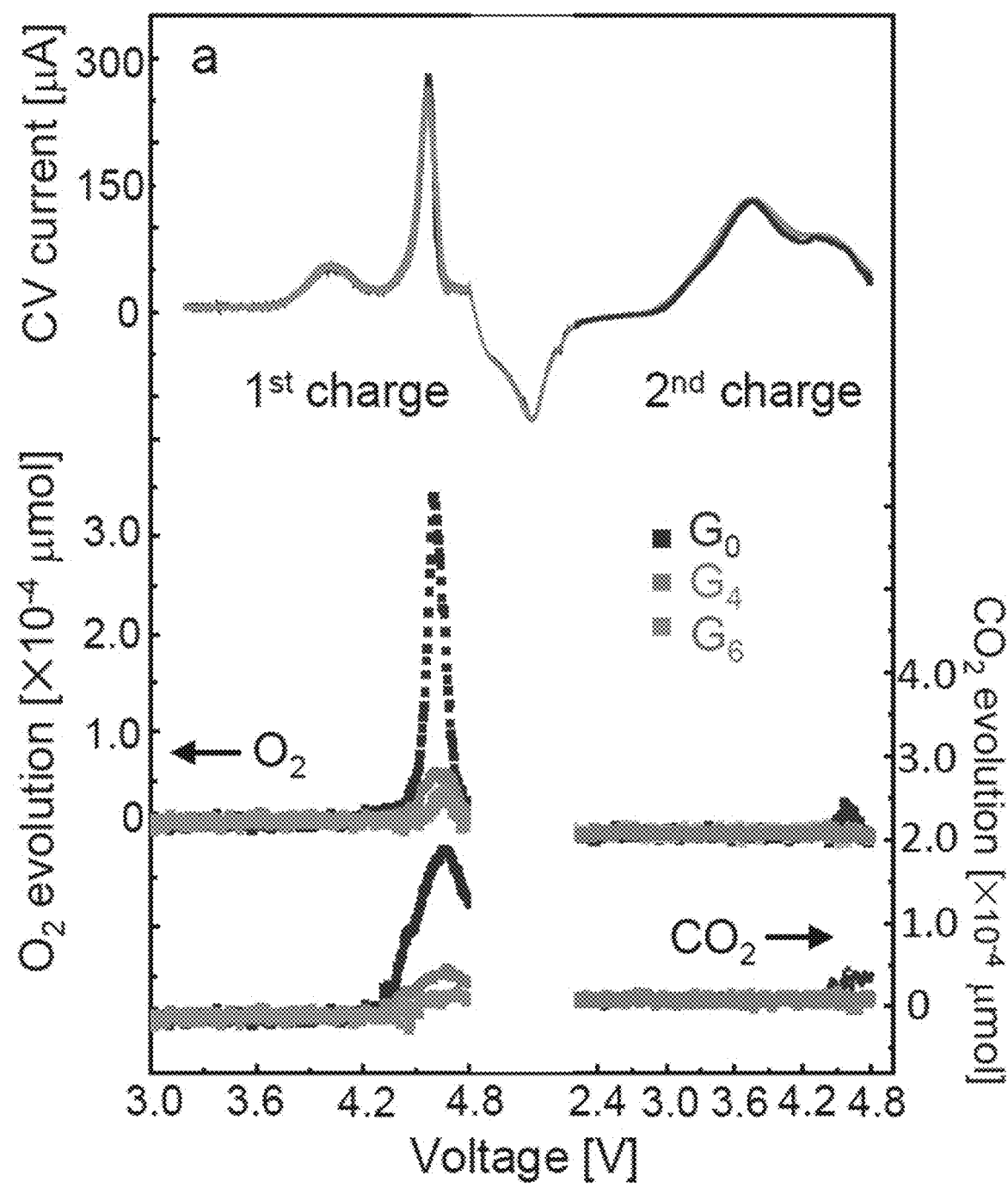
FIG. 15A shows the differential electrochemical mass spectrometry (DEMS) of $G_0$, $G_4$ and $G_6$ based on a cyclic voltammetry test performed with a voltage range of 2.2-4.8 V and 0.1 mV/s scan rate. The weights of all $G_0$, $G_4$ and $G_6$ active materials were 8.0~9.0 mg. The mass spectra of m/z=32 for $O_2$, m/z=44 for $CO_2$ were collected in the initial two positive scanning sweeps.

FIG. 15A shows an $O_2$(gas) evolution peak of $3.4 \times 10^{-4}$ μmol between 4.5-4.6 V was detected from $G_0$ in the first cycle. In contrast, little $O_2$(gas) was detected from either $G_4$ or $G_6$. During the $2^{nd}$ cycle, the $O_2$(gas) signals for $G_4$ and $G_6$ were entirely absent while $G_0$ exhibited an observable $O_2$(gas) signal. This indicates the Li-gradient surface 120 had indeed suppressed the release of oxygen gas during charging. Also, a substantial amount of $CO_2$(gas) was released from $G_0$ while being substantially negligible for $G_4$ or $G_6$. The concurrent release of $O_2$ and $CO_2$ suggests that the elimination of $O_2(g)$ release prevents carbonate electrolyte decomposition. The liquid electrolyte in industrial batteries is typically ~40 wt % of the cathode and should wet the anode, cathode and separator. The liquid electrolyte, however, is consumed by the cathode (and the anode) and is thus the limiting resource for full-cell cycling. The $LX_{(r)}MO$ particles described herein should lead to better full-cell cycle life by reducing or, in some instances, preventing the decomposition of carbonate electrolyte.

Figure 15B:
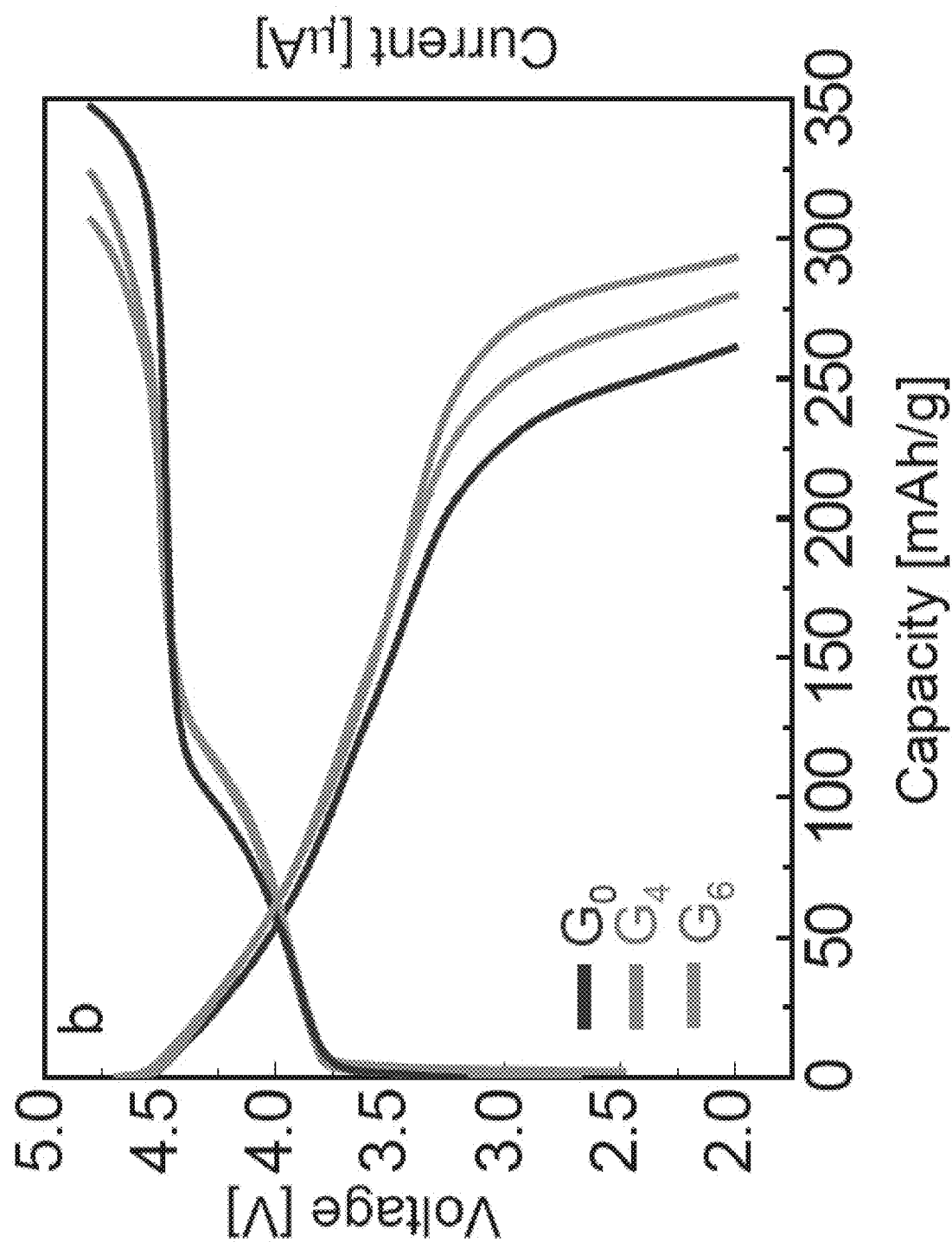
FIG. 15B shows the charge/discharge profiles of $G_0$, $G_4$, and $G_6$ for the $1^{st}$ cycle under 0.1 C (1 C=250 mAh/g).
Figure 15C:
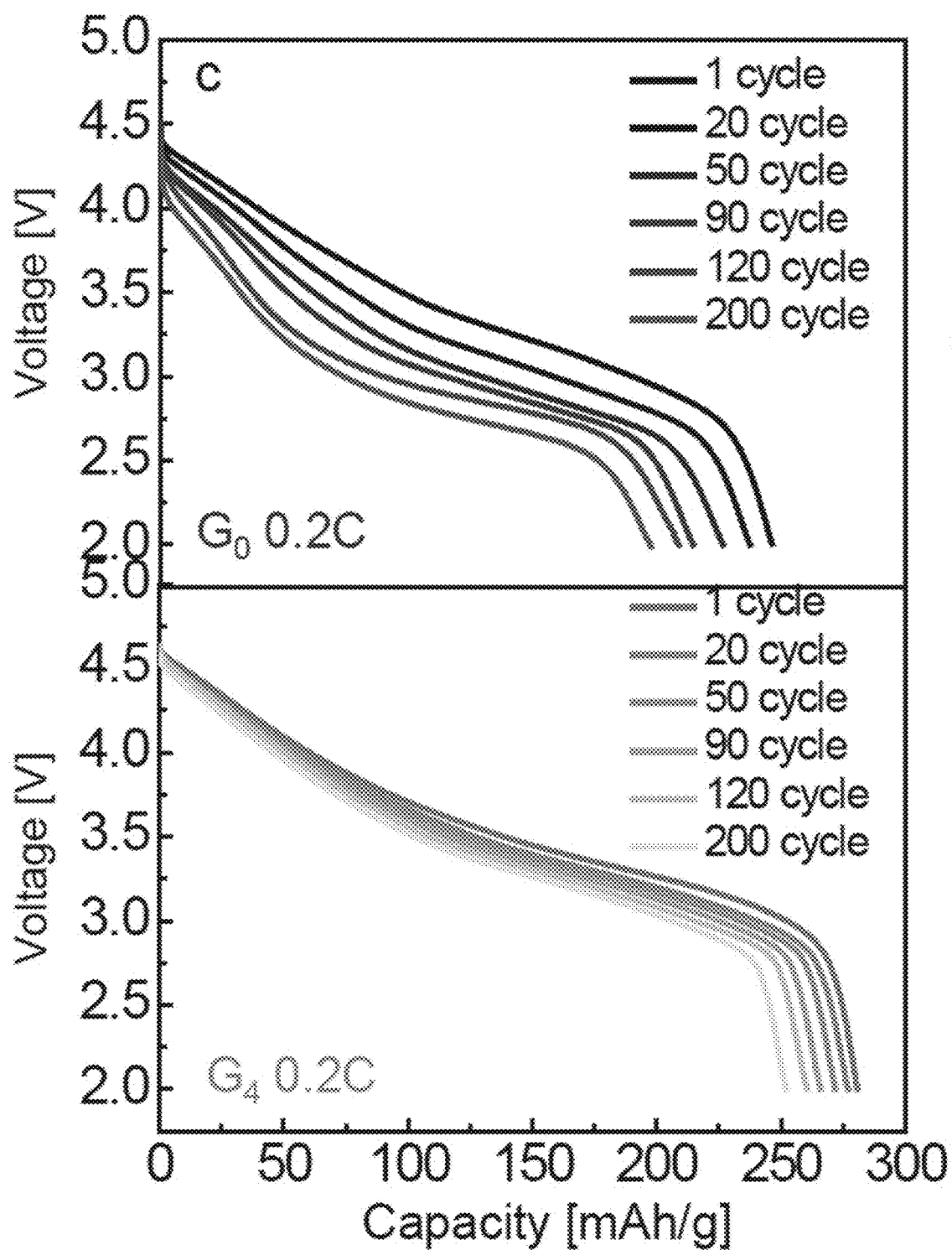
FIG. 15C shows the charge/discharge profiles of $G_0$ and $G_4$ for the $1^{st}$, $20^{th}$, $50^{th}$, $90^{th}$, $120^{th}$, and $200^{th}$ cycle after 5 formation cycles at 40° C. and 0.1 C.
Figure 16A:
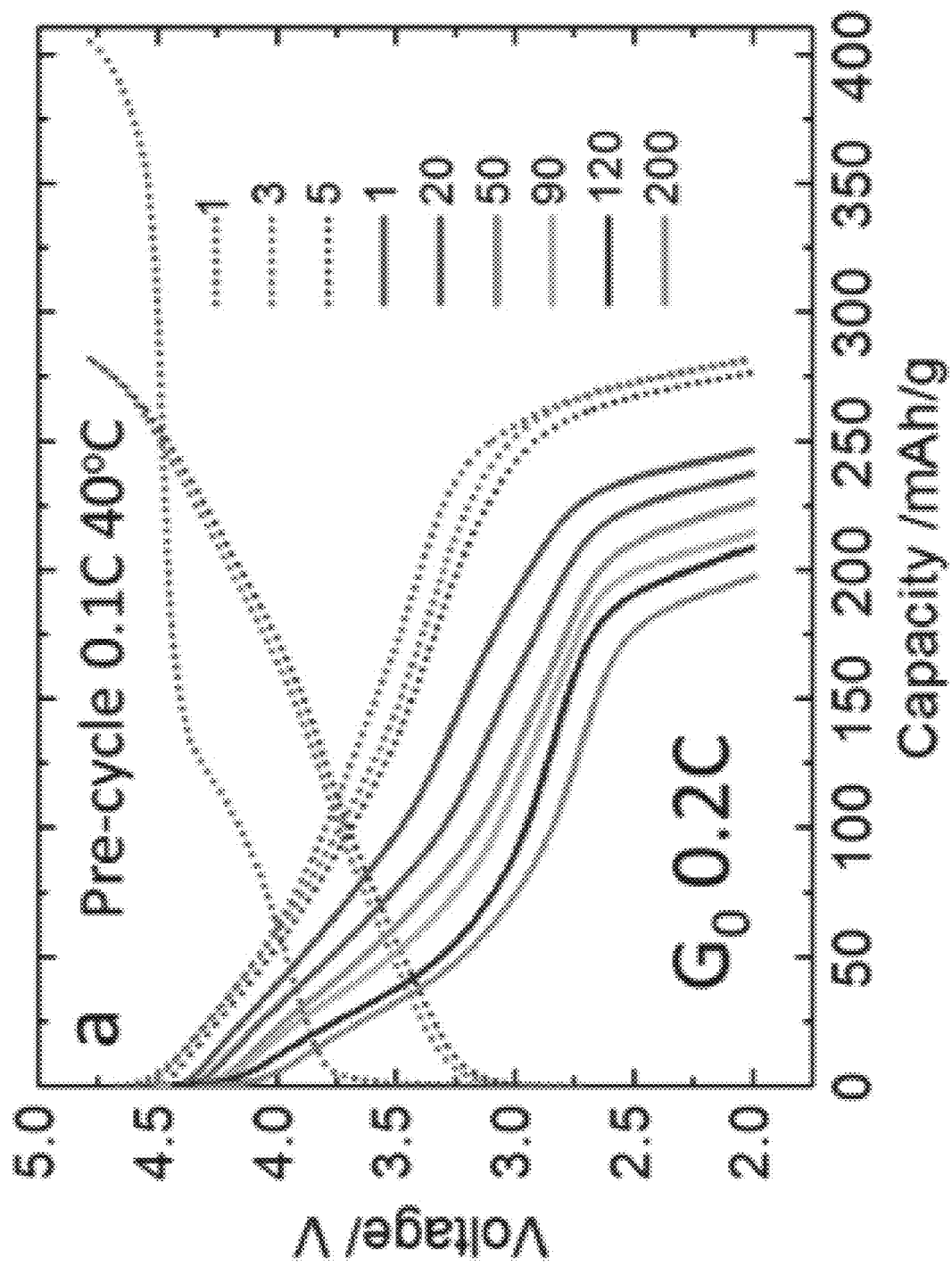
FIG. 16A shows the charge/discharge profiles of $G_0$ pre-cycled at 40° C., 0.1 C (dashed line) for 5 cycles and then cycled at 25° C. and 0.2 C.
Figure 16B:
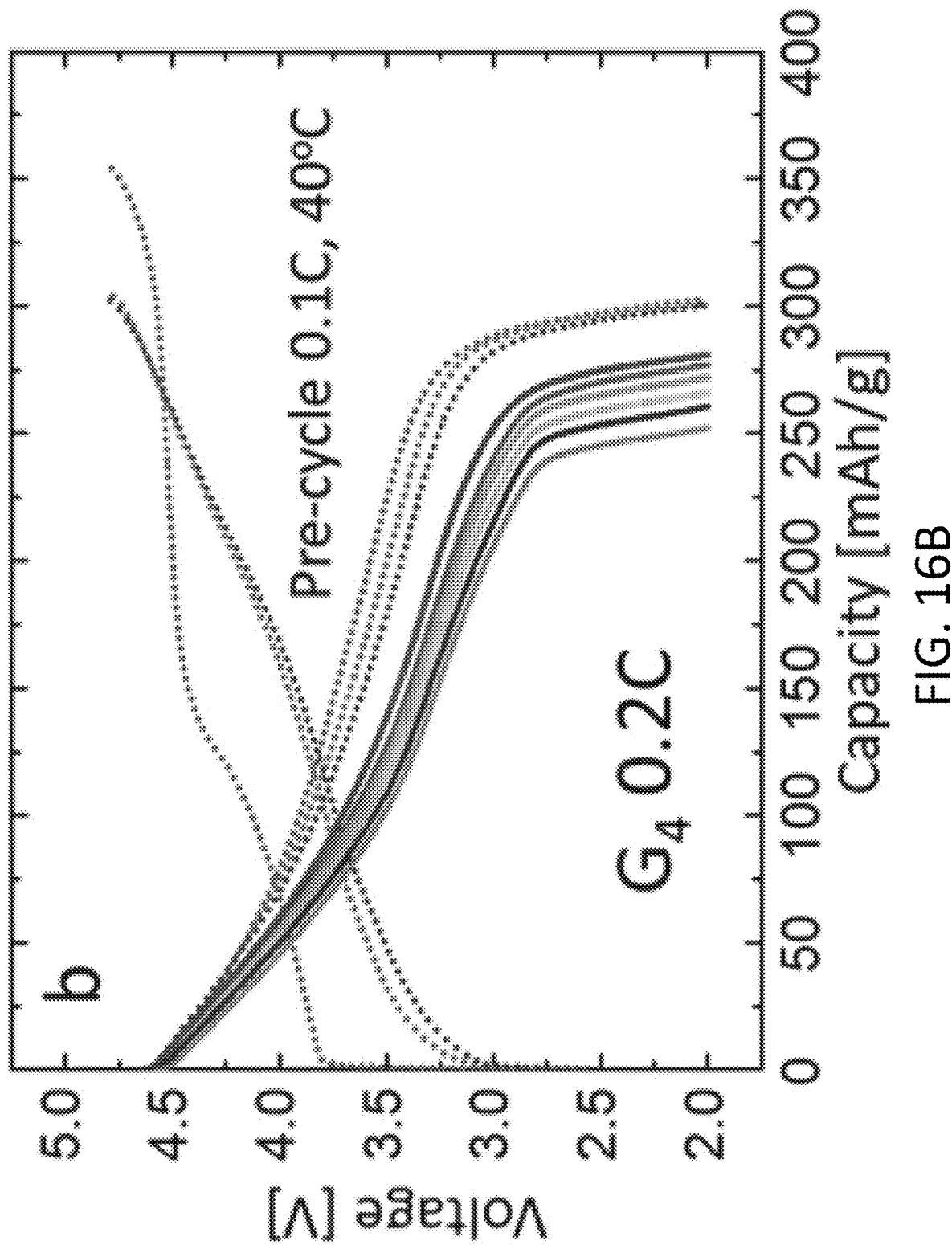
FIG. 16B shows the charge/discharge profiles of $G_4$ pre-cycled at 40° C., 0.1 C (dashed line) for 5 cycles and then cycled at 25° C. and 0.2 C.
Figure 16C:
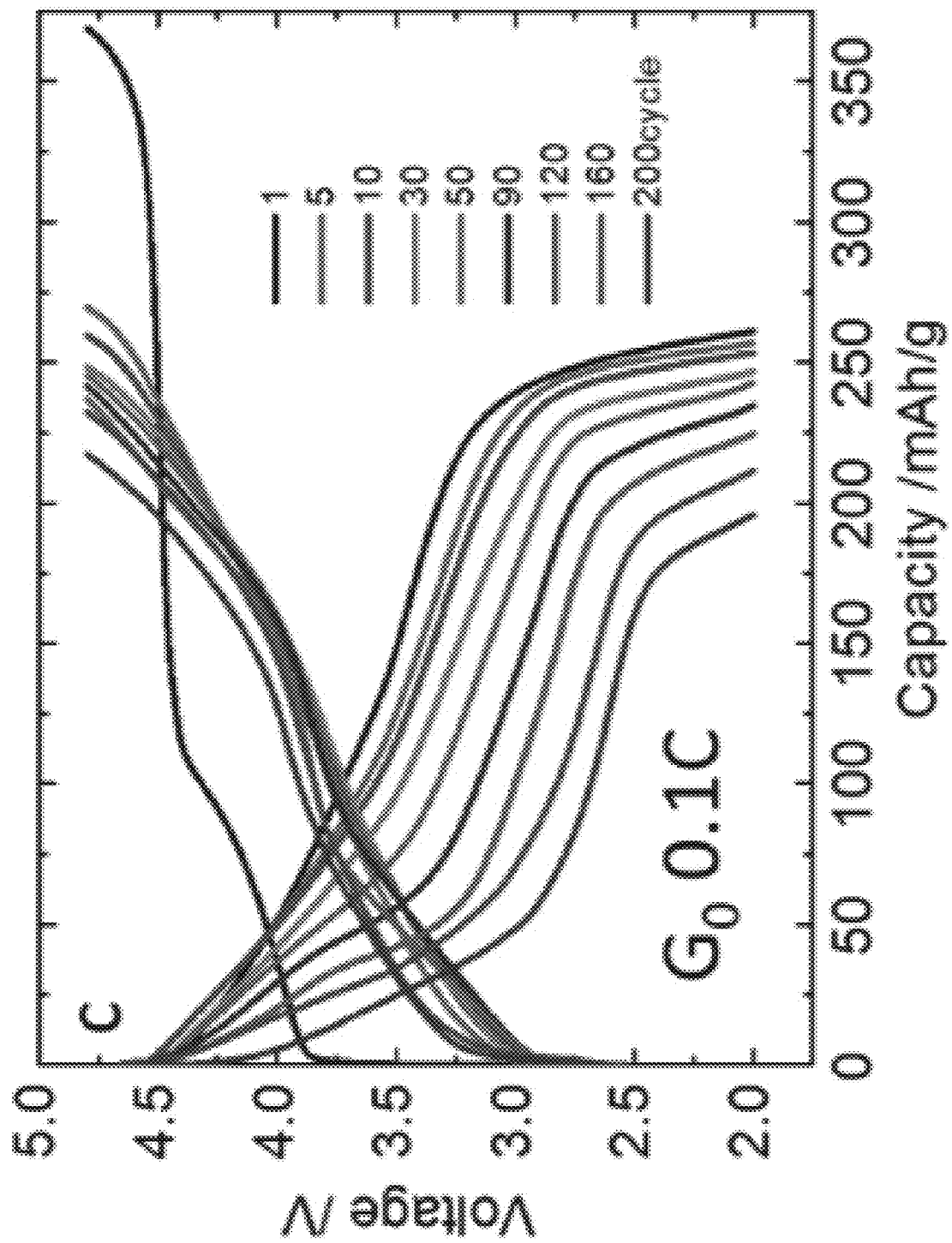
FIG. 16C shows the charge/discharge profiles of $G_0$ cycled at 25° C. and 0.1 C.
Figure 16D:
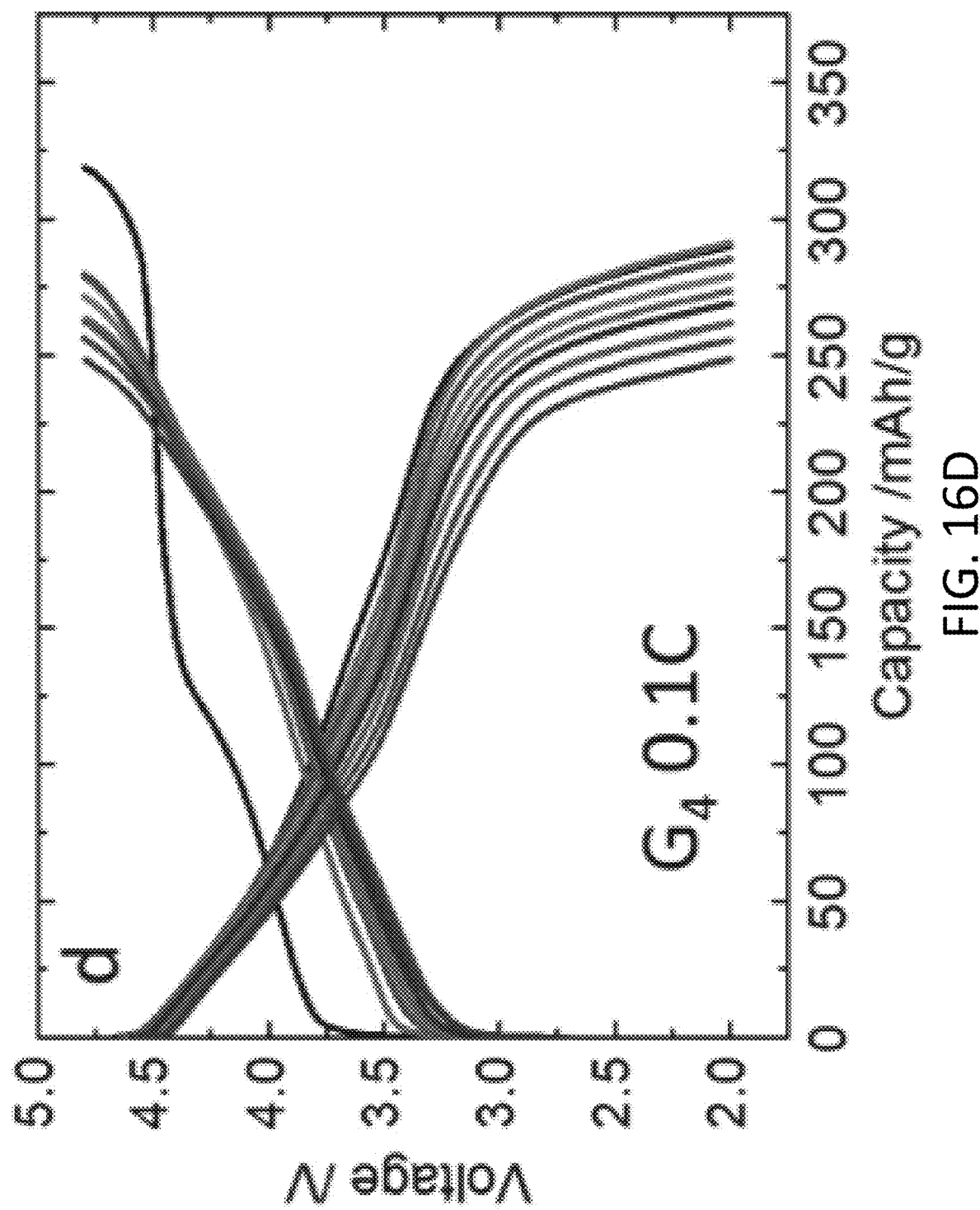
FIG. 16D shows the charge/discharge profiles of $G_4$ cycled at 25° C. and 0.1 C.

The $G_0$, $G_4$ and $G_6$ samples were tested in half-cells with superabundant electrolyte and a Li metal anode. FIG. 15B shows the charge/discharge profiles of the three cathodes under 0.1 C (1 C≡250 mA/g) for the first cycle. As shown, $G_0$ may be charged to 347.2 mAh/g, but only discharged to 261.9 mAh/g with an initial Coulombic efficiency (CE) of 75.4%. The $G_4$ sample may be charged to 322.8 mAh/g and discharged to 293.1 mAh/g with a much higher initial CE of 90.8%. The $G_6$ sample exhibits an even higher initial CE of 91.4%, but may only be charged to 305.9 mAh/g and discharged to 279.7 mAh/g. These results show that an increase in w and the amount of $Li_0$ extracted may increase the initial CE, it also possible to lose capacity as well. Thus, the amount of $MoO_3$ used for leaching should be adjusted to balance the trade-off between discharge capacity and cycle life under a parsimonious electrolyte condition. Nevertheless, the results show the gradient $LX_{(r)}MO$ particles improved the first-cycle CE by >15%.

FIGS. 15C and 16A-16D show the charge/discharge profiles for two cycling conditions.

Figure 17A:
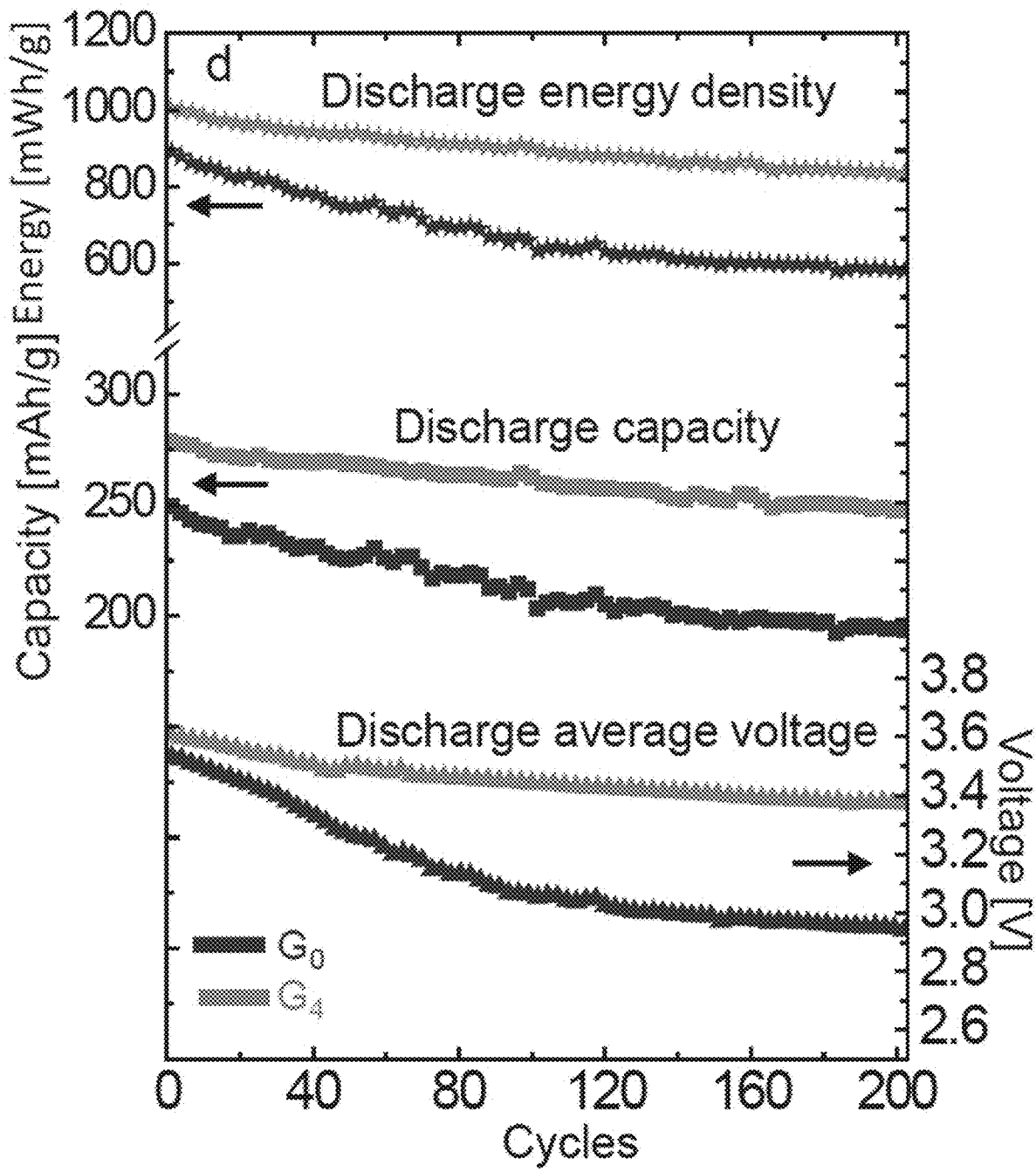
FIG. 17A shows the discharge capacity, average discharge voltage and energy density of $G_0$ and $G_4$ at 0.2 C based on the data of FIG. 15C.

As shown, $G_0$ exhibited substantial degradation to the discharge profile after only the $50^{th}$ cycle, which suggests substantial phase transformation and/or structural collapse in the material. In contrast, $G_4$ was able to retain both the capacity and voltage and maintained a similar discharge profiles even after 200 cycles. FIG. 17A shows a comparison of the capacity, average discharge voltage and energy density retention between $G_0$ and $G_4$. The $G_4$ sample not only had much higher initial average discharge voltage and capacity (3.602V, 280.7 mAh/g) than $G_0$ (3.533V, 249.4 mAh/g), but also had much better capacity and voltage retention. After 200 cycles at 0.2 C, $G_4$ maintained a discharge capacity of 250.4 mAh/g with 3.368V average voltage while $G_0$ retained only 198.5 mAh/g with 2.944V average voltage. In terms of energy density, $G_4$ was able to reach 1011 Wh/kg initially, retaining 892 Wh/kg after 100 cycles and 843 Wh/kg after 200 cycles. By comparison, $G_0$ was only able to retain 589 Wh/kg after 200 cycles. FIGS. 16A-16D and 17B also show that $G_4$ has enhanced capacity/voltage retentions at other rates as well.

Figure 17B:
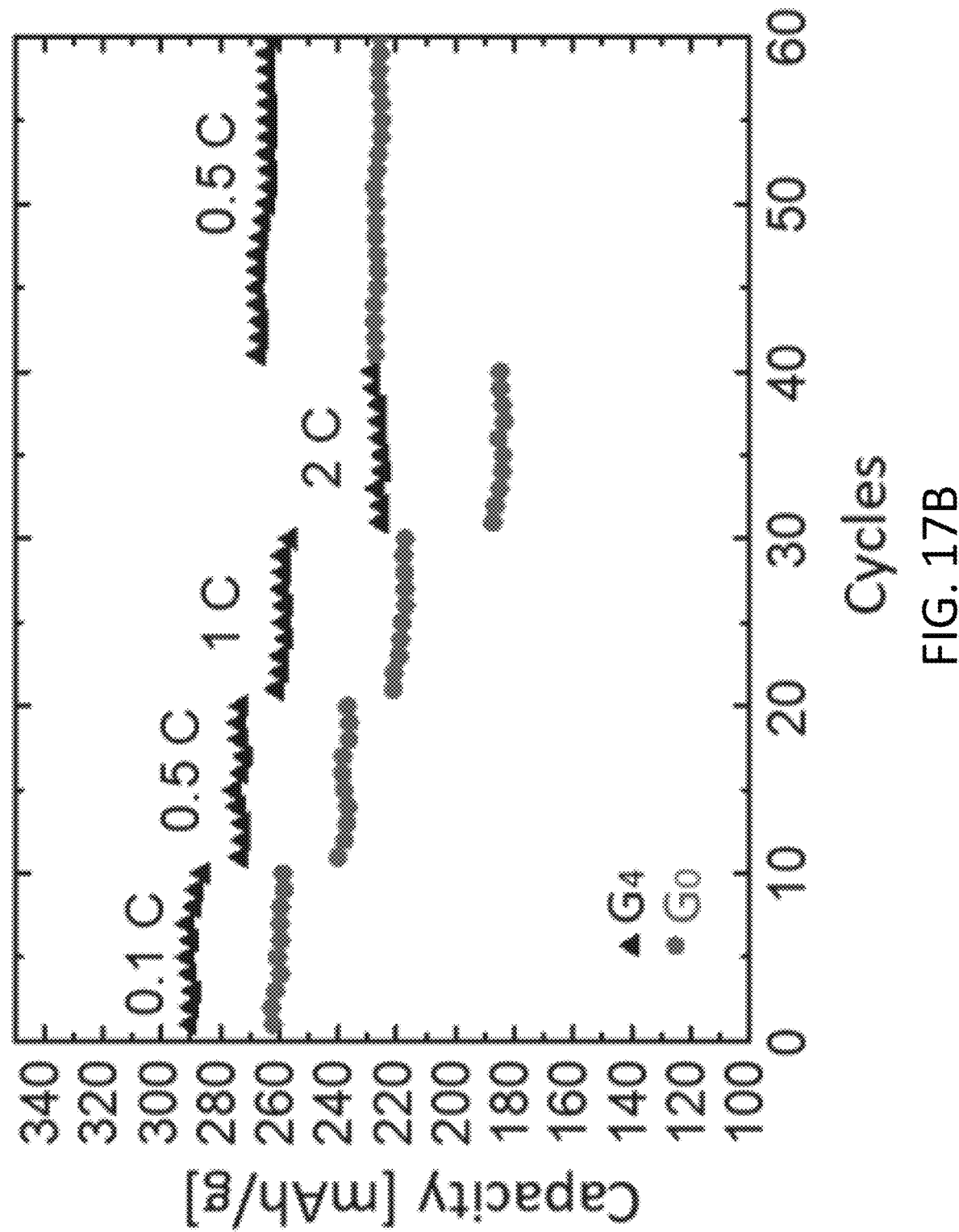
FIG. 17B shows the capacity retention of $G_0$ and $G_4$ at different rates.

In some implementations, the Li-poor surface region 120 may also favor electronic conductivity due to the presence of a relatively larger number of M-O covalent bonds than Li—O ionic bonds. The introduction of $Mn^{3+}$ ions may also increase the electronic conductivity as it's well known that $Mn^{3+}$ has much higher electronic conductivity than $Mn^{4+}$. When the surface of the particles forming the cathode becomes more electronically conductive, contact between the particle surfaces may thus form a 3D conduction network through the electrode, resulting in electron percolation. Electron percolation may substantially improve the high rates cycling of $G_4$. As shown in FIG. 17B, the pristine $G_0$ may only discharge to 180.7 mAh/g at 2 C. However, $G_4$ may discharge to 219.3 mAh/g at 2 C.

Figure 18A:
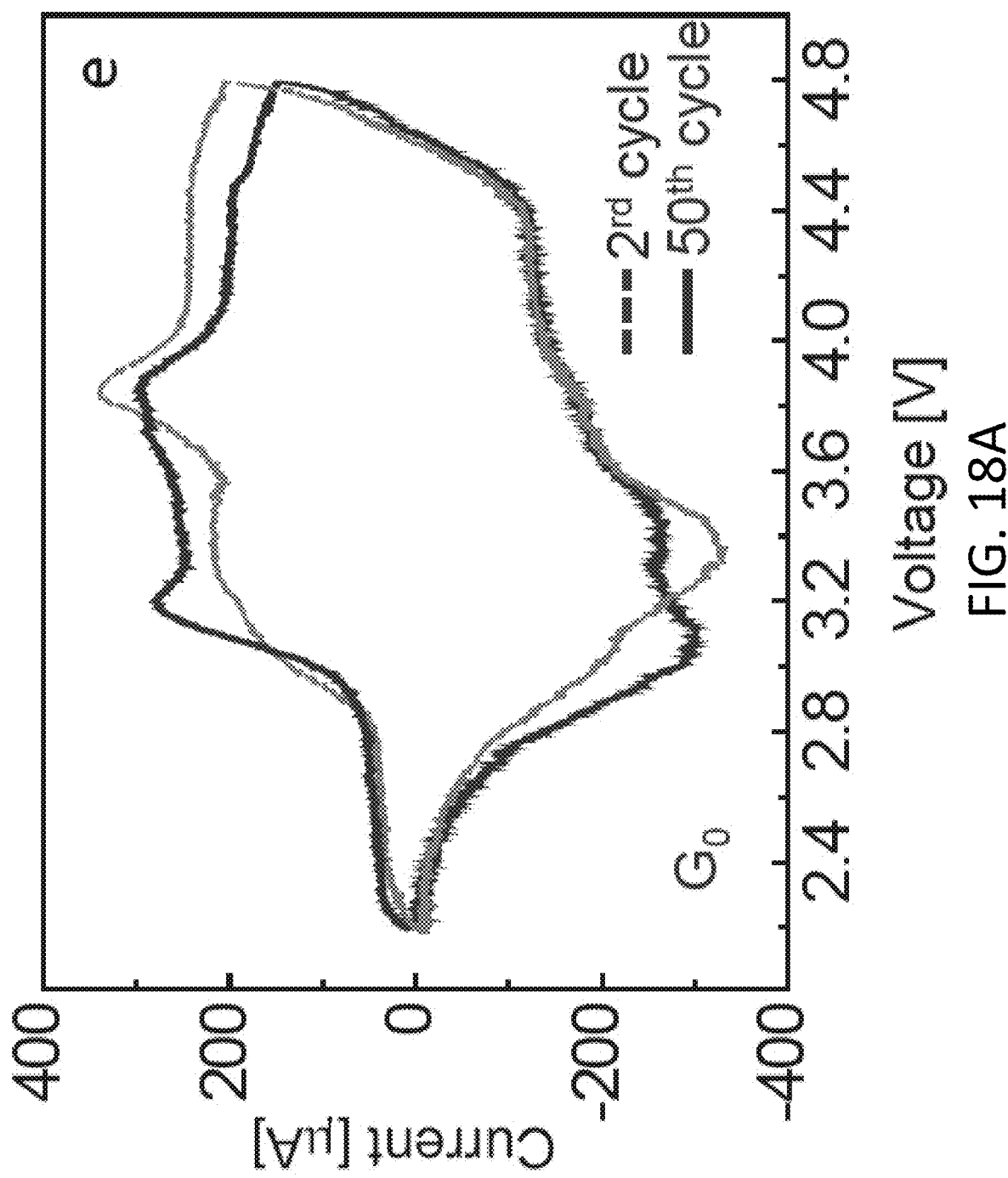
FIG. 18A shows a cyclic voltammetry plot of $G_0$ for the $2^{nd}$ and $50^{th}$ cycle.
Figure 18B:
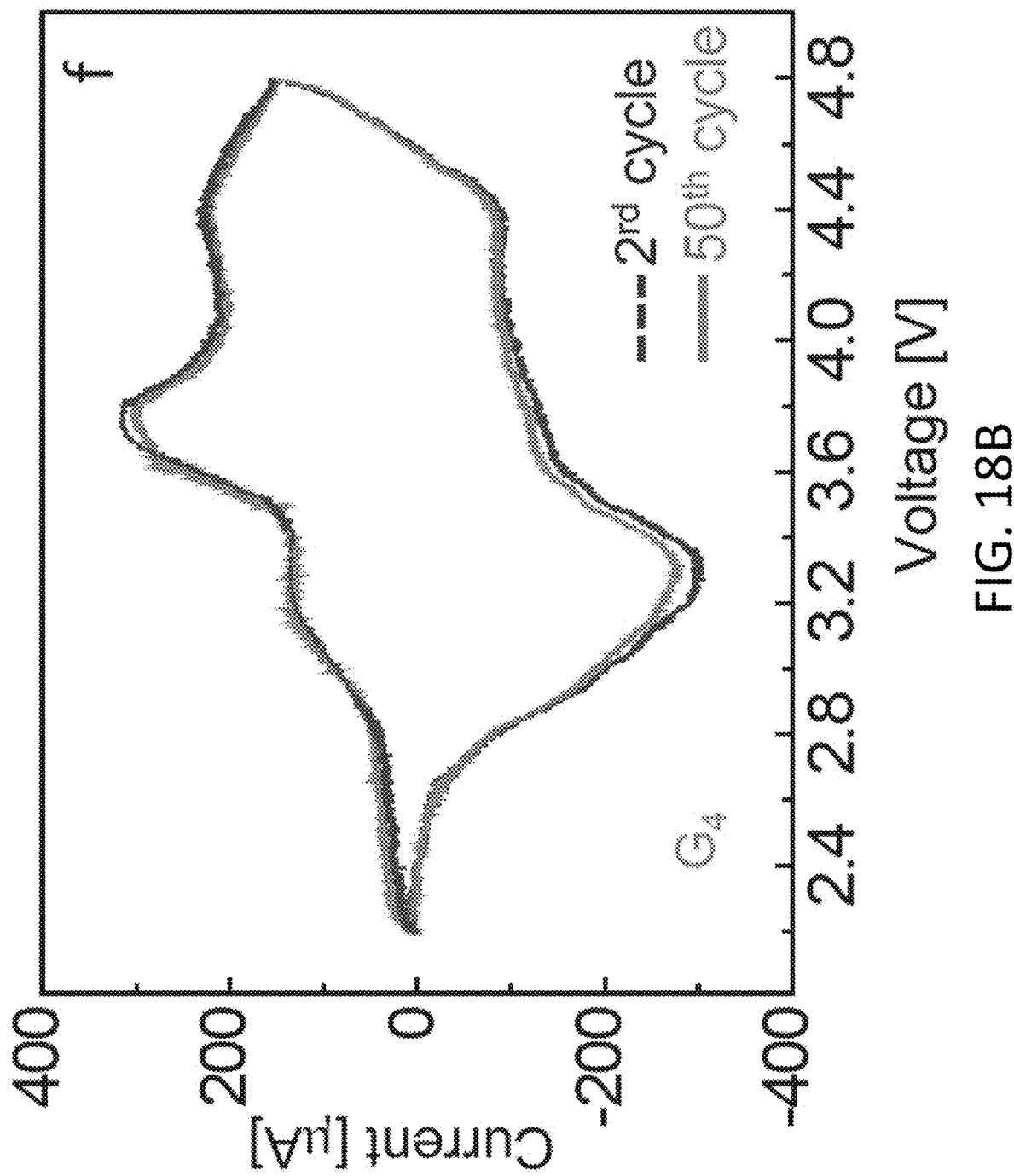
FIG. 18B shows a cyclic voltammetry plot of $G_4$ for the $2^{nd}$ and $50^{th}$ cycle.

The voltage decay may be better understood by comparing the cyclic voltammetry (CV) of $G_0$ and $G_4$, which are shown in FIGS. 18A and 18B, respectively. The oxidation peaks of $G_0$ and $G_4$ in the $2^{nd}$ cycle at 3.8V and 4.2-4.6V are dominated by $Ni^{2+/3+4+}/Co^{3+/4+}$ cation-oxidation and oxygen anion-oxidation, respectively. For $G_0$, the current peak under high voltage while charging decreased substantially due to a decrease in oxygen anion oxidation after only 50 cycles while $Mn^{3+/4+}$ redox increased, resulting in a decrease to the reduction peak at a lower voltage of ~3.0V. Thus, the average discharge voltage of $G_0$ continuously decayed during cycling. However, FIG. 18B shows that for $G_4$, both peaks of oxygen anion redox and $Mn^{3+/4+}$ redox remained almost unchanged after 50 cycles. This further confirms that oxygen loss was prevented in $G_4$ and no additional $Mn^{3+}$ was generated during room-temperature cycling.

Figure 19:
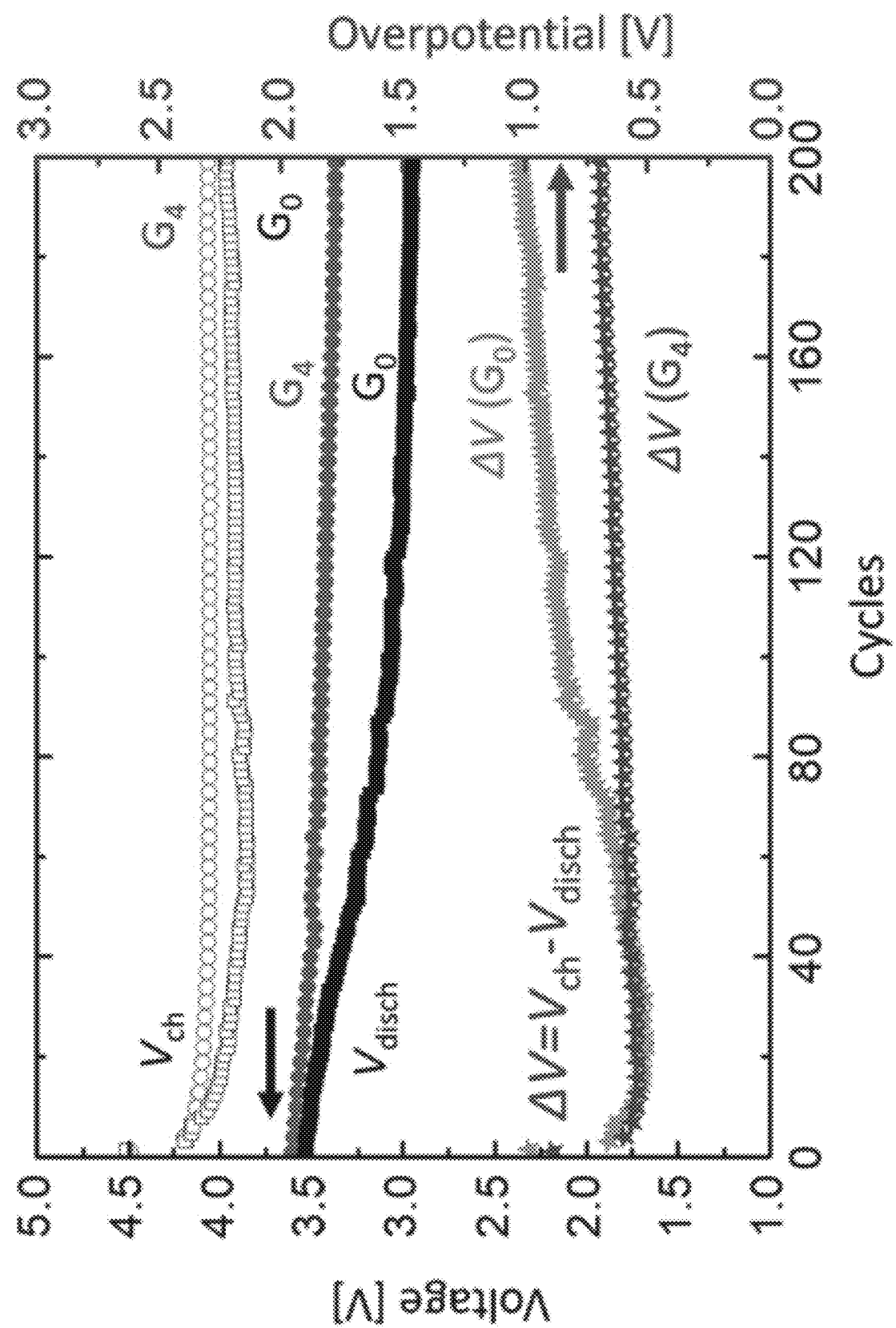
FIG. 19 shows the average voltages during a charge/discharge cycle under 0.2 C.

The departure of oxygen/LiO and the reduction of cation valence also occurred in $G_0$, but during electrochemical cycling at room-temperature, which led to substantial structural effects and side reactions with the electrolyte. Unlike $G_0$, the structural defects in $G_4$ were annealed out in a preventative manner under a controlled high-temperature environment. This is like the difference between the rout of an army and an ordered retreat. FIG. 19 shows the average charge and discharge voltages during cycling for $G_0$ and $G_4$. Based on the cyclic average charge voltage ($\overline{V}_{ch}$) and discharge voltage ($\overline{V}_{disch}$) between $G_0$ and $G_4$ (constant current cycling at 0.2 C), the over-potentials ($\Delta\overline{V}=\overline{V}_{ch}-\overline{V}_{disch}$) between charge and discharge are similar for $G_0$ and $G_4$ for the first 40 cycles at around 0.54 V. However, $\Delta\overline{V}$ of $G_0$ increased to >1.02 V while $G_4$ only increased to 0.69 V after 200 cycles.

Figure 20A:
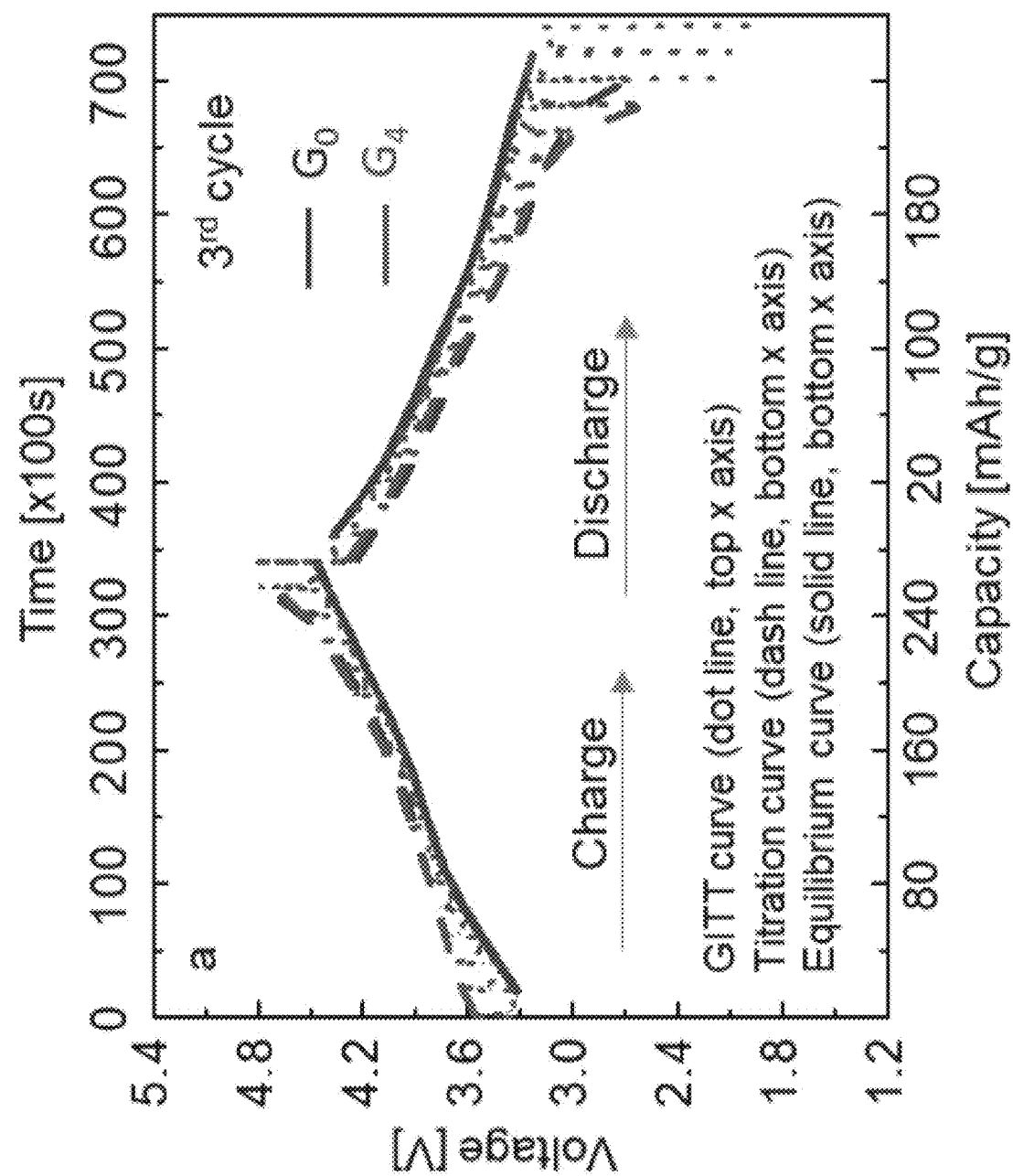
FIG. 20A shows GITT curves of $G_0$ and $G_4$ particles for the $3^{rd}$ cycle.
Figure 20B:
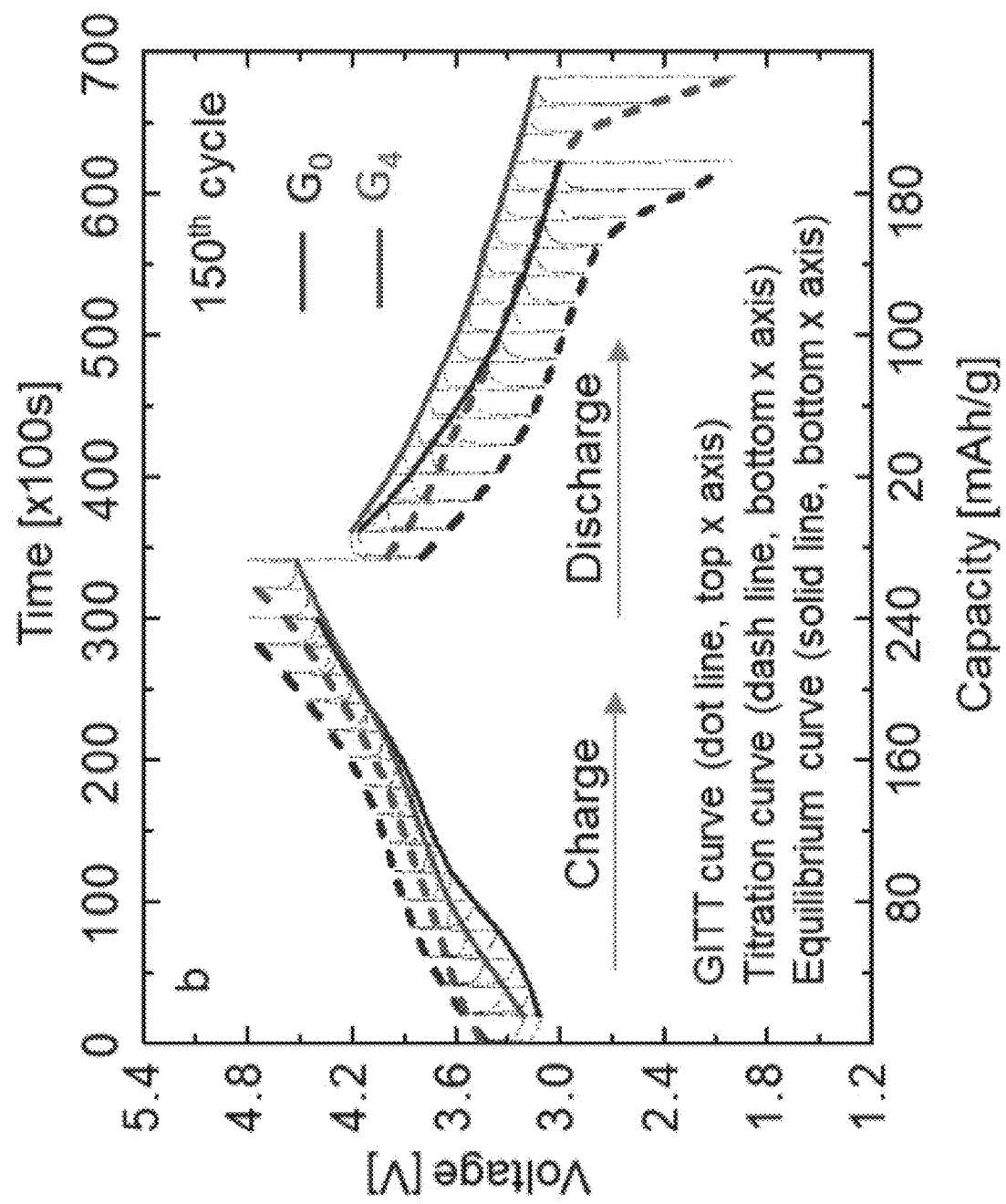
FIG. 20B shows GITT curves of $G_0$ and $G_4$ particles for the $150^{th}$ cycle.

FIGS. 20A and 20B show galvanostatic intermittent titration technique (GITT) analysis for $G_0$ and $G_4$. As shown, $G_4$ exhibited both a well-maintained thermodynamic open-circuit voltage profile and a suppressed kinetic titration voltage drop after 150 cycles. On the other hand, the open-circuit voltage profile and the titration voltage of $G_0$ both faded substantially. The voltage (V) in "voltage fade" is expressed as a sum of two parts, $V=V^{OCV}+V^P$, where the open-circuit $V^{OCV}$ is thermodynamic, and the overpotential $V^P$ is a kinetic polarization that depends on the direction and magnitude of the current. Both $V^{OCV}$ and $V^P$ may change with cycle number n, reflecting changes in the composition and kinetic resistance, respectively. Thus, the voltage fade during cycling will include contributions from both $\Delta V^{OCV}$ and $\Delta V^P$.

In FIGS. 20A and 20B, the solid line is $V^{OCV}$ and the dash line is $V^{OCV}+V^P$ (i.e., the difference is the kinetic polarization at any given state of charge/discharge). As shown, the $V^{OCV}$ and $V^P$ of $G_4$ did not change appreciably at the $150^{th}$ cycle (right) compared to the $3^{rd}$ cycle (left) at a given state of discharge. This is because $G_4$ is both chemically and structurally stable. However, the $V^P$ of $G_0$ increased by more than a factor of 3 at 180 mAh/g discharge, which indicates a greatly increased kinetic impedance that matches with the structural collapse observe at the surface in FIG. 23B. Furthermore, the $V^{OCV}$ of $G_0$ drooped down substantially. Although there was essentially no observable difference between $V^{OCV}(G_0)$ and $V^{OCV}(G_4)$ at the $3^{rd}$ cycle, the $V^{OCV}(G_0)$ dropped appreciably to 180 mAh/g by the $150^{th}$ cycle, indicating a permanent change to its chemistry. The thermodynamic OCV change and kinetic polarization change account for roughly 25%:75% of the "voltage fade"

at 180 mAh/g discharge in the GITT experiment. This ratio depends on the current density as well as the state of charge/discharge.

3.3 Stabilized Mn Valence and Phase in Cycling

Soft X-ray absorption spectroscopy (sXAS) was also performed to distinguish the oxidation states of the elements in the core and surface regions of the $G_4$ particles. The diameter of the $G_4$ particles ranged between 200-400 nm, thus the FY mode with a detection depth of 100~200 nm is sufficient to collect data from $r_{core}$, whereas the TEY mode may only acquire data at the surface of the particles with a depth of a few nanometers.

Figure 21A:
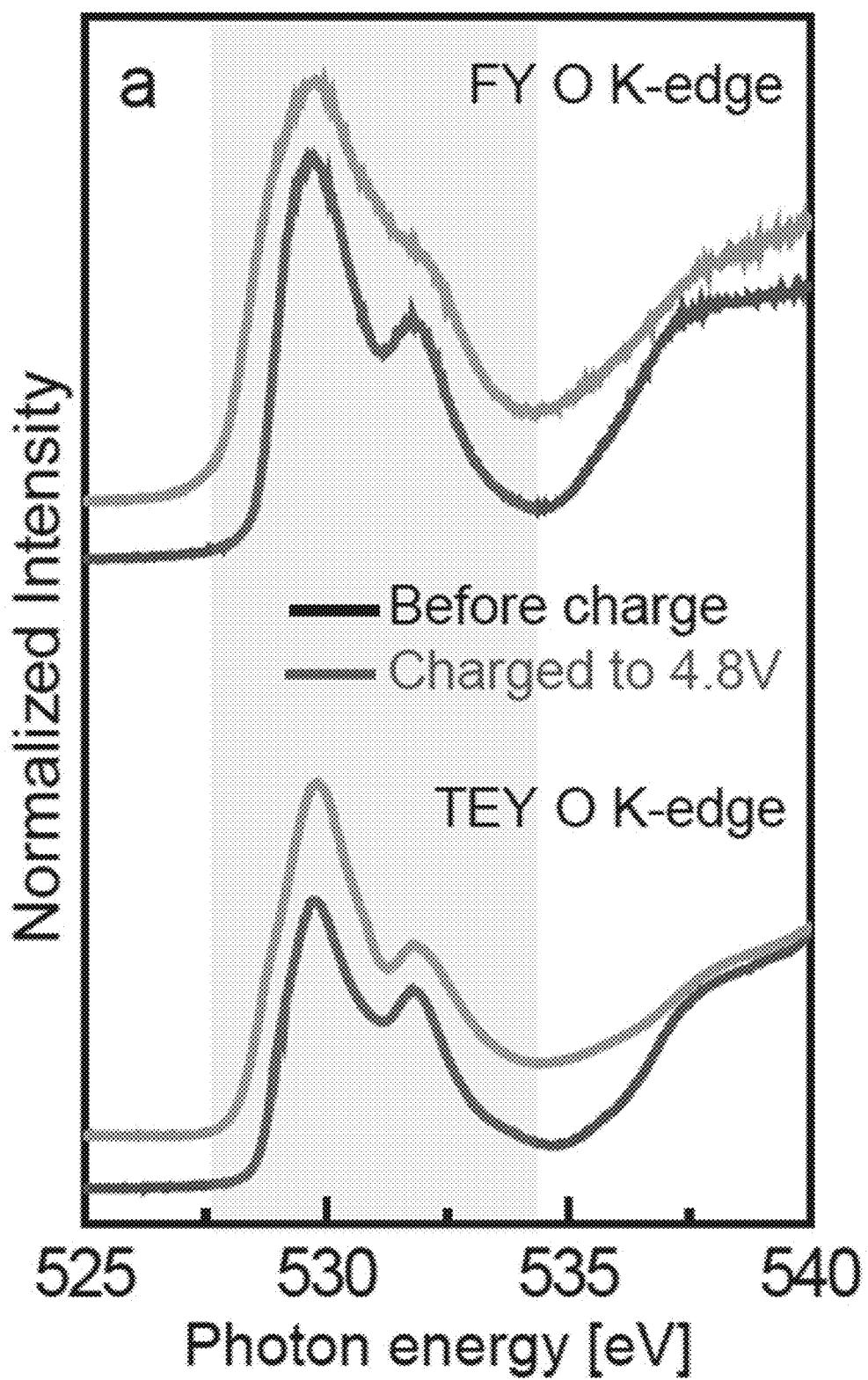
FIG. 21A shows the normalized intensity corresponding to the soft x-ray absorption spectroscopy (sXAS) O K-edge peaks of $G_4$ for both discharged and charged states collected using both fluorescence yield (FY) and total electron yield (TEY) modes.

The M ions (Mn, Co, Ni) in the Li-rich material are hybridized with O ions as the cathode is charged, thus the number of electrons lost from both M and O ($\delta^+$), which is proportional to the capacity, may be reflected by changes to the O K-edge peaks. The O K-edge starting at 528 eV comes from the excitation of $O_{1s}$ electrons to the hybridized $M_{3d}$-$O_{2p}$ orbitals, which has been widely used to indicate the overall change of M-O oxidation states. FIG. 21A shows the normalized sXAS intensity for O K-edge peaks for $G_4$ from discharge to charge acquired using both FY and TEY modes. By integrating the O K-edge peaks at 527.5-534.2 eV and comparing the difference, it was observed that more electrons were extracted from the Li-rich bulk ($\delta^+$=1.05, 327 mAh/g) compared to the Li-poor surface ($\delta^+$=0.81, 221 mAh/g) during the initial charge (see Supplementary Note 1).

Figure 21B:
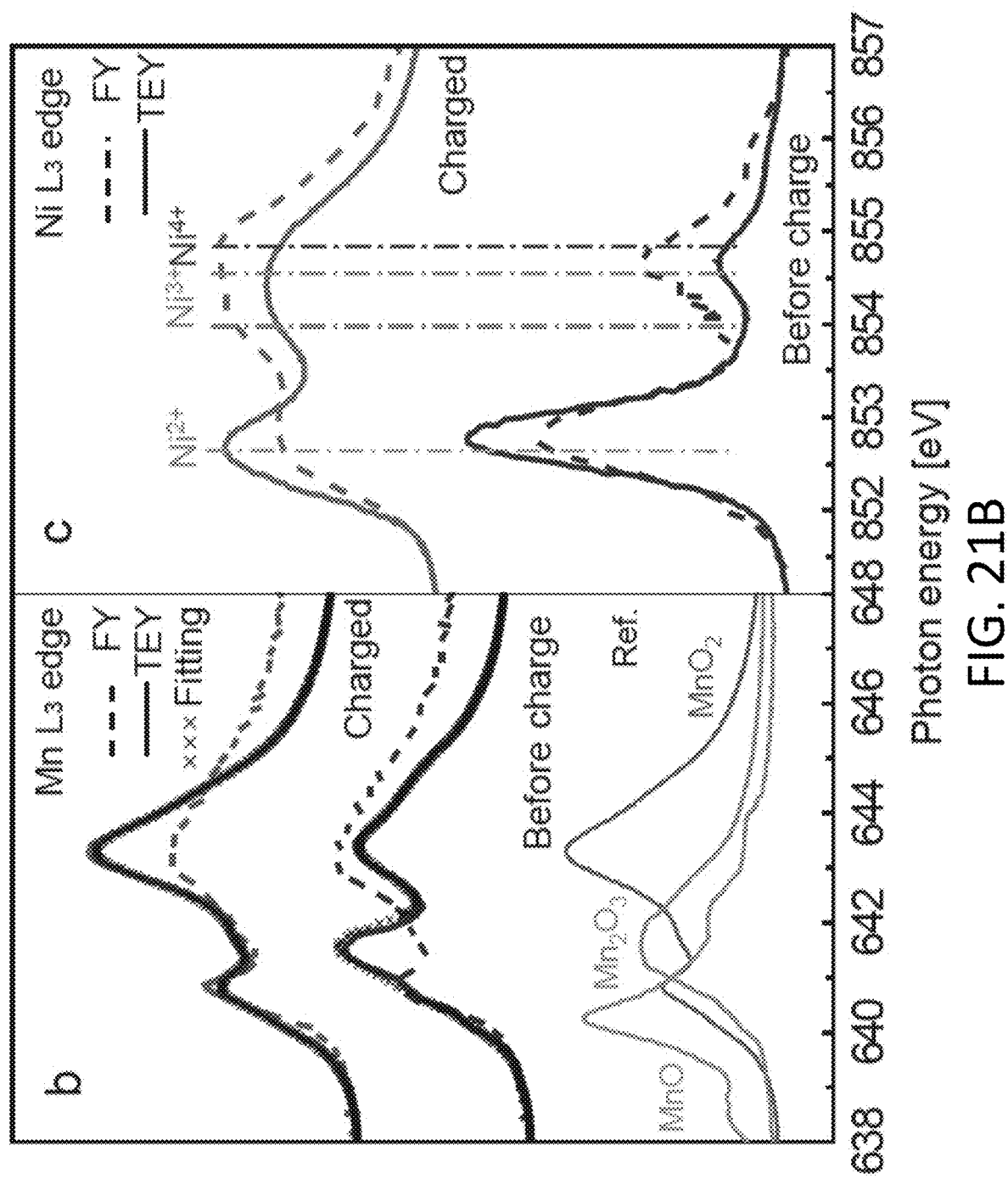
FIG. 21B shows sXAS spectra corresponding to the Mn $L_3$ edge and the Ni $L_3$ edge of $G_4$ for both discharged and charged states under FY and TEY modes. The TEY Mn $L_3$ edge was fitted by a linear combination of $Mn^{2+}$, $Mn^{3+}$ and $Mn^{4+}$ TEY references.
Figure 21C:
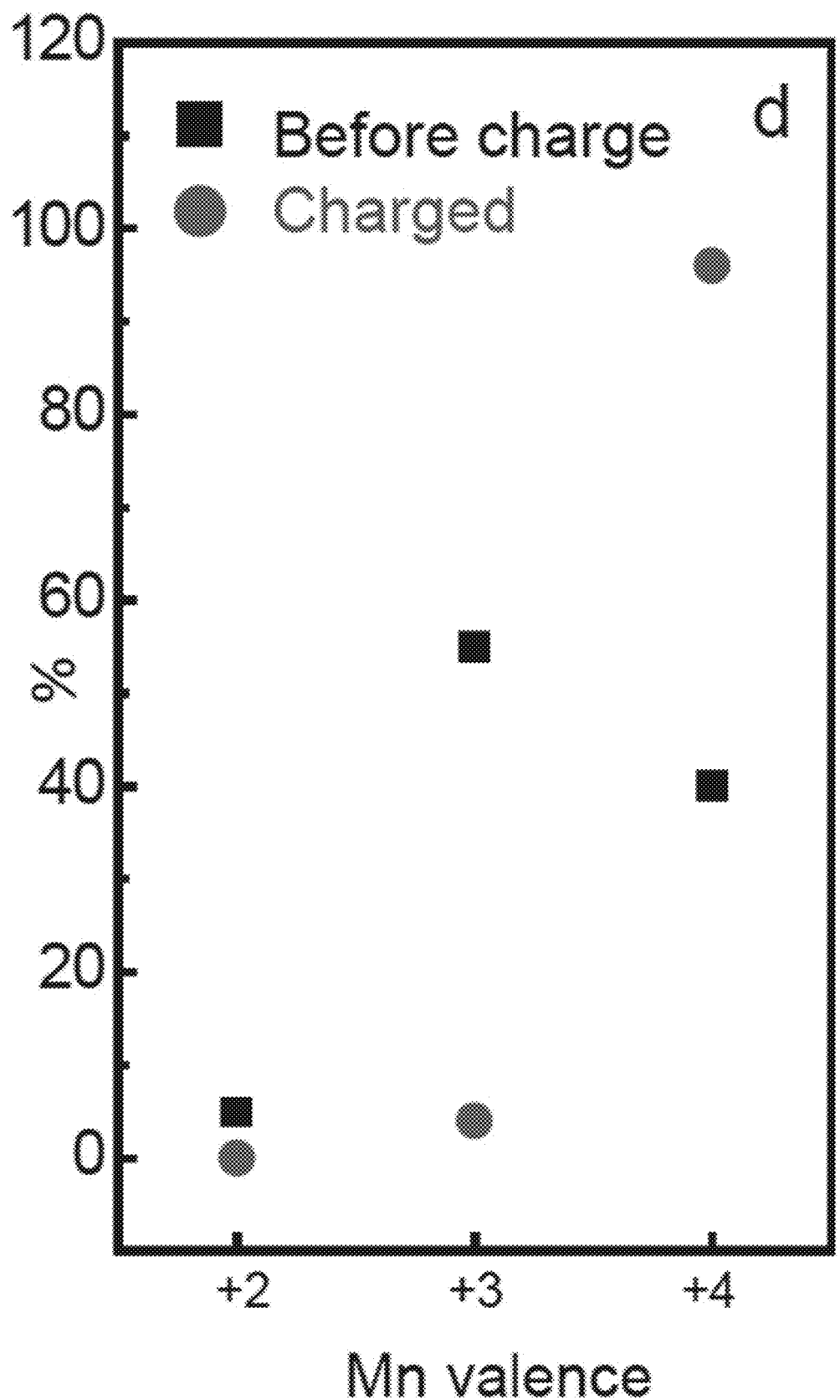
FIG. 21C shows the distribution of Mn valence at the surface of the $G_4$ particle for both discharged and charged states.

Additionally, sXAS M $L_{3,2}$-edges are well suited to quantify the M valence in $G_4$. FIG. 21B show the Mn and Ni sXAS $L_3$ edges before and after charge. As shown, the Mn FY $L_3$ edge did not appreciably change (both being +4) while the TEY edge changed substantially after charge. Quantitative analysis on the TEY Mn $L_3$ edge (see FIG. 21C) showed that the Li-poor surface region of $G_4$ contained 5% $Mn^{2+}$, 54% $Mn^{3+}$ and 41% $Mn^{4+}$ (average Mn valence of +3.36) before charge. After charging to 4.8V, $Mn^{4+}$ increased to 96%, $Mn^{3+}$ decreased to 4%, and $Mn^{2+}$ was reduced to 0% (average Mn valence of +3.96). Therefore, Mn contributed no capacity in the Li-rich bulk region, but 0.38e (0.63×0.6e) in the Li-poor surface after charge.

Quantitative valence analysis of Ni and Co ions was not performed because of the absence of standard $Ni^{4+}$ and $Co^{4+}$ material references. Nevertheless, it can still be observed that both the Ni and Co valences increased after charging based on both FY and TEY Ni sXAS $L_3$ edges in FIG. 21B and FIG. 21D. If the Ni and Co ions were oxidized to +4 after charging in the bulk/core region of $G_4$ (i.e., $Li_{1.2}Mn_{0.48}Co_{0.16}Ni_{0.16}O_2$), M may supply at most $\delta^+$=0.42e (=131 mAh/g). The remaining 0.63e (=196 mAh/g) should thus come from oxygen anion redox, which demonstrates the genuine HACR nature of the bulk region that occupies most of the $LX_{(p)}MO$ volume. In contrast, if the 0.81e (=221 mAh/g) was acquired from M redox in the surface region of $G_4$ (i.e., $Li_{0.95}Mn_{0.63}Ni_{0.21}Co_{0.21}O_2$), the Ni and Co ions may only be oxidized to ~+3.52 after charge. This leaves room to reach a higher valence before the oxidation of oxygen should be initiated.

Figure 21D:
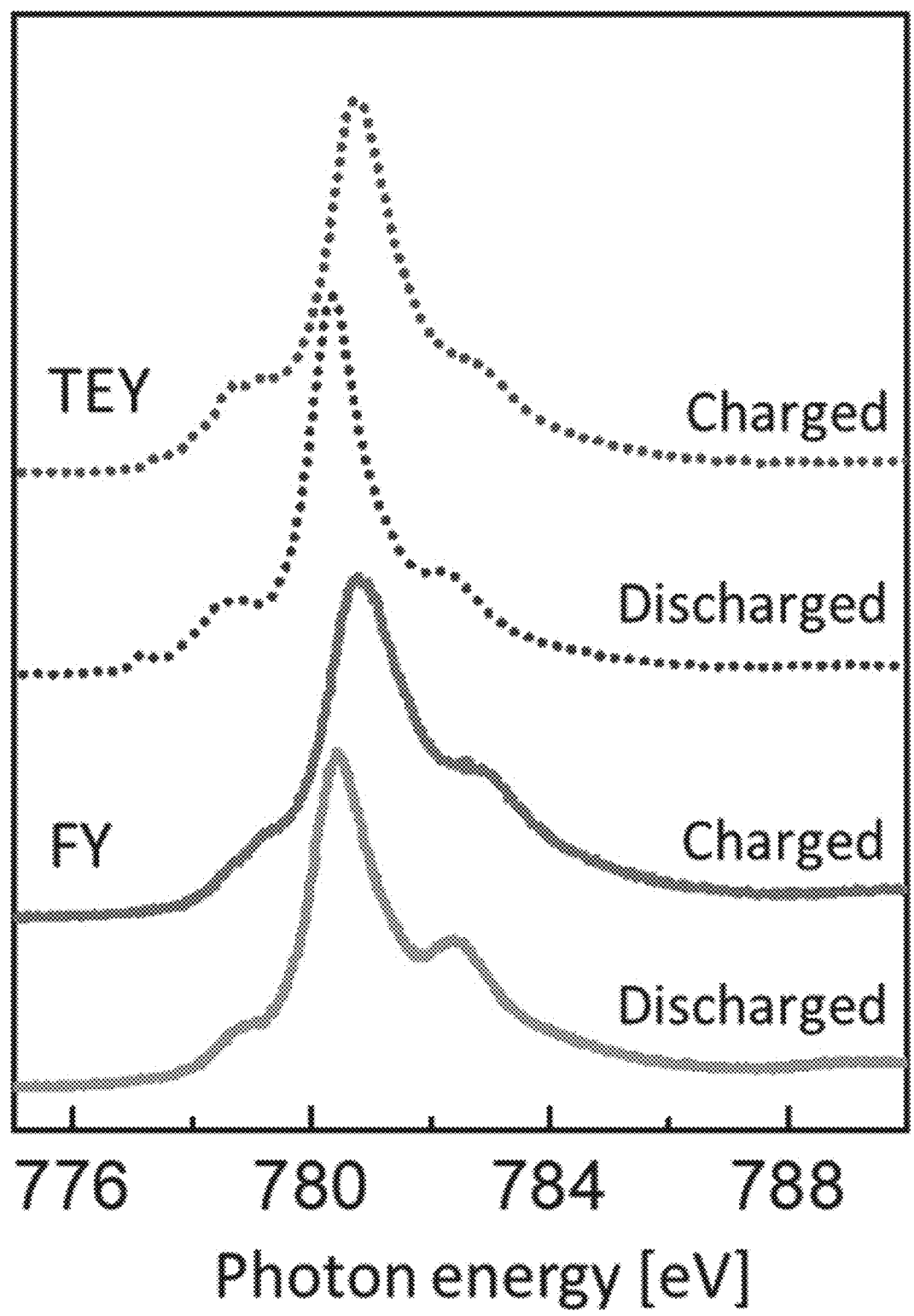
FIG. 21D shows sXAS spectra of the $G_4$ particle corresponding to the Co $L_3$ edge for both discharged and charged states under FY and TEY modes.

Based on the FY (bulk) sXAS of Mn in FIG. 21B, the Mn valence did not exhibit an observable change between discharged and charged states where both valences were at $Mn^{4+}$. Thus, Mn ions contributed negligible capacity in the charge process in the bulk region. FIG. 21D showed Co was also oxidized in the $G_4$ particles during the charging process according to the changes of Co XAS $L_3$ edge. The unavailability of a $Co^{4+}$ reference sample means the voltage at which $Co^{3+}\rightarrow Co^{4+}$ cannot be precisely determined. However, it may be estimated that Co contributes at most 0.16×(4−3)=0.16e in the bulk region (FY). Also, Ni ions may be estimated to have at most a +4 valence after charge. The Ni ions had a valence of +2.39 in the $Li_{1.2}Mn_{0.48}Co_{0.16}Ni_{0.16}O_2$ bulk region before charge (see FIG. 14C), thus Ni ions may donate at most 0.16× (4−2.39)=0.26e in the charge process. In combination, M may contribute at most 0.42e (26801*(0.26+0.16)/MW=131 mAh/g, where MW=86) in the Li-rich core region. As discussed in Supplementary note 1, 1.05e was charged in the $Li_{1.2}Mn_{0.48}Co_{0.16}Ni_{0.16}O_2$(MW=86) bulk region. Thus, it may be inferred that oxygen contributed at least 1.05−0.26−0.16=0.63e (26801*0.63/MW=196 mAh/g) in the charge process.

For the surface region of $Li_{0.95}Mn_{0.63}Co_{0.21}Ni_{0.21}O_2$ (MW=98), the TEY data in FIG. 21B shows that Mn ions in the discharged state was +3.36 and changes to +3.96 after charge. Thus, Mn contributed 0.63×(3.96−3.36)=0.38e. Assuming the 0.81e is from M redox and the average valence of Ni and Co is +2.5 (see FIG. 21D) before charging, the average valence of Co and Ni may be oxidized to (0.81−0.38)/0.42+2.5=3.52. This value is far below the +4 valence that Co and Ni may be oxidized to in LMO material before activating the oxygen redox.

Figure 21E:
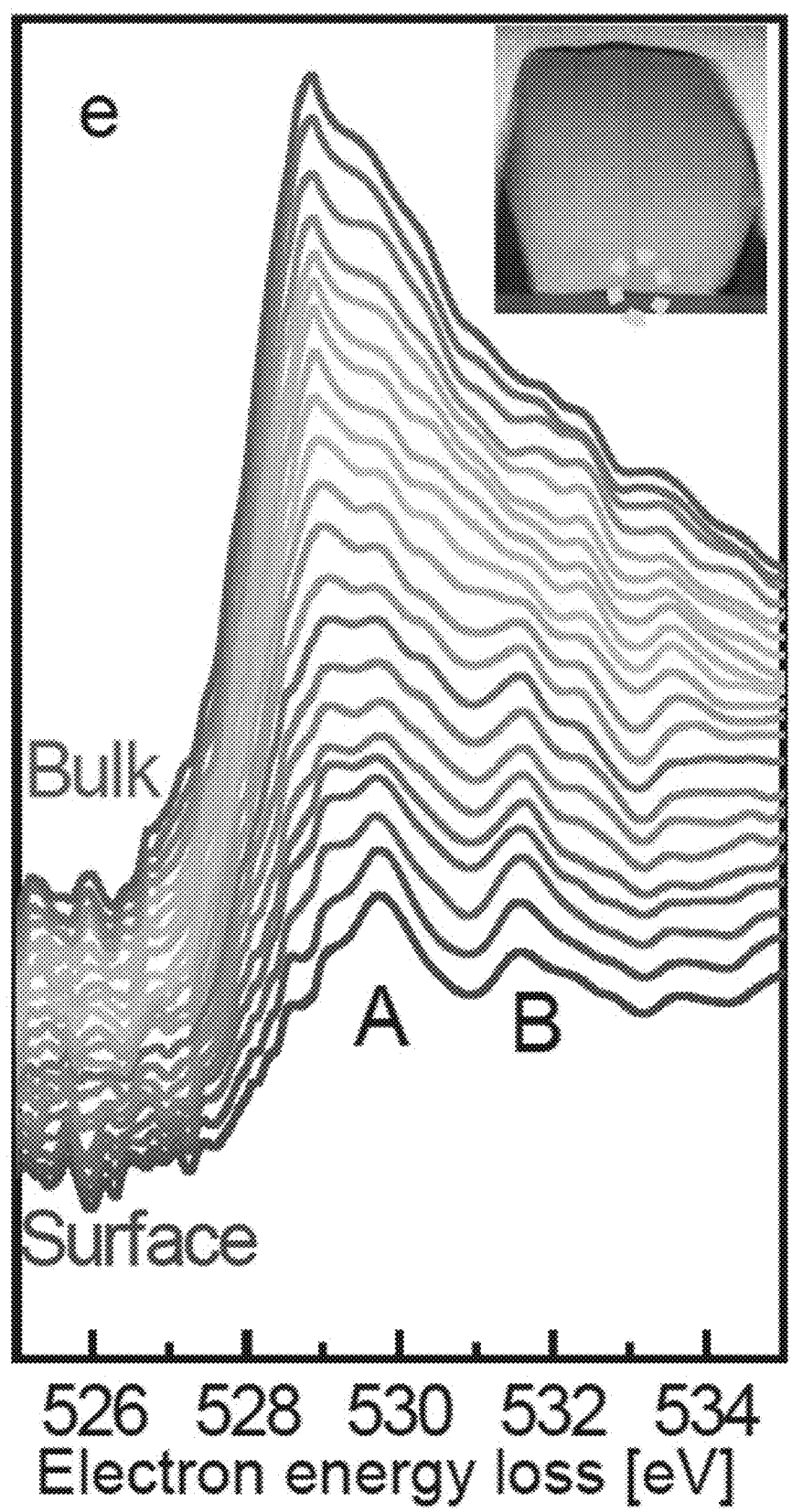
FIG. 21E shows the O K-edge profiles from the surface to the bulk of the $G_4$ particle after charge measured using EELS line-scans.
Figure 22:
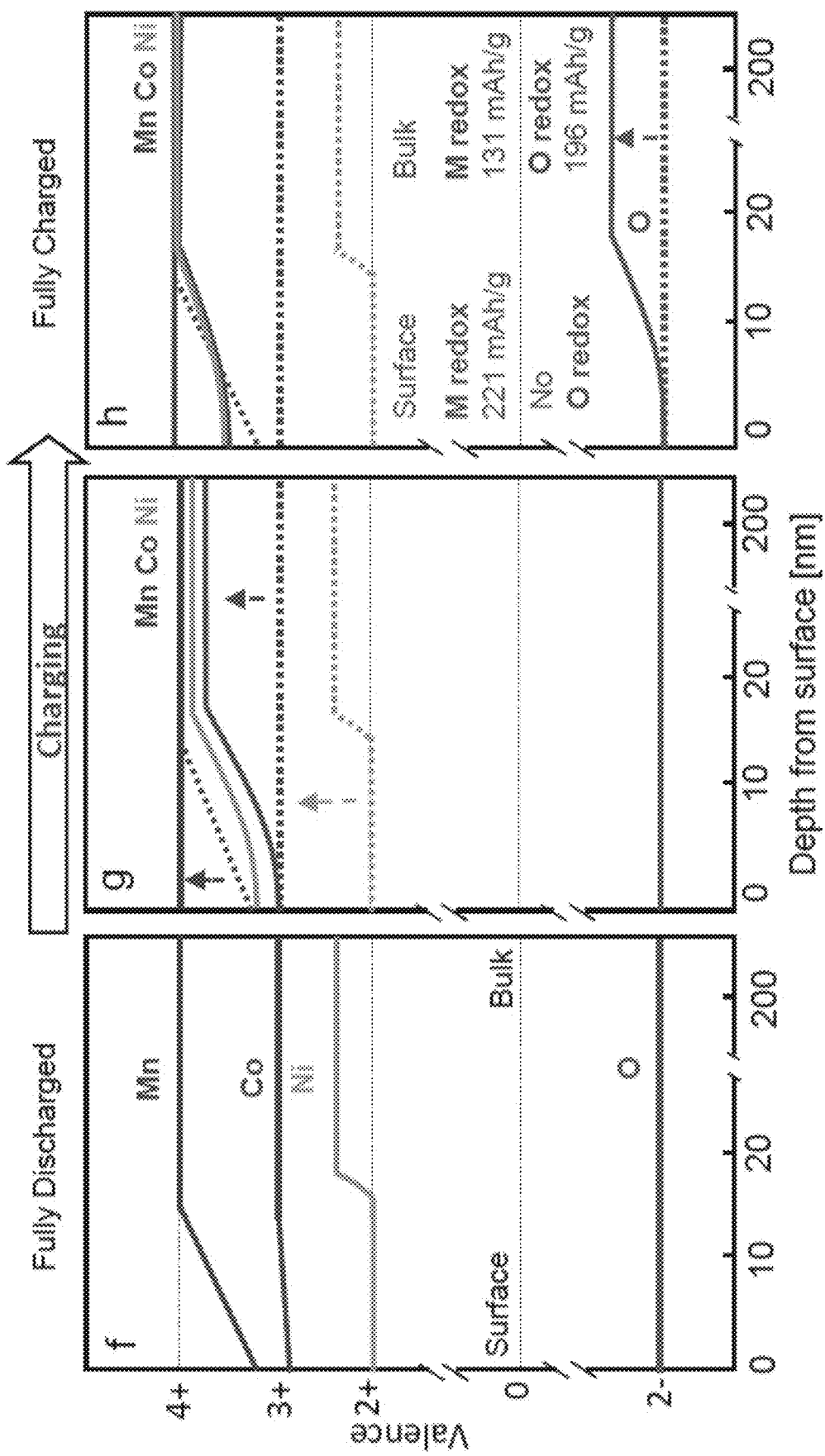
FIG. 22 shows the Mn, Ni, Co and O valence profiles from the surface to the bulk of the $G_4$ particle during charging. This schematic assumes 100% $Co^{4+}$ and $Ni^{4+}$ in the bulk when fully charged. The O anion-redox may supply 196 mAh/g in the Li-rich bulk, while supplying no capacity at the Li-poor surface.

An EELS line-scan was also performed on a charged particle 100, which was prepared by a focused ion beam (FIB), to acquire the depth profile of oxygen oxidation states in the $G_4$ particle (see FIG. 21E). As shown, the split peak of O K-edge at 530 eV was separate from the peak at 532 eV at the surface region. However, peak A gradually grew stronger and enclosed peak B as the depth into the material increased. It has been shown that peak A grows to enclose peak B only when $O_{2p}$ contributes to capacity. The EELS results further showed that 0 was redox-active in the bulk region 110 and gradually became less oxidized (in some instances not oxidized) towards the surface region 120 during charging. FIG. 22 shows the Mn, Ni, Co and O oxidation state profiles throughout the $G_4$ particle during charging. It is assumed that the Ni and Co ions may be oxidized to +4 in the Li-rich bulk region. These results show that 0 in $r_{core}$ contributes substantially to the capacity, but O in $r_{surface}$ does not participate in anion-redox, thus the altered-valence oxygen mobility (LOM) is limited to the interior of the particle 100.

Figure 23A:
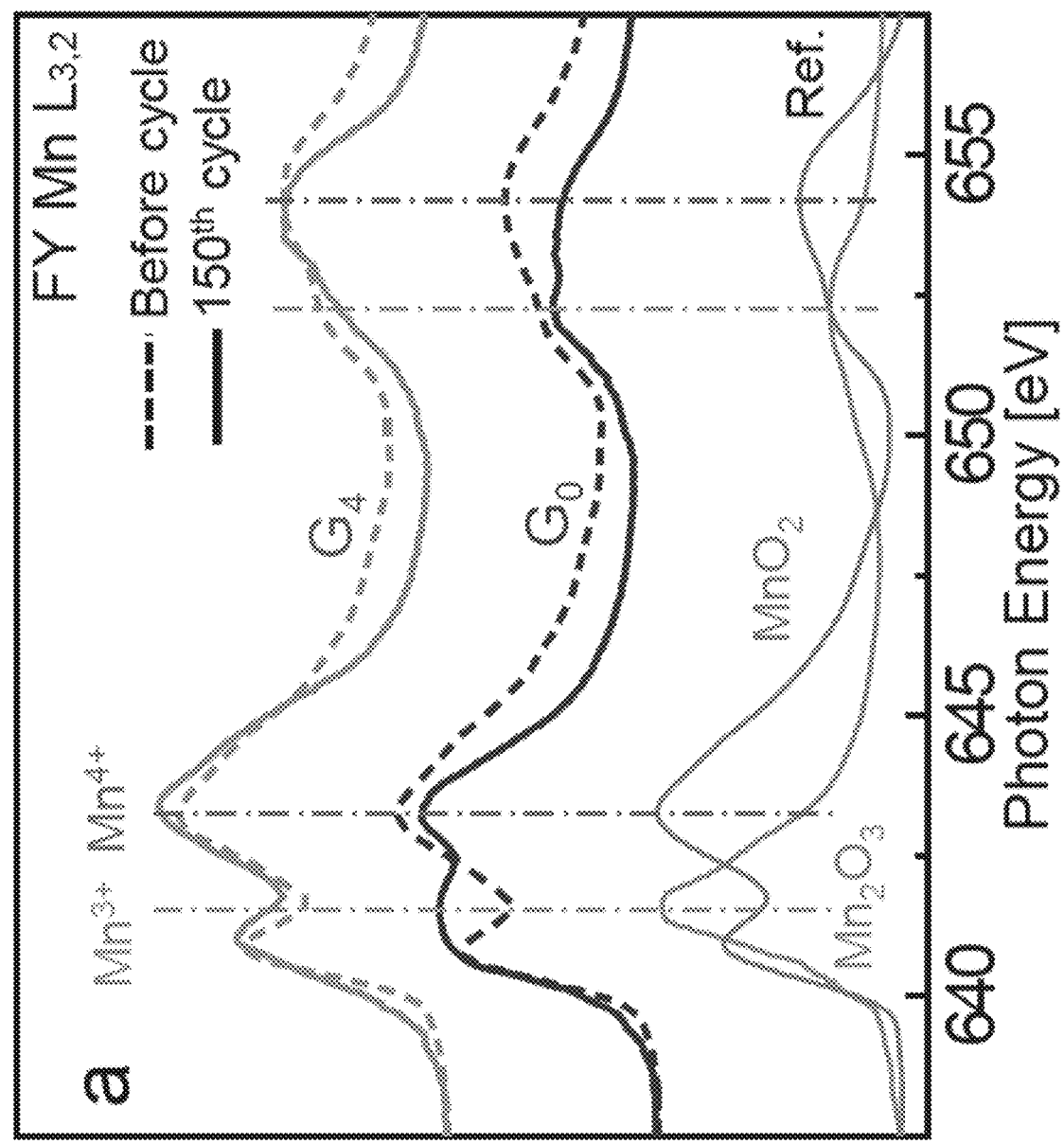
FIG. 23A shows sXAS spectra of the Mn $L_{3,2}$ edges of $G_0$ and $G_4$ before cycling and after 150 cycles in the FY mode and $Mn^{3+}$ and $Mn^{4+}$ references.
Figure 23B:
FIG. 23B shows a HRTEM image of $G_0$ after 100 cycles. The region to the right of the orange line and in circles indicate a disordering/rock-salt phase.
Figure 23C:
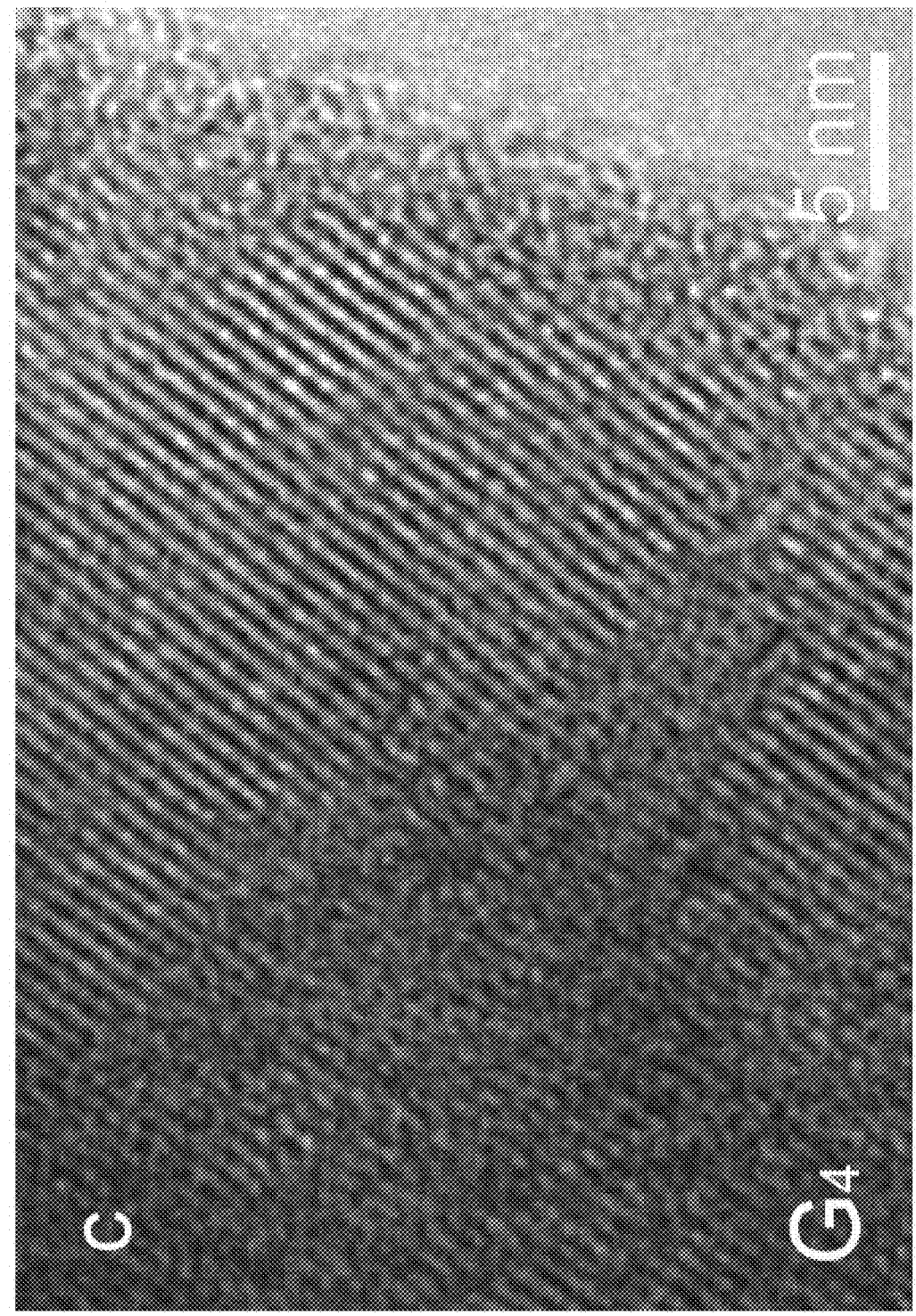
FIG. 23C shows a HRTEM image of $G_4$ after 100 cycles.
Figure 23D:
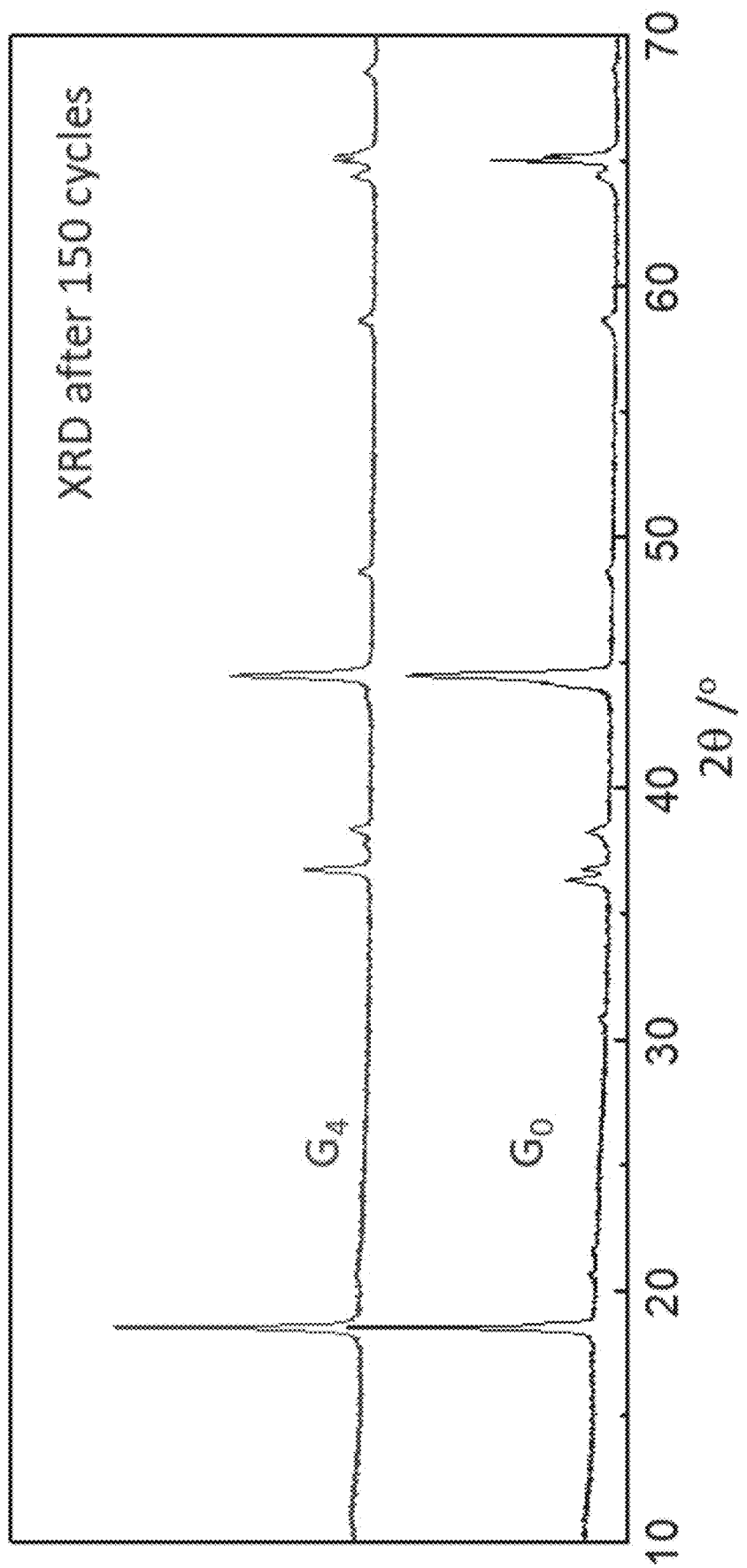
FIG. 23D shows XRD spectra of $G_0$ and $G_4$ cathodes after 150 cycles.
Figure 23E:
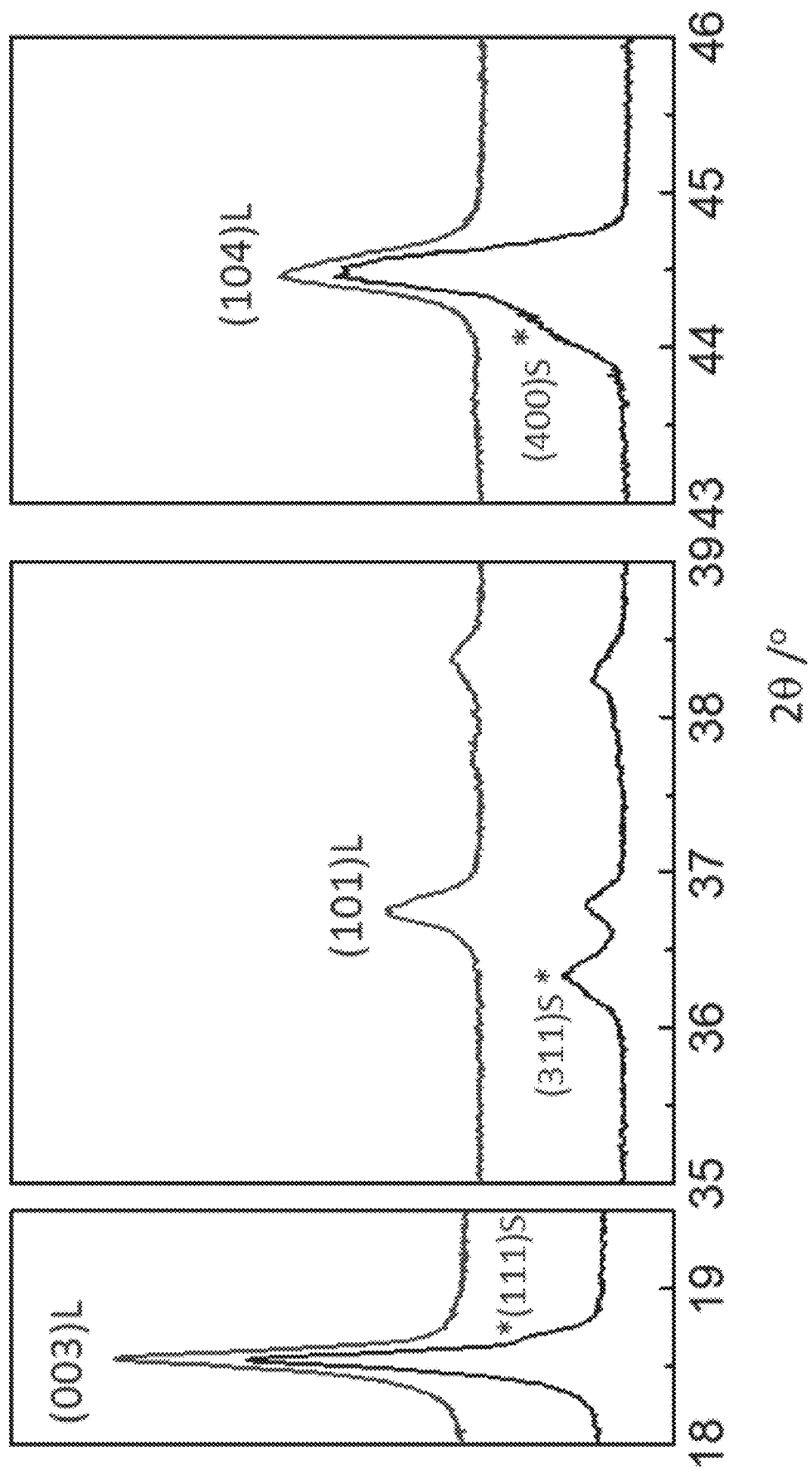
FIG. 23E shows several magnified views of the XRD spectra of FIG. 23D.

[01.63] The substantial reduction to the global oxygen mobility (GOM) may also stabilize the Mn valence during battery cycling. FIG. 23A shows the FY XAS Mn L-edge of $G_0$ and $G_4$ before cycling and after 150 cycles. This shows that even though Mn' was pre-positioned in the Li-poor surface region 120 of $G_4$, the amount of Mn' did not increase in $G_4$ after 150 cycles. In contrast, a substantial amount of new $Mn^{3+}$ was introduced in $G_0$ during cycling. FIGS. 23B and 23C show high-resolution TEM images of $G_0$ and $G_4$ after 100 cycles. As shown, $G_0$ exhibited structural damage and phase transformations, especially near the particle surface, which is similar to previous studies. In contrast, $G_4$ showed little to no phase transformation and/or structural collapse after 100 cycles (i.e., the same layered structure was mostly preserved up to the surface region). FIGS. 23D and 23E show XRD analysis of $G_0$ and $G_4$ after 150 cycles, which provides further evidence of the phase difference between $G_0$ and $G_4$. As shown, the XRD spectra for the $G_0$ cathode showed evidence of massive impurities after 150 cycles, which may be due to the spinel phases (marked with *). In contrast, the $G_4$ cathode did not exhibit the aforementioned spinel phases. Furthermore, the peak ratio of $I_{(104)}/I_{(003)}$ increased substantially in $G_0$ (and not in $G_4$), indicating the layered structure underwent a phase transformation that resulted in a disordered morphology and/or a rock salt structure after 150 cycles.

Figure 23F:
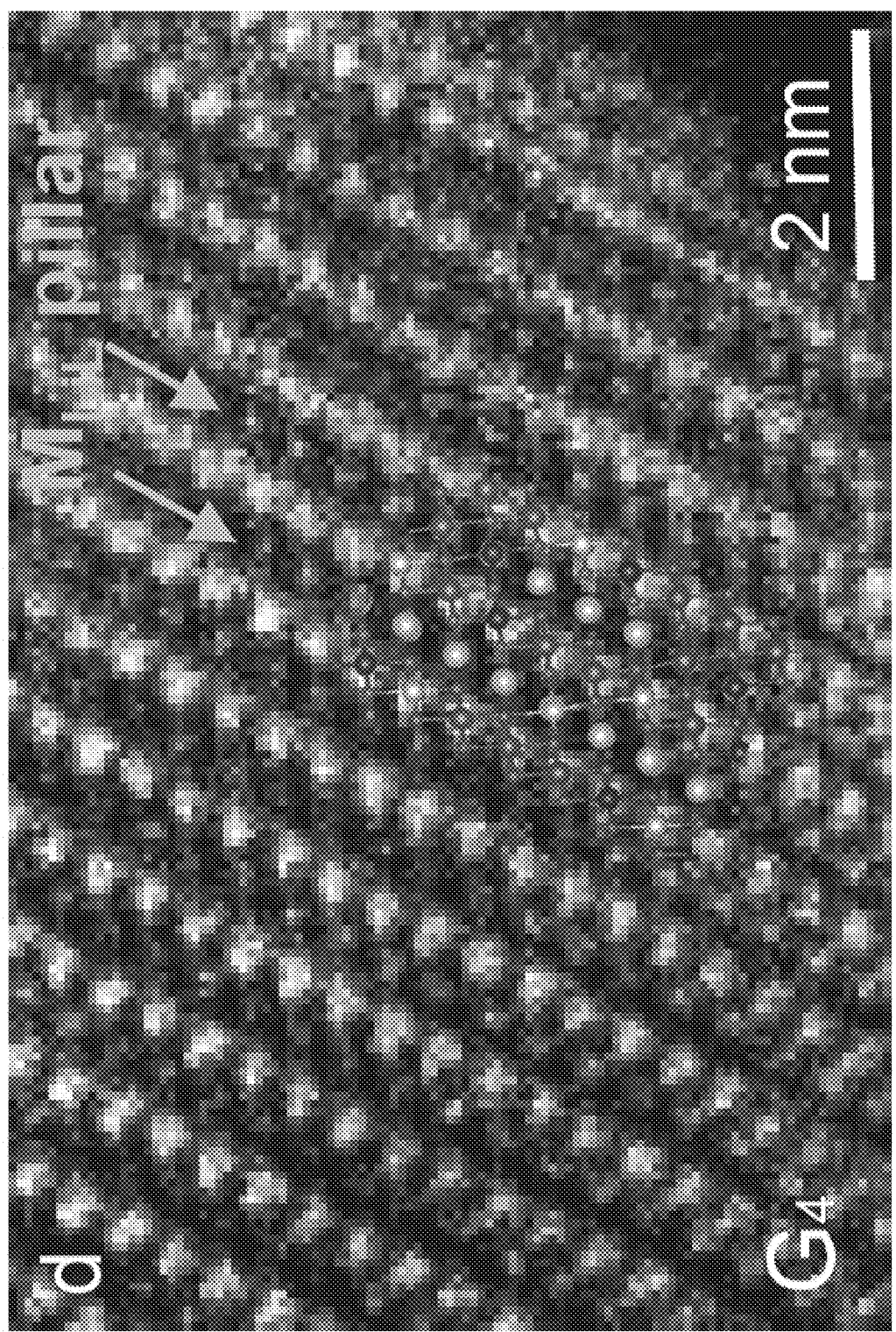
FIG. 23F shows a STEM-HAADF image of the $G_4$ surface region where the layered structure includes $M_{LiL}$ pillars in the Li layer after 100 cycles. The overlaid molecular structure is used for a density functional theory (DFT) simulation where violet, grey, blue, green and red spheres corresponds to Mn, Co, Ni, Li, and O atoms, respectively.

FIG. 23F shows a STEM-HAADF image of the $G_4$ sample that showed $M_{LiL}$ pillars were also well preserved after 100 cycles. The $M_{LiL}$ pillars corresponded well to a first-principles calculation using density functional theory (DFT). The first-principles calculation was performed within the spin-polarized general gradient approximation, which included the on-site Coulomb interaction correction (GGA+U) in the form of Perdew-Burke-Ernzerhof's exchange-correlation functional. The code was implemented in Vienna Ab-initio Simulation Package (VASP). The planewave energy cut-off was 400 eV. The U values of Mn, Co, Ni were 3.9, 3.3 and 6.2 eV. Therefore, the coherent Li-gradient surface substantially reduced global mobility of M/O, and the M pillars were able to support the layered structure during prolonged cycling. The well-retained structure not only substantially enhanced capacity and voltage retention after cycles, but also maintained pathways for $Li^+$ diffusion.

Figure 24A:
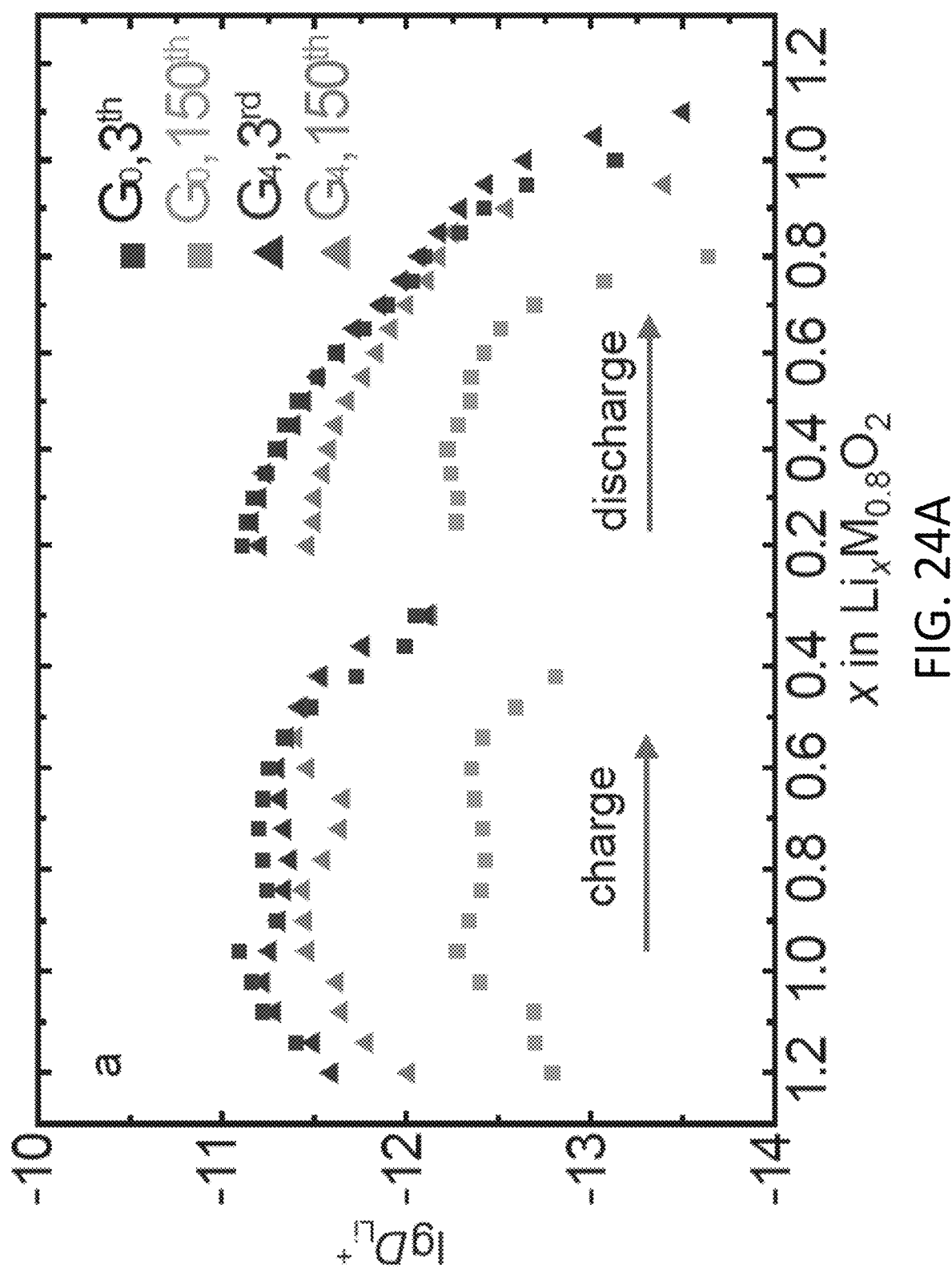
FIG. 24A shows the average Li diffusivity of the $G_0$ and $G_4$ transition metal oxide particles for the 3rd cycle and the $150^{th}$ cycle measured using a galvanostatic intermittent titration technique (GITT) at different states of charge.

Phase stabilization may substantially enhance the kinetics during cycling. The galvanostatic intermittent titration technique (GITT) was performed on $G_0$ and $G_4$ in the $3^{rd}$ cycle and $150^{th}$ cycle as shown in FIGS. 20A and 20B. FIG. 24A shows a comparison of the average Li diffusivity ($\breve{D}_{Li+}$) for the $3^{rd}$ cycle and the $150^{th}$ cycle measured with GITT. The Li diffusivity was calculated by $\breve{D}_{Li+}=4/\pi\tau\times(\Delta Es/\Delta Et)^2 L^2$ where $\tau$ is the duration of the current pulse (200 s), $\Delta Es$ is the steady-state voltage change due to the current pulse, $\Delta Et$ is the voltage change during the constant current pulse, and L is the Li ion diffusion distance. In this measurement, Li diffusion is assumed to be the limiting step, thus the iR drop is excluded. L is taken to be the radius of primary particle. Though the value of L is difficult to measure and may affect $\breve{D}_{Li+}$, the $\breve{D}_{Li+}$ values are calculated with the same particle size before and after cycles. The trend in the change of $\breve{D}_{Li+}$ during cycling may directly reflect the impedance change between $G_0$ and $G_4$. As shown, the $\breve{D}_{Li+}$ of $G_0$ and $G_4$ were similar at $(3\sim6)\times10^{-12}$ cm$^2$/s for the $3^{rd}$ cycle, but deviated substantially after 150 cycles where $\breve{D}_{Li+}$ of $G_0$ decreased to $(2\sim6)\times10^{-13}$ cm$^2$/s while $\breve{D}_{Li+}$ of $G_4$ was about $(1\sim5)\times10^{-12}$ cm$^2$/s. Thus, the $\breve{D}_{Li+}$ of $G_0$ degraded by nearly an order of magnitude after 150 cycles while $\breve{D}_{Li+}$ of $G_4$ remained substantially unchanged.

Figure 24B:
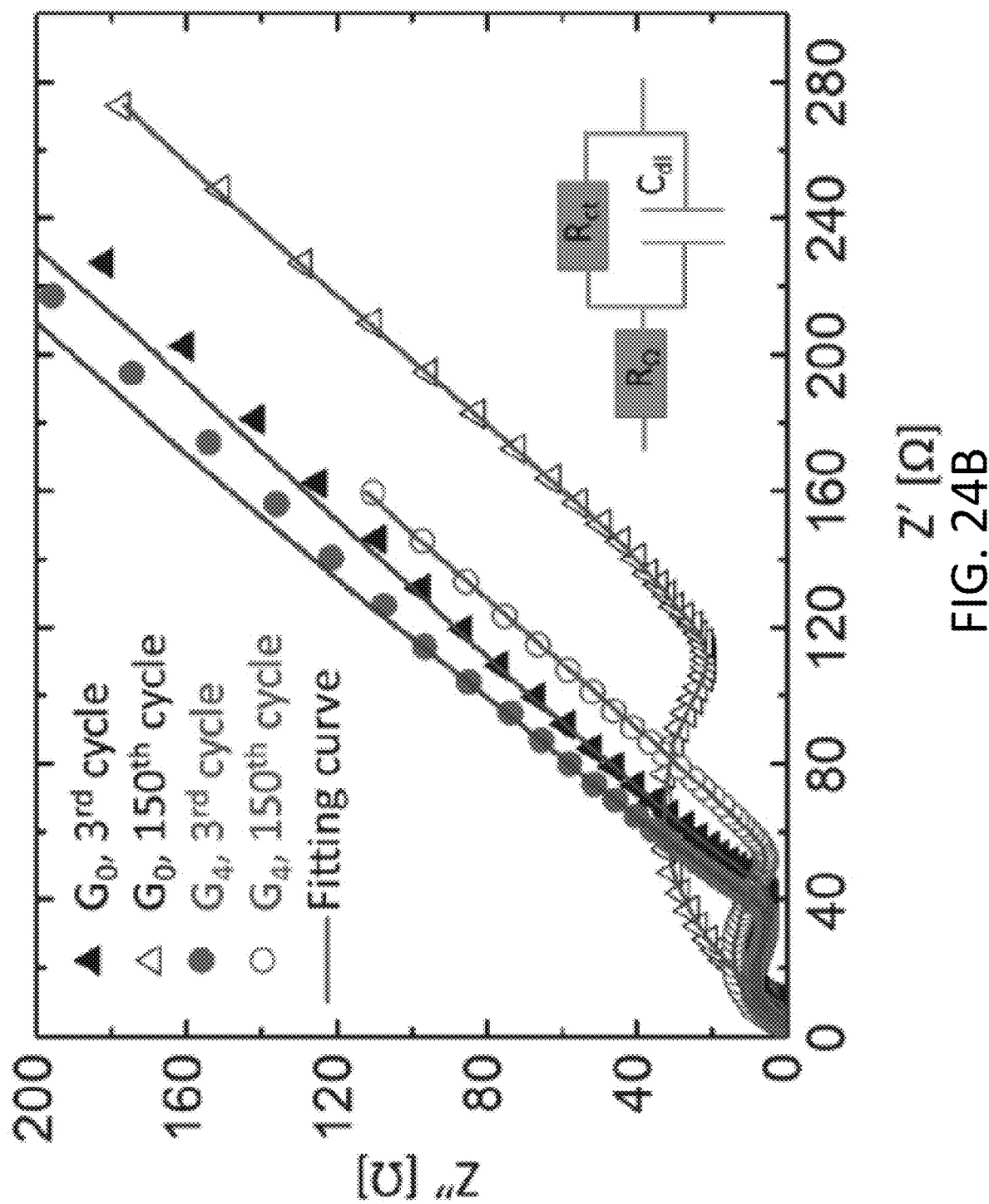
FIG. 24B shows electrochemical impedance spectroscopy (EIS) curves of $G_0$ and $G_4$ for the $3^{rd}$ and $150^{th}$ cycle.

FIG. 24B shows electrochemical impedance spectroscopy (EIS) data of the $G_0$ and $G_4$ samples. As shown, the charge-transfer resistance ($R_{ct}$) of $G_0$ and $G_4$ was 41Ω and 38Ω, respectively, in the $3^{rd}$ cycle. However, $R_{ct}$ of $G_0$ increased to ~90Ω and $G_4$ only increased to 52Ω after 150 cycles. Thus, the charge-transfer resistance of $G_4$ was substantially stabilized during cycling and remained substantially smaller than $G_0$ after 150 cycles. The difference in $R_{ct}$ between $G_0$ and $G_4$ corresponds to the different over-potentials between the two samples after 150 cycles.

Figure 24C:
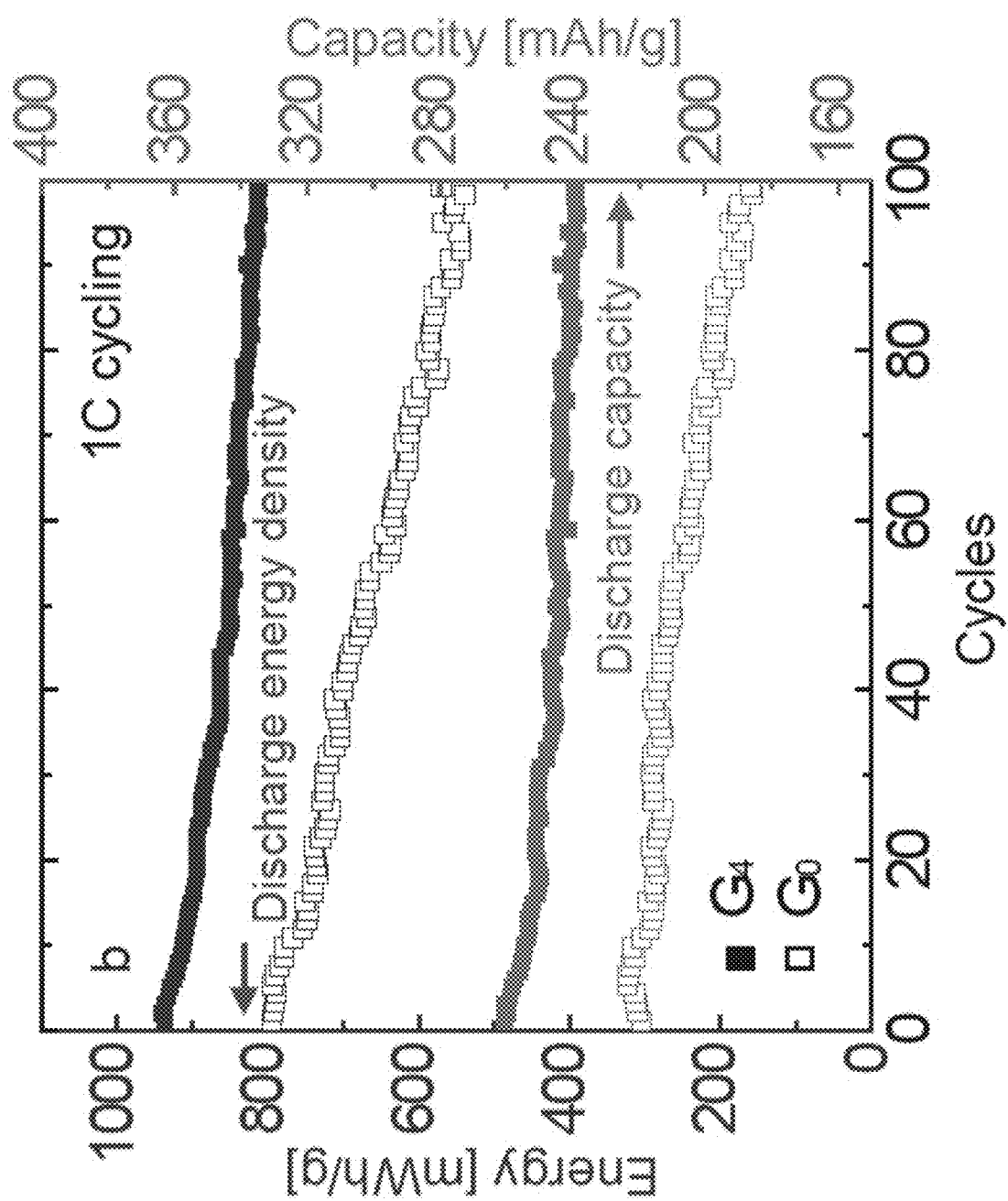
FIG. 24C shows the discharge capacity and energy density of $G_0$ and $G_4$ in a half-cell configuration for 100 cycles under 1 C.

The stabilized Li ion conductivity and interfacial impedance increased the cycling performance under higher rates. The cycling of $G_0$ and $G_4$ at 1 C (see FIG. 24C) showed that $G_0$ had a discharge capacity of 223.3 mAh/g at the beginning, but quickly decreased to 188.2 mAh/g after 100 cycles. $G_4$ had a discharge capacity of 262.6 mAh/g at the beginning and 238.0 mAh/g after 100 cycles. FIG. 24C further shows $G_4$ discharged nearly 925 Wh/kg for the $1^{st}$ cycle and 808 Wh/kg after 100 cycles while $G_0$ only discharged 793 Wh/kg at the beginning and faded to 571 Wh/kg after 100 cycles at 1 C. Remarkably, $G_4$ exhibited a 42% higher discharge energy density compared to $G_0$ at the $100^{th}$ cycle under 1 C.

Figure 24D:
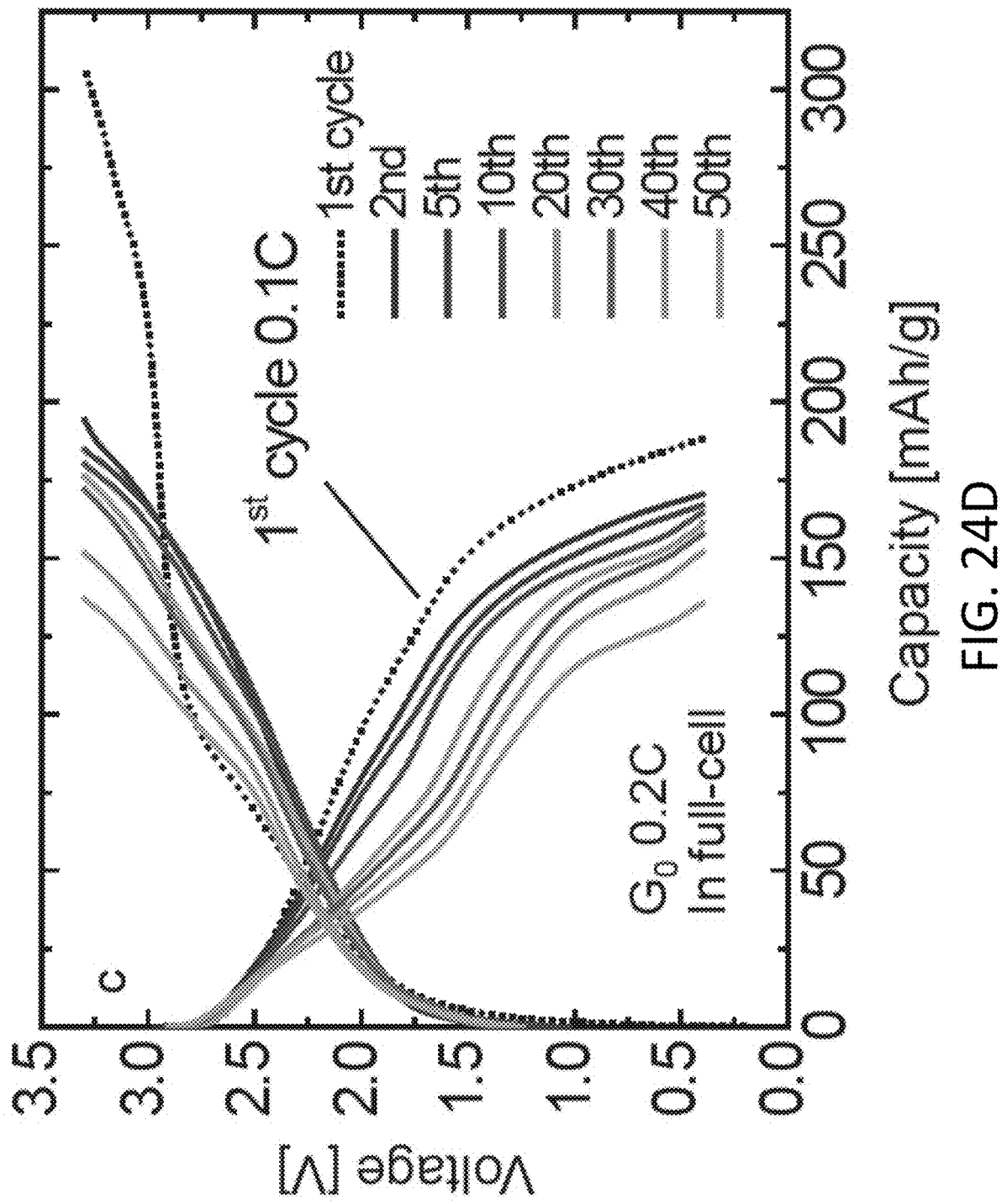
FIG. 24D shows the charge/discharge profiles of $G_0$ in a full-cell battery against a $Li_4Ti_5O_{12}$ anode and 2 g/Ah electrolyte (1 M $LiPF_6$ in EC/DEC with a volume ratio of 1:1, and 2 wt % vinylene carbonate).
Figure 24E:
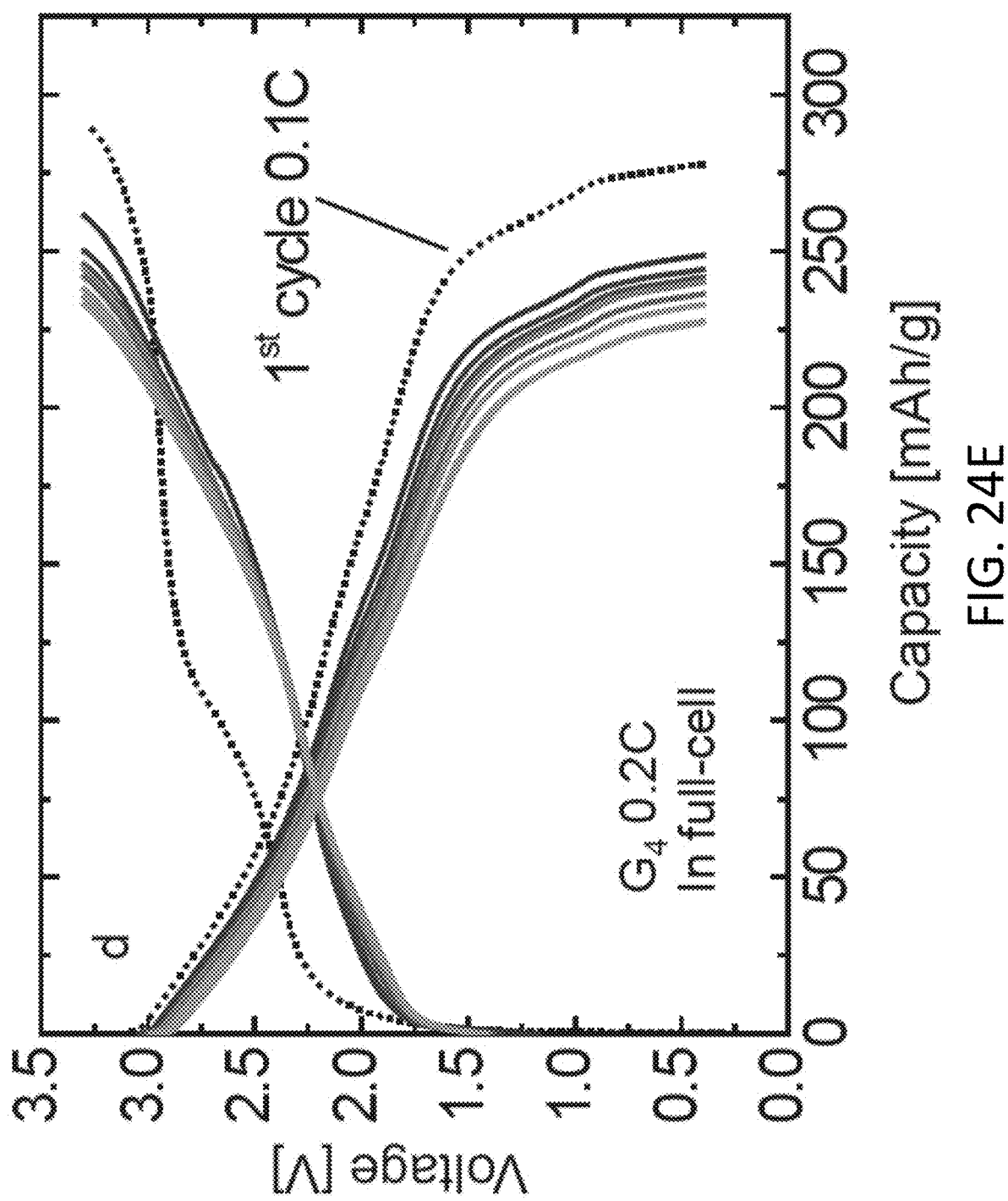
FIG. 24E shows the charge/discharge profiles of $G_4$ in a full-cell battery against a $Li_4Ti_5O_{12}$ anode and 2 g/Ah electrolyte (1 M $LiPF_6$ in EC/DEC with a volume ratio of 1:1, and 2 wt % vinylene carbonate).

The reduction of freed oxygen further reduced side reactions and electrolyte consumption. A full-cell was then formed using the cathode materials described above to assess the cycling performance and lifetime. In order to emulate the operation of a practical cell for industrial applications, only ~2 g/Ah electrolyte was used in a capacity-matched full-cell. The full-cell included a $Li_4Ti_5O_{12}$ anode to prevent side reactions with the electrolyte. Based on FIGS. 24D and 24E, both $G_0$ and $G_4$ were charged to ~300 mAh/g for the initial cycle. However, $G_0$ was only discharged to 188.1 mAh/g for the first cycle and rapidly decreased to 132.3 mAh/g after 50 cycles at 0.2 C. The consumption of liquid electrolyte due to freed oxygen rapidly increased the impedance and dried out the cell. In comparison, $G_4$ was able to discharge to 276.9 mAh/g for the $1^{st}$ cycle and was still able to discharge to 225.5 mAh/g at 0.2 C after 50 cycles. The substantial reduction to electrolyte decomposition may prolong cycling and decrease $CO_2$ gas generation (and thus the inner pressure of the cell) to prevent battery detonation. This suggests $G_4$ may work well under lean-electrolyte conditions, which is prevalent in industrial batteries.

It should also be appreciated that the lattice of the particle shrinks after charge. Generally, a higher charged cathode particle surface tends to shrink more and inflict misfit stress due to kinetic preference. However, the inclusion of a Li gradient region 130 in the transition metal oxide particles 100 described herein reduces the extent that the lattice shrinks due to the averted oxygen redox and reduced Li extraction. A particle 100 with a coherent, continuous lattice gradient is also intrinsically better at resisting stress-driven fatigue than coatings. Furthermore, the layered crystal structure at the surface region 120, which is stabilized by "pillars," would further anchor the Li-rich bulk 110 to suppress structural collapse and phase transformation after charging to high voltage (e.g., 4.8V) while maintaining a high Li conductivity.

3.4 Summary

This exemplary demonstration showed the scalable solid-state synthesis method described above may produce Li gradient $Li_{1+x(r)}M_{1-x(r)}O_2$ particles 100 using a high-temperature LiO leaching process with molten $MoO_3$. The fabricated particles 100 were shown to have bulk and surface regions 110 and 120 that share a fully occupied oxygen framework coherently without grain/phase boundaries or appreciable lattice defects. The $LX_{(r)}MO$ particles 100 exhibited a high-energy-density core region 110 with excess axial Li—O—Li configurations and anion-redox activity. The core region 110 of each particle 100 was wrapped by an epitaxially coherent surface region 120 with no Li—O—Li axes and even some M-O-M axes configurations (i.e., "atomic pillars" that prevent structural collapse when Li is extracted) to prevent near-surface oxygen ions from participation in anion-redox and gaining mobility.

Thus, only the axial Li—$O_2$—Li embedded inside the interior of each particle 100 may be activated for HACR. This operates in a similar manner to a $Li_2O$—LiO—$LiO_2$ cathode, but is distinguished by being well-mixed at the atomic scale. The oxygen ions are well-trapped in the bulk of the particle 100 due to the absence of percolating diffusion pathways to the surface (the concept of "solid oxygen"). The Li-poor surface region 120 also provides electronic and $Li^+$ percolation pathways to improve the rate performance.

Additionally, the synthesis method described above utilizes a sintering aid $MoO_3$, which forms a eutectic liquid solution with $Li_2O$ at 700° C. This allows LiO to be leached out into the surrounding air. The resulting product on the surface of each particle after the reaction is also highly water-soluble, allowing the sintered polycrystals to be separated into individual grains by a water wash. The sintering aid $MoO_3$ may also be recycled in a closed loop for industrial production. Other compounds that form a eutectic liquid solution with LiO or $Li_2O$ may also be used if the solid product is highly water-soluble.

The high-temperature surface treatment may also be generalized to leach other elements to avoid unexpected surface reactions (e.g., Ni may be leached out of Ni-rich NMC particles with other reagents to create a Ni-poor surface that reduces Li/Ni cation mixing during cycling). Other reagents that rob elements from the pristine particle may also be used as leaching aids. Generally, if the leaching process has quicker dynamics than ionic diffusion in the solid bulk region, a Li gradient may be created. The amount of leaching agent, the temperature of the reaction, and the time of the reaction may also be adjusted to modify the transition-metal gradient and Li-richness/poorness gradient profiles of the particle (e.g., the concentration difference, the thickness of the gradient region) to further increase electrochemical performance.

3.5 Supplementary Note 1

Estimation of Electrons Extracted in the Charge Process by sXAS O K Edge

The integral of the O K-edge XAS for $Li_{1.20}[Ni^{2.5+}_{0.16}Co^{3+}_{0.16}Mn^{4+}_{0.48}]O_2$ material in the core region during charging may be used to indicate the number of electrons removed from $M_{3d}$ and $O_{2p}$ (holes created) in the charge process, since $O_{1s} \rightarrow$ holes transition probability is proportional to the number of holes on $M_{3d}$ and $O_{2p}$. The M ions are hybridized with O in the material, thus an electron that escapes from M or O may be reflected by the O K-edge.

Figure 25:
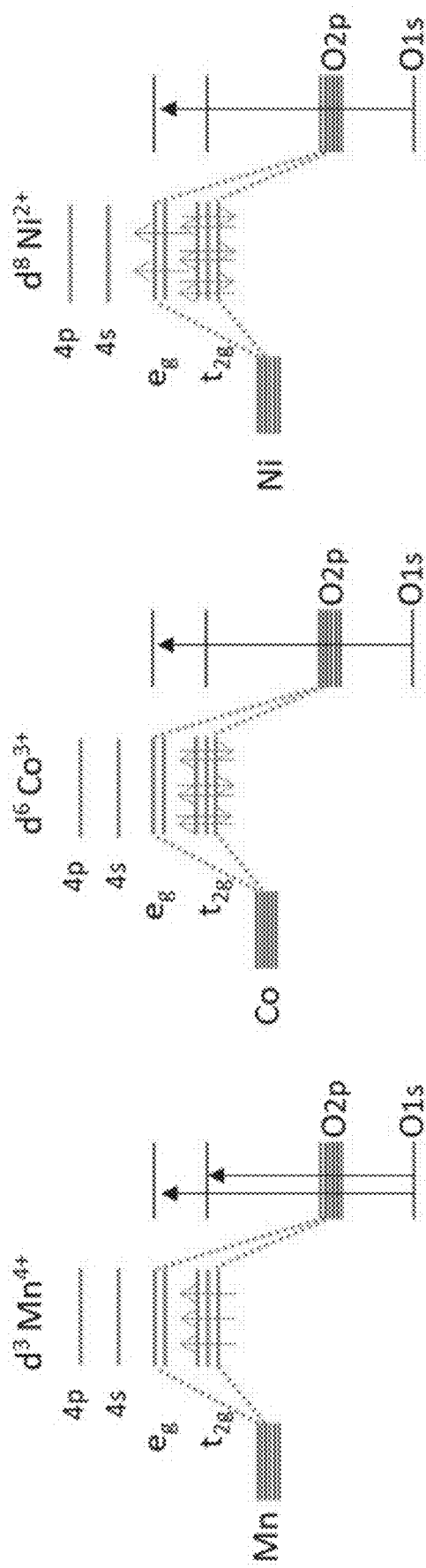
FIG. 25 shows a diagram of XAS transitions from $O_{1s}$ to the holes on each transition metal.

FIG. 25 shows the hybridized $M_{3d}$ and $O_{2p}$ states, which corresponds to the O K-edge XAS peaks at 530 eV ($t_{2g}$ and up-spin on $e_g$) and 532 eV (down-spin on $e_g$). For $Mn^{4+}$—O, there are 3 holes on $t_{2g}$ and 4 holes on $e_g$ so that there are 7 possible XAS transitions associated with Mn-0. For $Co^{3+}$—O, there are 4 holes on $e_g$. For $Ni^{2.5+}$—O, there are 2.5 average holes on $e_g$. Thus, there may be 4.4(0.48×7+0.16× 4+0.16×2.5) possible XAS transitions in total from $O_{1s}$ for $Li_{1.2}[Ni^{2.5+}_{0.16}Co^{3+}_{0.16}Mn^{4+}_{0.48}]O_2$. Electrons from $M_{3d}$ or $O_{2p}$ were removed after charge, which generated more holes and resulted in an enlarged O K-edge XAS peaks at 530 eV and 532 eV. If the integral of the O pre K-edge after charge is a (a>1) multiplied with the discharged states, then the average number of holes ($\delta^+$) in the bulk per formula unit should satisfy $4.4+\delta^+=4.4\times a$. Thus, $\delta^+=4.4(a-1)$ where $\delta^+$ may also represent the total number of removed electrons from both M and O ions.

Similarly, Mn has 0.63×6.2 holes, Co has 0.21×4 holes and Ni has 0.21×2 holes in the Li-poor $Li_{0.95}Mn_{0.63}Co_{0.21}Ni_{0.21}O_2$ surface region. Thus, the overall number of holes from the Li-poor surface may be estimated by $\delta^+=5.15(a-1)$.

From FIG. 4A, the integration of the O pre K-edge XAS peaks at 527.5 eV-534.2 eV after charge and using the FY mode is a=1.238 times that of the discharged states. Thus, $\delta^+=\sim1.05$ (327 mAh/g) for the Li-rich bulk region, which is similar to the actual charged 323 mAh/g in the first cycle. Based on the integral change of O K-edge XAS peaks using the TEY mode (a=1.157), only $\delta^+=\sim0.81$ (221 mAh/g) is obtained for the Li-poor surface region.

CONCLUSION

All parameters, dimensions, materials, and configurations described herein are meant to be exemplary and the actual parameters, dimensions, materials, and/or configurations will depend upon the specific application or applications for which the inventive teachings is/are used. It is to be understood that the foregoing embodiments are presented primarily by way of example and that, within the scope of the appended claims and equivalents thereto, inventive embodiments may be practiced otherwise than as specifically described and claimed. Inventive embodiments of the present disclosure are directed to each individual feature, system, article, material, kit, and/or method described herein.

In addition, any combination of two or more such features, systems, articles, materials, kits, and/or methods, if such features, systems, articles, materials, kits, and/or methods are not mutually inconsistent, is included within the inventive scope of the present disclosure. Other substitutions, modifications, changes, and omissions may be made in the design, operating conditions and arrangement of respective elements of the exemplary implementations without departing from the scope of the present disclosure. The use of a numerical range does not preclude equivalents that fall outside the range that fulfill the same function, in the same way, to produce the same result.

Also, various inventive concepts may be embodied as one or more methods, of which at least one example has been provided. The acts performed as part of the method may in some instances be ordered in different ways. Accordingly, in some inventive implementations, respective acts of a given method may be performed in an order different than specifically illustrated, which may include performing some acts simultaneously (even if such acts are shown as sequential acts in illustrative embodiments).

All publications, patent applications, patents, and other references mentioned herein are incorporated by reference in their entirety.

All definitions, as defined and used herein, should be understood to control over dictionary definitions, definitions in documents incorporated by reference, and/or ordinary meanings of the defined terms.

The indefinite articles "a" and "an," as used herein in the specification and in the claims, unless clearly indicated to the contrary, should be understood to mean "at least one."

The phrase "and/or," as used herein in the specification and in the claims, should be understood to mean "either or both" of the elements so conjoined, i.e., elements that are conjunctively present in some cases and disjunctively present in other cases. Multiple elements listed with "and/or" should be construed in the same fashion, i.e., "one or more" of the elements so conjoined. Other elements may optionally be present other than the elements specifically identified by the "and/or" clause, whether related or unrelated to those elements specifically identified. Thus, as a non-limiting example, a reference to "A and/or B", when used in conjunction with open-ended language such as "comprising" can refer, in one embodiment, to A only (optionally including elements other than B); in another embodiment, to B only (optionally including elements other than A); in yet another embodiment, to both A and B (optionally including other elements); etc.

As used herein in the specification and in the claims, "or" should be understood to have the same meaning as "and/or" as defined above. For example, when separating items in a list, "or" or "and/or" shall be interpreted as being inclusive, i.e., the inclusion of at least one, but also including more than one, of a number or list of elements, and, optionally, additional unlisted items. Only terms clearly indicated to the contrary, such as "only one of" or "exactly one of," or, when used in the claims, "consisting of," will refer to the inclusion of exactly one element of a number or list of elements. In general, the term "or" as used herein shall only be interpreted as indicating exclusive alternatives (i.e. "one or the other but not both") when preceded by terms of exclusivity, such as "either," "one of," "only one of," or "exactly one of." "Consisting essentially of" when used in the claims, shall have its ordinary meaning as used in the field of patent law.

As used herein in the specification and in the claims, the phrase "at least one," in reference to a list of one or more elements, should be understood to mean at least one element selected from any one or more of the elements in the list of elements, but not necessarily including at least one of each and every element specifically listed within the list of elements and not excluding any combinations of elements in the list of elements. This definition also allows that elements may optionally be present other than the elements specifically identified within the list of elements to which the phrase "at least one" refers, whether related or unrelated to those elements specifically identified. Thus, as a non-limiting example, "at least one of A and B" (or, equivalently, "at least one of A or B," or, equivalently "at least one of A and/or B") can refer, in one embodiment, to at least one, optionally including more than one, A, with no B present (and optionally including elements other than B); in another embodiment, to at least one, optionally including more than one, B, with no A present (and optionally including elements other than A); in yet another embodiment, to at least one, optionally including more than one, A, and at least one, optionally including more than one, B (and optionally including other elements); etc.

In the claims, as well as in the specification above, all transitional phrases such as "comprising," "including," "carrying," "having," "containing," "involving," "holding," "composed of," and the like are to be understood to be open-ended, i.e., to mean including but not limited to. Only the transitional phrases "consisting of" and "consisting essentially of" shall be closed or semi-closed transitional phrases, respectively, as set forth in the United States Patent Office Manual of Patent Examining Procedures, Section 2111.03.

The invention claimed is:

1. A lithium (Li) transition metal (M) oxide particle comprising:
  a core region having a first Li concentration greater than a stoichiometric Li concentration in the lithium transition metal oxide particle;
  a surface region, surrounding the core region, having a second Li concentration less than the stoichiometric Li concentration in the lithium transition metal oxide particle; and
  a gradient region, disposed between the core region and the surface region, having a Li concentration profile that varies from the first Li concentration to the second Li concentration,
  wherein:
  the core region enchances oxygen anion redox activity; and
  the surface region suppresses oxygen anion redox activity and mitigates oxygen loss.

2. The particle of claim 1, wherein the Li concentration profile varies from the first Li concentration to the second Li concentration in a smooth and continuous manner.

3. The particle of claim 1, wherein:
  the core region comprises a plurality of core region layers; and
  the plurality of core region layers comprises:
    at least one oxygen layer;
    at least one Li ion layer; and
    at least one M ion layer in which at least some M ions are substituted with Li ions.

4. The particle of claim 1, wherein:
  the surface region comprises a plurality of surface region layers; and
  the plurality of surface region layers comprises:
    at least one oxygen layer; and
    at least one Li ion layer in which at least some Li ions are substituted with M ions.

5. The particle of claim 4, wherein the M ions in the at least one Li ion layer provide structural support to the plurality of surface region layers so as to reduce structural degradation when Li ions are removed from the at least one Li ion layer.

6. The particle of claim 1, wherein:
  the transition metal oxide is of the form $Li_{1+x}M_{1-x}O_2$; and
  M is at least one of nickel (Ni), cobalt (Co), or manganese (Mn).

7. The particle of claim 6, wherein X is greater than 0 and less than or equal to 0.2 in the first Li concentration and X is greater than −0.1 and less than 0 in the second Li concentration.

8. The particle of claim 1, wherein the core region, the surface region, and the gradient region form a coherent crystal lattice.

9. A transition metal (M) oxide particle comprising:
  a core region having a first M concentration less than a stoichiometric M concentration in the transition metal oxide;
  a surface region, surrounding the core region, having a second M concentration greater than the stoichiometric M concentration in the transition metal oxide; and
  a gradient region, disposed between the core region and the surface region, having an M concentration profile that varies from the first M concentration to the second M concentration,
  the first M concentration and the second M concentration being formed by at least one of substituting at least some M ions with alkali metal ions or at least some alkali metal ions with M ions.

10. The particle of claim 9, wherein the M concentration profile varies from the first M concentration to the second M concentration in a smooth and continuous manner.

11. The particle of claim 9, wherein:
  the core region enhances oxygen anion redox activity; and
  the surface region suppresses oxygen anion redox activity and mitigates oxygen loss.

12. The particle of claim 9, wherein:
  the alkali metal ions are lithium (Li) ions;
  the core region comprises a plurality of core region layers; and
  the plurality of core region layers comprises:
    at least one oxygen layer;
    at least one Li ion layer; and
    at least one M ion layer in which at least some M ions are substituted with the Li ions.

13. The particle of claim 9, wherein:
  the alkali metal ions are lithium (Li) ions;
  the surface region comprises a plurality of surface region layers; and the plurality of surface region layers comprises:
- at least one oxygen layer; and
- at least one Li ion layer in which at least some Li ions are substituted with M ions.

14. The particle of claim 13, wherein the M ions in the at least one Li ion layer provide structural support to the plurality of surface region layers so as to reduce structural degradation when Li ions are removed from the at least one Li ion layer.

15. The particle of claim 9, wherein:
- the transition metal oxide is of the form $Li_{1+x}M_{1-x}O_2$; and
- M is at least one of nickel (Ni), cobalt (Co), or manganese (Mn).

16. The particle of claim 15, wherein X is greater than 0 and less than or equal to 0.2 in the second M concentration and X is greater than −0.1 and less than 0 in the first M concentration.

17. The particle of claim 9, wherein the core region, the surface region, and the gradient region form a coherent crystal lattice.

18. A cathode for a battery, the cathode comprising:
a plurality of particles, at least some of the plurality of particles comprising:
- a core region having a first lithium (Li) concentration greater than a stoichiometric Li concentration in the transition metal oxide;
- a surface region, surrounding the core region, having a second Li concentration less than the stoichiometric Li concentration in the transition metal oxide; and
- a gradient region, disposed between the core region and the surface region, having a Li concentration profile that varies from the first Li concentration to the second Li concentration in a smooth and continuous manner, wherein:
- the core region enchances oxygen anion redox activity; and
- the surface region suppresses oxygen redox activity and loss to an electrolyte of the battery, when the electrolyte is present in the battery.

19. The cathode of claim 18, wherein the plurality of particles has a size distribution that is at least one of unimodal, bimodal, or uniform.

20. The cathode of claim 18, wherein:
- the transition metal oxide of at least some particles of the plurality of particles are of the form $Li_{1+x}M_{1-x}O_2$; and
- M is at least one of the nickel (Ni), cobalt (Co), or manganese (Mn).

* * * * *